(12) United States Patent
Yan et al.

(10) Patent No.: US 11,064,076 B2
(45) Date of Patent: Jul. 13, 2021

(54) CHARGING MANAGEMENT METHOD, USER PLANE FUNCTION ENTITY, AND CONTROL PLANE FUNCTION ENTITY

(71) Applicant: Huawei Technologies Co., Ltd., Shenzhen (CN)

(72) Inventors: Yali Yan, Shanghai (CN); Xiaoyi Xia, Beijing (CN); Guangwei He, Shenzhen (CN); Yanping Zhang, Shanghai (CN); Weihua Qiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/871,255

(22) Filed: May 11, 2020

(65) Prior Publication Data

US 2020/0274973 A1 Aug. 27, 2020

Related U.S. Application Data

(63) Continuation of application No. 16/274,863, filed on Feb. 13, 2019, now Pat. No. 10,681,222, which is a
(Continued)

(30) Foreign Application Priority Data

Jan. 5, 2017 (CN) .......................... 201710012833.3

(51) Int. Cl.
*H04M 15/00* (2006.01)
*H04W 80/10* (2009.01)
(Continued)

(52) U.S. Cl.
CPC ............ *H04M 15/66* (2013.01); *H04L 12/14* (2013.01); *H04L 12/1403* (2013.01);
(Continued)

(58) Field of Classification Search
CPC ....... H04W 4/24; H04W 24/10; H04W 76/11; H04W 80/10; H04L 12/14; H04L 12/1417;
(Continued)

(56) References Cited

U.S. PATENT DOCUMENTS 10,681,222 B2 *  6/2020  Yan ....................... H04M 15/85
2012/0197795 A1    8/2012  Campbell et al.
(Continued)

FOREIGN PATENT DOCUMENTS

CN  101296092 A  10/2008
CN  101364882 A   2/2009
(Continued)

OTHER PUBLICATIONS

3rd Generation Partnership Project; Technical Specification Group Services and System Aspects; Architecture enhancements for control and user plane separation of EPC nodes, Stage 2 (Release 14), 3GPP TS 23.214 v4.1.0, Dec. 2016, 71 pages. (Year: 2016).*
(Continued)

*Primary Examiner* — Brandon J Miller
(74) *Attorney, Agent, or Firm* — Slater Matsil, LLP

(57) ABSTRACT

Embodiments of this application disclose a charging management method, a user plane function entity, and a control plane function entity. The method includes: receiving, by a UP, a first usage reporting rule (URR) and a second URR sent by a CP, where the first URR is correlated with the second URR; when usage information on the UP reaches a threshold of the first URR, obtaining, by the UP, usage information corresponding to the first URR and usage information corresponding to a third URR correlated with the first URR; and sending, by the UP to the CP, the usage information corresponding to the first URR and the usage information corresponding to the third URR, so that the CP
(Continued)

generates a charging data record based on the usage information corresponding to the first URR and the usage information corresponding to the third URR.

20 Claims, 33 Drawing Sheets

Related U.S. Application Data continuation of application No. PCT/CN2017/119383, filed on Dec. 28, 2017.

(51) Int. Cl.
*H04W 24/10* (2009.01)
*H04W 76/11* (2018.01)
*H04W 4/24* (2018.01)
*H04L 12/14* (2006.01)

(52) U.S. Cl.
CPC ...... *H04L 12/1407* (2013.01); *H04L 12/1417* (2013.01); *H04M 15/41* (2013.01); *H04M 15/44* (2013.01); *H04M 15/62* (2013.01); *H04M 15/64* (2013.01); *H04M 15/65* (2013.01); *H04M 15/83* (2013.01); *H04M 15/85* (2013.01); *H04M 15/852* (2013.01); *H04W 4/24* (2013.01); *H04W 24/10* (2013.01); *H04W 76/11* (2018.02); *H04W 80/10* (2013.01)

(58) Field of Classification Search
CPC ........... H04L 12/1403; H04L 12/17485; H04L 12/1439; H04L 12/1485; H04L 12/1407; H04M 15/66; H04M 15/64; H04M 15/65; H04M 15/852; H04M 15/31; H04M 15/41; H04M 15/44; H04M 15/61; H04M 15/62; H04M 15/765; H04M 15/83; H04M 15/85; H04M 15/854; H04M 15/88; H04M 15/881; H04M 15/882; H04M 15/883
See application file for complete search history.

(56) References Cited

U.S. PATENT DOCUMENTS

| | | | |
|---|---|---|---|
| 2013/0084826 | A1 | 4/2013 | Mo et al. |
| 2013/0086237 | A1 | 4/2013 | Cutler et al. |
| 2013/0086252 | A1 | 4/2013 | Cutler et al. |
| 2013/0086253 | A1 | 4/2013 | Cutler et al. |
| 2013/0188633 | A1* | 7/2013 | Noldus ............... H04L 65/1006 370/352 |
| 2015/0111531 | A1 | 4/2015 | Cai et al. |
| 2015/0319315 | A1 | 11/2015 | Chai |
| 2019/0215403 | A1 | 7/2019 | Chai |

FOREIGN PATENT DOCUMENTS

| | | |
|---|---|---|
| JP | 2016504879 A | 2/2016 |
| KR | 20150105442 A | 9/2015 |
| WO | 2014000302 A1 | 1/2014 |
| WO | 2016069571 A1 | 5/2016 |
| WO | 2017190783 A1 | 11/2017 |

OTHER PUBLICATIONS

3GPP TS 23.214 v14.1.0 (Dec. 2016), 3rd Generation Partnership Project; Technical Specification Group Services and System Aspects; Architecture enhancements for control and user plane separation of EPC nodes; Stage 2 (Release 14) (Year. 2016).

3rd Generation Partnership Project;Technical Specification Group Services and System Aspects; Architecture enhancements for control and user plane separation of EPC nodes; Stage 2 (Release 14), 3GPP TS 23.214 V14.1.0, Dec. 2016, 71 pages.

3rd Generation Partnership Project; Technical Specification Group Core Network and Terminals; Interface between the Control Plane and the User Plane of EPC Nodes; Stage 3 (Release 14), 3GPP TS 29.244 V03.0, Nov. 2016, 47 pages.

3rd Generation Partnership Project;Technical Specification Group Services and System Aspects;Telecommunication management; Charging management; Packet Switched (PS) domain charging (Release 14), 3GPP TS 32.251 V14.1.0 (Dec. 2016), 186 pages.

Nokia et al., "Pseudo-CR on PCC—Usage Monitoring Control," 3GPP TSG CT4 Meeting #75, C4-166256, Reno, US, Nov. 14-18, 2016, 17 pages.

* cited by examiner

CHARGING MANAGEMENT METHOD, USER PLANE FUNCTION ENTITY, AND CONTROL PLANE FUNCTION ENTITY

CROSS-REFERENCE TO RELATED APPLICATIONS

This application is a continuation of U.S. patent application Ser. No. 16/274,863, filed on Feb. 13, 2019, which is a continuation of International Application No. PCT/CN2017/119383, filed on Dec. 28, 2017, which claims priority to Chinese Patent Application No. 201710012833.3, filed on Jan. 5, 2017. All of the aforementioned patent applications are hereby incorporated by reference in their entireties.

TECHNICAL FIELD

This application relates to the communications field, and in particular, to a charging management method, a user plane function entity, and a control plane function entity.

BACKGROUND

With development of Internet technologies, the Internet is applied more extensively. When a user accesses a network service using user equipment (UE), the UE establishes a network connection to a service server of the network service. In addition, a network element in a network stores a session corresponding to the UE, and sends charging information such as data traffic and online duration of the UE to a charging server. The charging server allocates session resources such as a processing resource and a memory resource to the UE to perform charging for the UE. The charging server may be an authentication, authorization and accounting (AAA) server, or may be an online charging system (OCS) or an offline charging system (OFCS).

In a control and user plane separation (CUPS) network architecture, the charging server is connected only to a control plane function entity (CP). The CP has a charging usage threshold, and sends a usage reporting rule (URR) to a user plane function entity (UP) through an Sx interface. When traffic or duration accumulated on the UP reaches a threshold of the URR, the UP reports accumulated usage information to the CP. The CP generates a charging data record, and then reports the charging data record to the charging system. The charging system performs operations of charging and fee deduction on the user based on the reported charging data record, and generates a detailed charging record.

The URR may be set to different levels. The UP is not aware of the levels of the URR. The UP is only aware of whether the usage information on the UP reaches the threshold of the URR. If the threshold of the URR is reached, the UP reports usage information corresponding to the URR. If the threshold of the URR is not reached, the UP does not report usage information corresponding to the URR.

The UP determines, depending on whether the usage information reaches the threshold of the URR, whether to report the usage information. In some cases, the usage information reported by the UP may be incomplete, and therefore the CP cannot generate a complete charging data record and report the charging data record to the charging server.

SUMMARY

Embodiments of this application provide a charging management method, a user plane function entity, and a control plane function entity, so that a CP can generate a complete charging data record and report the charging data record to a charging server.

According to a first aspect, an embodiment of this application provides a charging management method.

In a CUPS network architecture, a charging server is connected only to a CP. When charging is required, the CP sends a URR to a UP through an Sx interface. In this case, the UP may receive a first usage reporting rule URR and a second URR sent by the CP, where the first URR is correlated with the second URR.

When usage information on the UP reaches a threshold of the first URR, the UP obtains usage information corresponding to the first URR and usage information corresponding to a third URR correlated with the first URR, where the third URR corresponds to the second URR. To be specific, the third URR may be the second URR, or may be a URR obtained after some operations are performed on the second URR.

After obtaining the usage information corresponding to the first URR and the usage information corresponding to the third URR, the UP may send the usage information to the CP, so that the CP can generate a charging data record based on the usage information.

When the usage information on the UP reaches the threshold of the first URR, the UP not only reports, to the CP, the usage information corresponding to the first URR, but also reports, to the CP, the usage information corresponding to the third URR correlated with the first URR, so that the CP can obtain, from the UP, usage information corresponding to correlated URRs on various levels. Therefore, the CP can generate a complete charging data record and report the charging data record to the charging server.

Based on the first aspect, this embodiment of this application further provides a first implementation of the first aspect as follows.

The UP sends to the CP, simultaneously or non-simultaneously, the usage information corresponding to the first URR and the usage information corresponding to the third URR, for example, first sends the usage information corresponding to the first URR, and then sends the usage information corresponding to the third URR, or first sends the usage information corresponding to the third URR, and then sends the usage information corresponding to the first URR.

If the UP sends the usage information simultaneously, the UP may add, to a same message, the usage information corresponding to the first URR and the usage information corresponding to the third URR, or may add, to different messages, the usage information corresponding to the first URR and the usage information corresponding to the third URR.

If the UP sends the usage information non-simultaneously, the UP adds, to different messages, the usage information corresponding to the first URR and the usage information corresponding to the third URR.

The UP may select, based on an actual situation, how to send the usage information to the CP, that is, may either send the usage information simultaneously or send the usage information separately. Therefore, flexibility and selectivity of the solution are improved.

Based on the first aspect, this embodiment of this application further provides a second implementation of the first aspect as follows.

The first URR may have one or more thresholds. When the first URR has only one threshold, the threshold may be one of thresholds such as duration, traffic, or an event quantity. When the threshold is reached, the UP obtains the usage information corresponding to the first URR and the usage information corresponding to the third URR.

When the first URR has a plurality of thresholds, the thresholds may be thresholds such as duration, traffic, or an event quantity. As long as the usage information on the UP reaches any one of the thresholds, the UP obtains the usage information corresponding to the first URR and the usage information corresponding to the third URR.

The UP may adapt to a plurality of cases of thresholds in the first URR. The UP may perform monitoring regardless of one threshold or a plurality of thresholds. Therefore, flexibility and selectivity of the solution are improved.

Based on the first aspect, this embodiment of this application further provides a third implementation of the first aspect as follows.

The usage information corresponding to the first URR and the usage information corresponding to the third URR that are reported by the UP may be a same type of usage information. For example, both are duration, traffic, or an event quantity. Alternatively, the usage information corresponding to the first URR and the usage information corresponding to the third URR may not be a same type of usage information. For example, the usage information corresponding to the first URR is duration, and the usage information corresponding to the third URR is traffic.

The usage information reported by the UP may be the same or different, and therefore can adapt to more requirements put forward by the CP or the charging server. Therefore, an application scope of the solution is enlarged.

Based on the first aspect, or the first implementation of the first aspect, or the second implementation of the first aspect, or the third implementation of the first aspect, this embodiment of this application further provides a fourth implementation of the first aspect as follows.

That the UP receives a first URR and a second URR sent by the CP includes: the UP receives a session establishment request sent by the CP, where the session establishment request includes the first URR and the second URR, and the third URR is the same as the second URR.

The UP receives the first URR and the second URR in the session establishment request sent by the CP. In this case, the UP reports the usage information corresponding to the first URR and usage information corresponding to the second URR. In this case, the third URR is the second URR.

The session establishment request received by the UP may already indicate that the first URR is correlated with the second URR; or after receiving the session establishment request and before sending the usage information to the CP, the UP may receive a correlation indication sent by the CP, where the correlation indication is used to indicate that the first URR is correlated with the second URR.

Based on the first aspect, or the first implementation of the first aspect, or the second implementation of the first aspect, or the third implementation of the first aspect, this embodiment of this application further provides a fifth implementation of the first aspect as follows.

A session establishment request is before a session modification request, and the UP may first receive the session establishment request sent by the CP, where the session establishment request includes the first URR, and then receive the first URR or an identifier of the first URR, and the second URR in the session modification sent by the CP.

After the UP receives the session modification request sent by the CP, the method further includes: the UP uses the second URR as the third URR.

When the UP obtains only the first URR or does not obtain any URR from the session establishment request, the UP may use the second URR obtained from the session modification request as the third URR.

Based on the first aspect, or the first implementation of the first aspect, or the second implementation of the first aspect, or the third implementation of the first aspect, this embodiment of this application further provides a sixth implementation of the first aspect as follows.

That the UP receives a first URR and a second URR sent by the CP includes: the UP receives a session establishment request sent by the CP, where the session establishment request may include the first URR and a fifth URR.

The session establishment request received by the UP may already indicate that the first URR is correlated with the fifth URR; or after receiving the session establishment request and before sending, to the CP, the usage information corresponding to the first URR and the usage information corresponding to the third URR, the UP may receive a correlation indication sent by the CP, where the correlation indication is used to indicate that the first URR is correlated with the fifth URR.

Based on the first aspect, or the first implementation of the first aspect, or the second implementation of the first aspect, or the third implementation of the first aspect, this embodiment of this application further provides a seventh implementation of the first aspect as follows.

That the UP receives a first URR and a second URR sent by the CP includes: the UP receives a session establishment request sent by the CP, where the session establishment request includes the first URR; and the UP receives a first session modification request sent by the CP, where the first session modification request includes a fifth URR; and the method further includes: the UP stores the fifth URR.

The session establishment request received by the UP may include the first URR, and then the fifth URR is obtained using the first session modification request.

Based on the first aspect, or the first implementation of the first aspect, or the second implementation of the first aspect, or the third implementation of the first aspect, this embodiment of this application further provides an eighth implementation of the first aspect as follows.

That the UP receives a first URR and a second URR sent by the CP includes: the UP receives a session establishment request sent by the CP, where the session establishment request includes a fifth URR; and the UP receives a second session modification request sent by the CP, where the second session modification request includes the first URR; and the method further includes: the UP stores the first URR.

The session establishment request received by the UP may include the fifth URR, and then the first URR is obtained using the second session modification request.

Based on the first aspect, or the first implementation of the first aspect, or the second implementation of the first aspect, or the third implementation of the first aspect, this embodiment of this application further provides a ninth implementation of the first aspect as follows.

That the UP receives a first URR and a second URR sent by the CP includes: the UP receives a third session modification request sent by the CP, where the third session modification request includes the first URR and a fifth URR; and the method further includes: the UP stores the first URR and the fifth URR.

A session establishment request received by the UP may not include a URR, and then the first URR and the fifth URR are obtained using the third session modification request.

The UP may obtain the first URR and the fifth URR from the CP in a plurality of manners. Therefore, flexibility of the solution is improved.

Based on any one of the sixth, the seventh, the eighth, and the ninth implementations of the first aspect, this embodiment of this application further provides a tenth implementation of the first aspect as follows.

That the UP receives a first URR and a second URR sent by the CP further includes: the UP receives a fourth session modification request sent by the CP, where the fourth session modification request includes the first URR or an identifier of the first URR, and the second URR or an identifier of the second URR; and after the UP receives the fourth session modification request sent by the CP, the method further includes: the UP updates the fifth URR based on the second URR to obtain the third URR.

After obtaining the first URR and the fifth URR, the UP may receive, in a session modification request, the first URR and the second URR sent by the CP, where the first URR may be a complete URR or may be an identifier.

The UP may update the received fifth URR based on the second URR, and obtain the third URR after the updating.

Based on the tenth implementation of the first aspect, this embodiment of this application further provides an eleventh implementation of the first aspect as follows.

That the UP updates the fifth URR based on the second URR to obtain the third URR includes: the UP may determine whether the fifth URR includes the second URR, and if the fifth URR does not include the second URR, the UP may add the second URR to the fifth URR to obtain the third URR; or the UP may determine whether the fifth URR includes another target URR than the second URR, and if the fifth URR includes the another target URR, the UP may remove the target URR from the fifth URR to obtain the third URR; or the UP may determine whether the fifth URR includes another target URR than the second URR, and if the fifth URR includes the another target URR, the UP may remove a correlation between the first URR and the target URR in the fifth URR to obtain the third URR.

When the UP performs a remove operation, the UP may remove a complete URR or remove a correlation between a URR and the first URR. In addition, the CP may request the UP to update another URR correlated with the first URR. Therefore, a URR that requires reporting of online usage information can be adjusted flexibly.

Based on any one of the sixth, the seventh, the eighth, and the ninth implementations of the first aspect, this embodiment of this application further provides a twelfth implementation of the first aspect as follows.

That the UP receives a first URR and a second URR sent by the CP further includes: the UP receives a fourth session modification request sent by the CP, where the fourth session modification request includes an add instruction, the first URR or an identifier of the first URR, and the second URR or an identifier of the second URR; and after the UP receives the fourth session modification request sent by the CP, the method further includes: the UP adds the second URR to the fifth URR according to the add instruction to obtain the third URR.

The CP may request the UP to add another URR correlated with the first URR. Therefore, a URR that requires reporting can be adjusted flexibly.

Based on any one of the sixth, the seventh, the eighth, and the ninth implementations of the first aspect, this embodiment of this application further provides a thirteenth implementation of the first aspect as follows.

That the UP receives a first URR and a second URR sent by the CP further includes: the UP receives a fourth session modification request sent by the CP, where the fourth session modification request includes a remove instruction, the first URR or an identifier of the first URR, and the second URR or an identifier of the second URR; and after the UP receives the fourth session modification request sent by the CP, the method further includes: the UP removes the second URR from the fifth URR according to the remove instruction to obtain the third URR; or the UP removes the correlation between the first URR and the second URR in the fifth URR according to the remove instruction to obtain the third URR.

When the UP performs a remove operation, the UP may remove a complete URR or remove a correlation between a URR and the first URR. In addition, the CP may request the UP to remove another URR correlated with the first URR. Therefore, a URR that requires reporting can be adjusted flexibly.

Based on any one of the sixth, the seventh, the eighth, and the ninth implementations of the first aspect, this embodiment of this application further provides a fourteenth implementation of the first aspect as follows.

That the UP receives a first URR and a second URR sent by the CP further includes: the UP receives a fourth session modification request sent by the CP, where the fourth session modification request includes an add instruction, a remove instruction, the first URR or an identifier of the first URR, the second URR or an identifier of the second URR, and a fourth URR or an identifier of a fourth URR; and after the UP receives the fourth session modification request sent by the CP, the method further includes: the UP adds the second URR to the fifth URR according to the add instruction, and removes the fourth URR from the fifth URR according to the remove instruction, or removes a correlation between the first URR and the fourth URR in the fifth URR according to the remove instruction to obtain the third URR.

When the UP performs a remove operation, the UP may remove a complete URR or remove a correlation between a URR and the first URR. In addition, the CP may request the UP to add and remove other URRs correlated with the first URR. Therefore, a URR that requires reporting can be adjusted flexibly.

Based on any one of the sixth, the seventh, the eighth, and the ninth implementations of the first aspect, this embodiment of this application further provides a fifteenth implementation of the first aspect as follows.

After the UP sends, to the CP, the usage information corresponding to the first URR and the usage information corresponding to the third URR, the method further includes: the UP receives a session modification request sent by the CP, where the session modification request includes a remove-all instruction; and after the UP receives the session modification request sent by the CP, the method further includes: the UP removes all URRs in the fifth URR according to the remove-all instruction; or the UP removes correlations between the first URR and all URRs in the fifth URR according to the remove-all instruction.

When the UP performs a remove operation, the UP may remove a complete URR or remove a correlation between a URR and the first URR. In addition, the CP may request the UP to remove another URR correlated with the first URR. Therefore, a URR that requires reporting can be adjusted flexibly.

Based on any one of the first aspect, and the first to the fifteenth implementations of the first aspect, this embodiment of this application further provides a sixteenth implementation of the first aspect as follows.

The first URR is a bearer level URR, the second URR is a service data flow level URR, and the third URR is a service data flow level URR.

Based on the fourteenth implementation of the first aspect, this embodiment of this application further provides a seventeenth implementation of the first aspect as follows.

The fourth URR is a service data flow level URR.

Based on any one of the sixth, the seventh, the eighth, and the ninth implementations of the first aspect, this embodiment of this application further provides an eighteenth implementation of the first aspect as follows.

The fifth URR is a service data flow level URR.

The first URR to the fifth URR are limited to URRs on specific levels. This improves implementability of the solution.

According to a second aspect, an embodiment of this application provides a charging management method.

In a CUPS network architecture, a charging server is connected only to a CP; when charging is required, the CP sends a first URR and a second URR to a UP through an Sx interface, where the first URR is correlated with the second URR. When usage information on the UP reaches a threshold of the first URR, the UP reports, to the CP, usage information corresponding to the first URR and usage information corresponding to a third URR, and the CP may generate a charging data record based on the information.

When the usage information on the UP reaches the threshold of the first URR, the UP not only reports, to the CP, the usage information corresponding to the first URR, but also reports, to the CP, the usage information corresponding to the third URR correlated with the first URR, so that the CP can obtain, from the UP, usage information corresponding to correlated URRs on various levels. Therefore, the CP can generate a complete charging data record and report the charging data record to the charging server.

Based on the second aspect, this embodiment of this application further provides a first implementation of the second aspect as follows.

The CP may receive, simultaneously or non-simultaneously, the usage information corresponding to the first URR and the usage information corresponding to the third URR, for example, first receive the usage information corresponding to the first URR, and then receive the usage information corresponding to the third URR, or first receive the usage information corresponding to the third URR, and then receive the usage information corresponding to the first URR.

If the CP receives the usage information simultaneously, the CP may receive, in a same message, the usage information corresponding to the first URR and the usage information corresponding to the third URR, or may separately receive, in different messages, the usage information corresponding to the first URR and the usage information corresponding to the third URR.

If the CP receives the usage information non-simultaneously, the CP separately receives, in different messages, the usage information corresponding to the first URR and the usage information corresponding to the third URR.

Based on the second aspect, this embodiment of this application further provides a second implementation of the second aspect as follows.

The usage information corresponding to the first URR and the usage information corresponding to the third URR that are reported by the UP and received by the CP may be a same type of usage information. For example, both are duration, traffic, or an event quantity. Alternatively, the usage information corresponding to the first URR and the usage information corresponding to the third URR may not be a same type of usage information. For example, the usage information corresponding to the first URR is duration, and the usage information corresponding to the third URR is traffic.

Based on the second aspect, or the first implementation of the second aspect, or the second implementation of the second aspect, this embodiment of this application further provides a third implementation of the second aspect as follows.

Before the CP sends the first URR and the second URR to the UP, the CP may further receive a trigger request, and in this case, a specific process in which the CP sends the first URR and the second URR to the UP may be: the CP sends the first URR and the second URR to the UP according to the trigger request.

Based on the second aspect, or the first implementation of the second aspect, or the second implementation of the second aspect, this embodiment of this application further provides a fourth implementation of the second aspect as follows.

That the CP sends a first URR and a second URR to a UP includes: the CP sends a session establishment request to the UP, where the session establishment request includes the first URR and the second URR, and the third URR is the same as the second URR.

The CP sends the first URR and the second URR in the session establishment request to the UP. In this case, the CP may receive the usage information corresponding to the first URR and usage information corresponding to the second URR that are reported by the UP. In this case, the third URR is the second URR.

The CP may indicate, in the session establishment request, that the first URR is correlated with the second URR; or the CP may send a correlation indication to the UP after sending the session establishment request and before receiving the usage information sent by the UP, where the correlation indication is used to indicate that the first URR is correlated with the second URR.

Based on the second aspect, or the first implementation of the second aspect, or the second implementation of the second aspect, this embodiment of this application further provides a fifth implementation of the second aspect as follows.

That the CP sends a first URR and a second URR to a UP includes: the CP sends a session establishment request to the UP, where the session establishment request includes the first URR.

The session establishment request is before a session modification request, and the CP may first send the session establishment request to the UP, and then the CP sends the session modification request to the UP, where the session modification request includes the first URR or an identifier of the first URR, and the second URR, so that the UP uses the second URR as the third URR.

When the CP sends only the first URR or does not send any URR in the session establishment request, the UP may use the second URR obtained from the session modification request as the third URR.

Based on the second aspect, or the first implementation of the second aspect, or the second implementation of the second aspect, this embodiment of this application further provides a sixth implementation of the second aspect as follows.

That the CP sends a first URR and a second URR to a UP includes: the CP sends a session establishment request to the UP, where the session establishment request may include the first URR and a fifth URR.

The CP may indicate, in the session establishment request, that the first URR is correlated with the fifth URR; or after the CP sends the session establishment request, and before the CP receives the usage information corresponding to the first URR and the usage information corresponding to the third URR correlated with the first URR that are sent by the UP, the CP may send a correlation indication to the UP, where the correlation indication is used to indicate that the first URR is correlated with the fifth URR.

Based on the second aspect, or the first implementation of the second aspect, or the second implementation of the second aspect, this embodiment of this application further provides a seventh implementation of the second aspect as follows.

That the CP sends a first URR and a second URR to a UP includes: the CP sends a session establishment request to the UP, where the session establishment request includes the first URR; and the CP sends a first session modification request to the UP, where the first session modification request includes a fifth URR.

The first URR may be included in the session establishment request, and then the CP sends the fifth URR using the first session modification request.

Based on the second aspect, or the first implementation of the second aspect, or the second implementation of the second aspect, this embodiment of this application further provides an eighth implementation of the second aspect as follows.

That the CP sends a first URR and a second URR to a UP includes: the CP sends a session establishment request to the UP, where the session establishment request includes a fifth URR; and the CP sends a second session modification request to the UP, where the second session modification request includes the first URR.

The fifth URR may be included in the session establishment request, and then the CP sends the first URR using the second session modification request.

Based on the second aspect, or the first implementation of the second aspect, or the second implementation of the second aspect, this embodiment of this application further provides a ninth implementation of the second aspect as follows.

That the CP sends a first URR and a second URR to a UP includes: the CP sends a third session modification request to the UP, where the third session modification request includes the first URR and a fifth URR.

A session establishment request sent by the CP may not include a URR, and then the first URR and the fifth URR are sent using the third session modification request.

Based on any one of the sixth, the seventh, the eighth, and the ninth implementations of the second aspect, this embodiment of this application further provides a tenth implementation of the second aspect as follows.

That the CP sends a first URR and a second URR to a UP further includes: the CP sends a fourth session modification request to the UP, where the fourth session modification request includes the first URR or an identifier of the first URR, and the second URR or an identifier of the second URR, so that the UP updates the fifth URR based on the second URR to obtain the third URR.

After the CP sends the first URR and the fifth URR to the UP, the CP may send, in a session modification request, the first URR and the second URR to the UP, where the first URR may be a complete URR or may be an identifier. Therefore, the UP may update the received fifth URR based on the second URR, and obtain the third URR after the updating.

Based on any one of the sixth, the seventh, the eighth, and the ninth implementations of the second aspect, this embodiment of this application further provides an eleventh implementation of the second aspect as follows.

That the CP sends a first URR and a second URR to a UP further includes: the CP sends a fourth session modification request to the UP, where the fourth session modification request includes an add instruction, the first URR or an identifier of the first URR, and the second URR or an identifier of the second URR, so that the UP adds the second URR to the fifth URR according to the add instruction to obtain the third URR.

The CP may request the UP to add another URR correlated with the first URR. Therefore, a URR that requires reporting can be adjusted flexibly.

Based on any one of the sixth, the seventh, the eighth, and the ninth implementations of the second aspect, this embodiment of this application further provides a twelfth implementation of the second aspect as follows.

That the CP sends a first URR and a second URR to a UP further includes: the CP sends a fourth session modification request to the UP, where the fourth session modification request includes a remove instruction, the first URR or an identifier of the first URR, and the second URR or an identifier of the second URR, so that the UP removes the second URR from the fifth URR according to the remove instruction to obtain the third URR, or that the UP removes the correlation between the first URR and the second URR in the fifth URR according to the remove instruction to obtain the third URR.

The CP may request the UP to remove another URR correlated with the first URR. When the UP performs a remove operation, the UP may remove a complete URR or remove a correlation between a URR and the first URR. Therefore, a URR that requires reporting can be adjusted flexibly.

Based on any one of the sixth, the seventh, the eighth, and the ninth implementations of the second aspect, this embodiment of this application further provides a thirteenth implementation of the second aspect as follows.

That the CP sends a first URR and a second URR to a UP further includes: the CP sends a fourth session modification request to the UP, where the fourth session modification request includes an add instruction, a remove instruction, the first URR or an identifier of the first URR, the second URR or an identifier of the second URR, and a fourth URR or an identifier of a fourth URR, so that the UP adds the second URR to the fifth URR according to the add instruction, and that the UP removes the fourth URR from the fifth URR according to the remove instruction or removes a correlation between the first URR and the fourth URR in the fifth URR according to the remove instruction to obtain the third URR.

The CP may request the UP to add and remove other URRs correlated with the first URR. When the UP performs a remove operation, the UP may remove a complete URR or remove a correlation between a URR and the first URR. Therefore, a URR that requires reporting can be adjusted flexibly.

Based on any one of the sixth, the seventh, the eighth, and the ninth implementations of the second aspect, this embodiment of this application further provides a fourteenth implementation of the second aspect as follows.

After the CP receives the usage information corresponding to the first URR and the usage information corresponding to the third URR that are sent by the UP, the method further includes: the CP sends a session modification request to the UP, where the session modification request includes a remove-all instruction, so that the UP removes all URRs in the fifth URR according to the remove-all instruction or removes correlations between the first URR and all URRs in the fifth URR according to the remove-all instruction.

The CP may request the UP to remove another URR correlated with the first URR. When the UP performs a remove operation, the UP may remove a complete URR or remove a correlation between a URR and the first URR. Therefore, a URR that requires reporting can be adjusted flexibly.

Based on any one of the second aspect, and the first to the fourteenth implementations of the second aspect, this embodiment of this application further provides a fifteenth implementation of the second aspect as follows.

The first URR is a bearer level URR, the second URR is a service data flow level URR, and the third URR is a service data flow level URR.

Based on the thirteenth implementation of the second aspect, this embodiment of this application further provides a sixteenth implementation of the second aspect.

The fourth URR is a service data flow level URR.

Based on any one of the sixth, the seventh, the eighth, and the ninth implementations of the second aspect, this embodiment of this application further provides a seventeenth implementation of the second aspect as follows.

The fifth URR is a service data flow level URR.

The first URR to the fifth URR are limited to URRs on specific levels. This improves implementability of the solution.

According to a third aspect, an embodiment of this application provides a charging management method.

In a CUPS network architecture, a charging server is connected only to a CP. When charging is required, the CP sends a URR to a UP through an Sx interface. In this case, the UP may receive a first usage reporting rule URR sent by the CP. When usage information on the UP reaches a threshold of the first URR, the UP obtains usage information corresponding to the first URR. The UP sends, to the CP, the usage information corresponding to the first URR. Then, the UP may receive a first request sent by the CP, where the first request includes a second URR, and the second URR is correlated with the first URR. The UP obtains usage information corresponding to the second URR. The UP sends, to the CP, the usage information corresponding to the second URR, so that the CP generates a charging data record based on the usage information corresponding to the first URR and the usage information corresponding to the second URR.

When the usage information on the UP reaches the threshold of the first URR, the UP reports, to the CP, the usage information corresponding to the first URR, and after the UP receives the first request from the CP, the UP also reports, to the CP, the usage information corresponding to the second URR correlated with the first URR, so that the CP can obtain, from the UP, usage information corresponding to correlated URRs on various levels. Therefore, the CP can generate a complete charging data record and report the charging data record to the charging server.

Based on the third aspect, this embodiment of this application further provides a first implementation of the third aspect as follows.

The UP does not need to learn that the first URR is specifically correlated with the second URR, and only needs to report corresponding usage information according to a requirement of the CP. Certainly, the UP may also learn that the first URR is correlated with the second URR.

Regardless of whether the UP learns that the first URR is correlated with the second URR, when the CP performs sending to the UP, the CP may learn that the first URR is correlated with the second URR.

Based on the third aspect, this embodiment of this application further provides a second implementation of the third aspect as follows.

The first request received by the UP may include a plurality of URRs, or may include only the second URR. If a plurality of URRs are included, the plurality of URRs may include other URRs, and therefore, the UP needs to recognize which URR is the second URR, so as to report usage information in time. The UP recognizes the second URR in a plurality of manners. The UP may recognize the second URR using an identifier configured in the second URR by the CP, or an identifier configured out of the second URR.

A specific identifier may be an indication identifier used to indicate that the URR is the second URR, or is a reporting time identifier used to indicate a time at which the usage information corresponding to the second URR needs to be reported, or is another identifier.

Based on the third aspect, or the first implementation of the third aspect, or the second implementation of the third aspect, this embodiment of this application further provides a third implementation of the third aspect as follows.

The first URR is a bearer level URR, and the second URR is a service data flow level URR.

The first URR and the second URR are limited to URRs on specific levels. This improves implementability of the solution.

According to a fourth aspect, an embodiment of this application provides a charging management method.

In a CUPS network architecture, a charging server is connected only to a CP. When charging is required, the CP sends a URR to a UP through an Sx interface. In this case, the UP may receive a first URR and a second URR sent by the CP, but the UP does not know that the first URR is correlated with the second URR. When usage information on the UP reaches a threshold of the first URR, the UP obtains usage information corresponding to the first URR. The UP sends, to the CP, the usage information corresponding to the first URR. Then, the UP receives a first request sent by the CP, where the first request includes a correlation indication, and the correlation indication is used to indicate that the second URR is correlated with the first URR. After the UP learns that the first URR is correlated with the second URR, the UP may obtain usage information corresponding to the second URR. The UP sends, to the CP, the usage information corresponding to the second URR, so that the CP generates a charging data record based on the usage information corresponding to the first URR and the usage information corresponding to the second URR.

When the usage information on the UP reaches the threshold of the first URR, the UP reports, to the CP, the usage information corresponding to the first URR and the usage information corresponding to the second URR, so that the CP can obtain, from the UP, usage information corresponding to correlated URRs on various levels. Therefore, the CP can generate a complete charging data record and report the charging data record to the charging server.

Based on the fourth aspect, this embodiment of this application further provides a first implementation of the fourth aspect as follows.

The correlation indication may be implemented using an identifier, and is used to indicate that the first URR is correlated with the second URR, or the like.

Based on the fourth aspect or the first implementation of the fourth aspect, this embodiment of this application further provides a second implementation of the fourth aspect as follows.

The first URR is a bearer level URR, and the second URR is a service data flow level URR.

The first URR and the second URR are limited to URRs on specific levels. This improves implementability of the solution.

According to a fifth aspect, an embodiment of this application provides a charging management method.

In a CUPS network architecture, a charging server is connected only to a CP; when charging is required, the CP receives a trigger request, and sends a first URR to a UP through an Sx interface according to trigger request. When usage information on the UP reaches a threshold of the first URR, the CP receives usage information corresponding to the first URR and sent by the UP. Because the usage information corresponding to the first URR is insufficient for generating a complete charging data record, the CP sends a first request to the UP, where the first request includes a second URR, and the second URR is correlated with the first URR. Then, the CP receives usage information corresponding to the second URR and sent by the UP. The CP generates a charging data record based on the usage information corresponding to the first URR and the usage information corresponding to the second URR.

When the usage information on the UP reaches the threshold of the first URR, the UP not only reports, to the CP, the usage information corresponding to the first URR, but also reports, to the CP, the usage information corresponding to the second URR correlated with the first URR, so that the CP can obtain, from the UP, usage information corresponding to correlated URRs on various levels. Therefore, the CP can generate a complete charging data record and report the charging data record to the charging server.

Based on the fifth aspect, this embodiment of this application further provides a first implementation of the fifth aspect as follows.

The first request sent by the CP may include a plurality of URRs, or may include only the second URR. If a plurality of URRs are included, the plurality of URRs may include other URRs, and therefore, the CP needs to inform the UP how to recognize which URR is the second URR, so as to report the usage information in time. The CP tells the UP in a plurality of manners. The UP may recognize the second URR using an identifier configured in the second URR, or an identifier configured out of the second URR.

A specific identifier may be an indication identifier used to indicate that the URR is the second URR, or is a reporting time identifier used to indicate a time at which the usage information corresponding to the second URR needs to be reported, or is another identifier.

Based on the fifth aspect or the first implementation of the fifth aspect, this embodiment of this application further provides a second implementation of the fifth aspect as follows.

Before the CP sends the first request to the UP, the method further includes: the CP determines the correlation between the first URR and the second URR according to the trigger request.

The CP may determine the correlation between the first URR and the second URR according to the trigger request, and then send the first URR and the second URR to the UP.

Based on the fifth aspect or the first implementation of the fifth aspect, this embodiment of this application further provides a third implementation of the fifth aspect as follows.

Before the CP sends the first request to the UP, the method further includes: the CP updates the second URR according to the trigger request.

The CP may update the correlation between the first URR and the second URR according to the trigger request, and then send the first URR and the updated second URR to the UP.

Based on any one of the fifth aspect, and the first to the third implementations of the fifth aspect, this embodiment of this application further provides a fourth implementation of the fifth aspect as follows.

The first URR is a bearer level URR, and the second URR is a service data flow level URR.

The first URR and the second URR are limited to URRs on specific levels. This improves implementability of the solution.

According to a sixth aspect, an embodiment of this application provides a charging management method.

In a CUPS network architecture, a charging server is connected only to a CP; when charging is required, the CP receives a trigger request, and sends a first URR and a second URR to a UP through an Sx interface according to trigger request. When usage information on the UP reaches a threshold of the first URR, the CP receives usage information corresponding to the first URR and sent by the UP. Because the usage information corresponding to the first URR is insufficient for generating a complete charging data record, the CP sends a first request to the UP, where the first request includes a correlation identifier, and the correlation identifier is used to indicate that the second URR is correlated with the first URR. Then, the CP receives usage information corresponding to the second URR and sent by the UP. The CP generates a charging data record based on the usage information corresponding to the first URR and the usage information corresponding to the second URR.

When the usage information on the UP reaches the threshold of the first URR, the UP not only reports, to the CP, the usage information corresponding to the first URR, but also reports, to the CP, the usage information corresponding to the second URR correlated with the first URR, so that the CP can obtain, from the UP, usage information corresponding to correlated URRs on various levels. Therefore, the CP can generate a complete charging data record and report the charging data record to the charging server.

Based on the sixth aspect, this embodiment of this application further provides a first implementation of the sixth aspect as follows.

The correlation indication may be implemented using an identifier, and is used to indicate that the first URR is correlated with the second URR, or the like.

Based on the sixth aspect or the first implementation of the sixth aspect, this embodiment of this application further provides a second implementation of the sixth aspect as follows.

Before the CP sends the first URR and the second URR to the UP according to the trigger request, the method further includes: the CP determines the correlation between the first URR and the second URR according to the trigger request.

The CP may determine the correlation between the first URR and the second URR according to the trigger request, and then send the first URR and the second URR to the UP.

Based on the sixth aspect or the first implementation of the sixth aspect, this embodiment of this application further provides a third implementation of the sixth aspect as follows.

Before the CP sends the first URR and the second URR to the UP according to the trigger request, the method further includes: the CP updates the second URR according to the trigger request.

The CP may update the correlation between the first URR and the second URR according to the trigger request, and then send the first URR and the updated second URR to the UP.

Based on any one of the sixth aspect, and the first to the third implementations of the sixth aspect, this embodiment of this application further provides a fourth implementation of the sixth aspect as follows.

The first URR is a bearer level URR, and the second URR is a service data flow level URR.

The first URR and the second URR are limited to URRs on specific levels. This improves implementability of the solution.

According to a seventh aspect, an embodiment of this application provides a user plane function entity, where the user plane function entity has a function for implementing actions of the user plane function entity in the first aspect. The function may be implemented by hardware, or may be implemented by corresponding software executed by hardware. The hardware or software includes one or more modules corresponding to the function.

According to an eighth aspect, an embodiment of this application provides a control plane function entity, where the control plane function entity has a function for implementing actions of the control plane function entity in the second aspect. The function may be implemented by hardware, or may be implemented by corresponding software executed by hardware. The hardware or software includes one or more modules corresponding to the function.

According to a ninth aspect, an embodiment of this application provides a user plane function entity, where the user plane function entity has a function for implementing actions of the user plane function entity in the third aspect. The function may be implemented by hardware, or may be implemented by corresponding software executed by hardware. The hardware or software includes one or more modules corresponding to the function.

According to a tenth aspect, an embodiment of this application provides a user plane function entity, where the user plane function entity has a function for implementing actions of the user plane function entity in the fourth aspect. The function may be implemented by hardware, or may be implemented by corresponding software executed by hardware. The hardware or software includes one or more modules corresponding to the function.

According to an eleventh aspect, an embodiment of this application provides a control plane function entity, where the control plane function entity has a function for implementing actions of the control plane function entity in the fifth aspect. The function may be implemented by hardware, or may be implemented by corresponding software executed by hardware. The hardware or software includes one or more modules corresponding to the function.

According to an eleventh aspect, an embodiment of this application provides a control plane function entity, where the control plane function entity has a function for implementing actions of the control plane function entity in the sixth aspect. The function may be implemented by hardware, or may be implemented by corresponding software executed by hardware. The hardware or software includes one or more modules corresponding to the function.

According to a thirteenth aspect, an embodiment of this application provides a computer storage medium, where the computer storage medium is configured to store a computer software instruction used by the foregoing user plane function entity or control plane function entity. The computer software instruction is used to execute a program designed for the user plane function entity or the control plane function entity.

The user plane function entity may be the user plane function entity described in the seventh aspect, the ninth aspect, or the tenth aspect.

The control plane function entity may be the control plane function entity described in the eighth aspect, the eleventh aspect, or the twelfth aspect.

According to a fourteenth aspect, an embodiment of this application provides a computer program product, where the computer program product includes a computer software instruction. The computer software instruction may be loaded by a processor to implement a procedure of the charging management method in any one of the first aspect to the sixth aspect.

As can be learned from the foregoing technical solutions, the embodiments of this application have the following advantages. When the usage information on the UP reaches the threshold of the first URR, the UP not only reports, to the CP, the usage information corresponding to the first URR, but also reports, to the CP, the usage information corresponding to the third URR correlated with the first URR, so that the CP can obtain, from the UP, usage information corresponding to correlated URRs on various levels. Therefore, the CP can generate a complete charging data record and report the charging data record to the charging server.

DETAILED DESCRIPTION OF ILLUSTRATIVE EMBODIMENTS

An embodiment of this application provides a charging management method, so that a CP can generate a complete charging data record and report the charging data record to a charging server.

Figure 1:
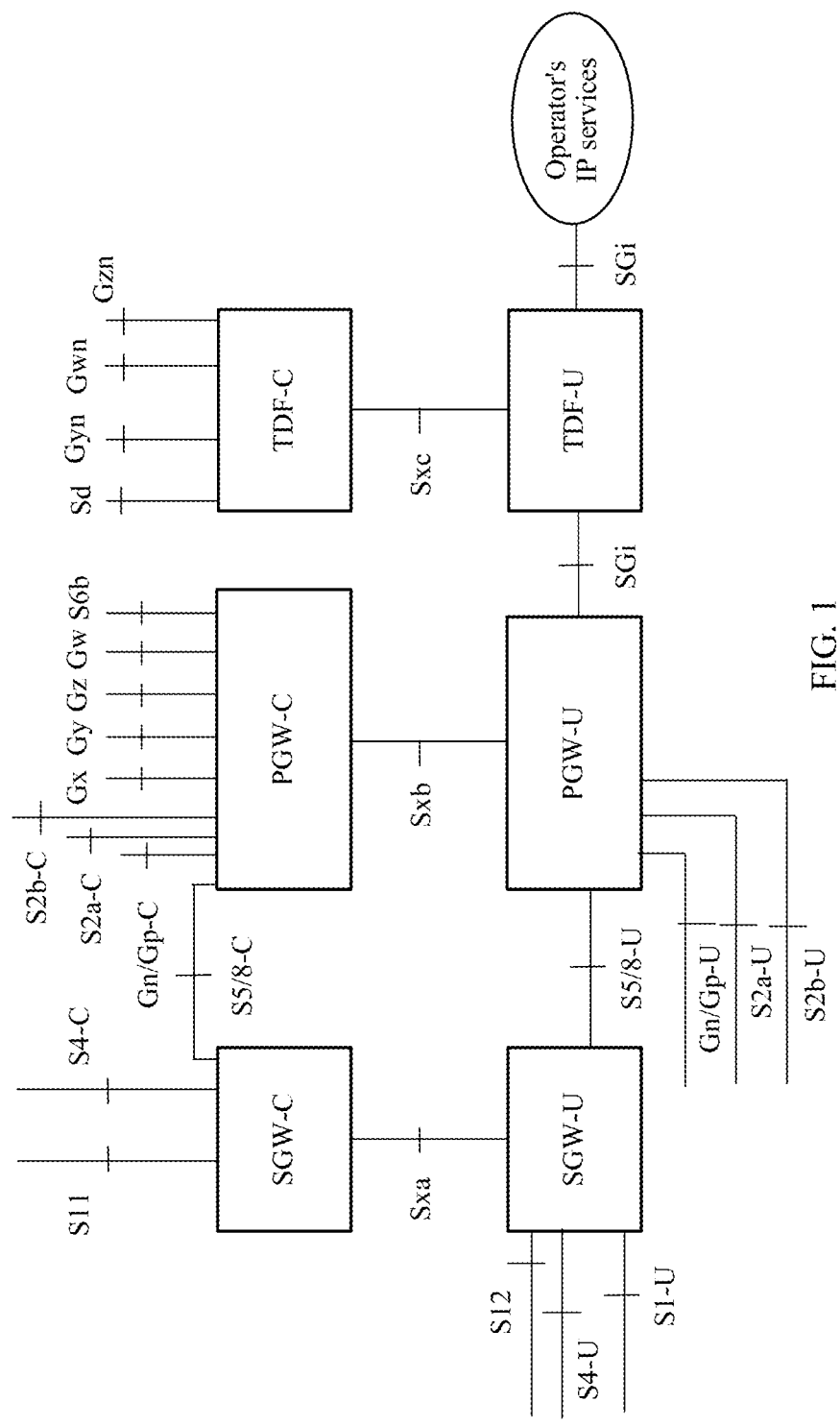
FIG. 1 is a schematic diagram of a CUPS network architecture.

This embodiment of this application may be applied to a CU separation network architecture shown in FIG. 1. In the network architecture, a core network element function is divided into a control plane function and a user plane function. The core network element function is divided into a CP and a UP. The UP is mainly responsible for forwarding a data packet, performing QoS control, collecting statistics of charging information, and the like. The CP is mainly responsible for delivering a data packet forwarding policy, a QoS control policy, a charging information statistics reporting policy, and the like to the user plane function.

Correspondingly, a serving gateway (SGW) in a network is divided into a serving gateway control plane function entity (SGW-C) and a serving gateway user plane function entity (SGW-U).

A packet data network gateway (PGW) is divided into a packet data network gateway control plane function entity (PGW-C) and a packet data network gateway user plane function entity (PGW-U, PGW User plane function).

A traffic detection function entity (TDF) is divided into a traffic detection control plane function entity (TDF-C) and a traffic detection user plane function (TDF-U).

Interfaces between control plane functions and user plane functions are Sxa, Sxb, and Sxc respectively. The charging server may be an AAA server, or may be an OCS or an OFCS.

Figure 2:
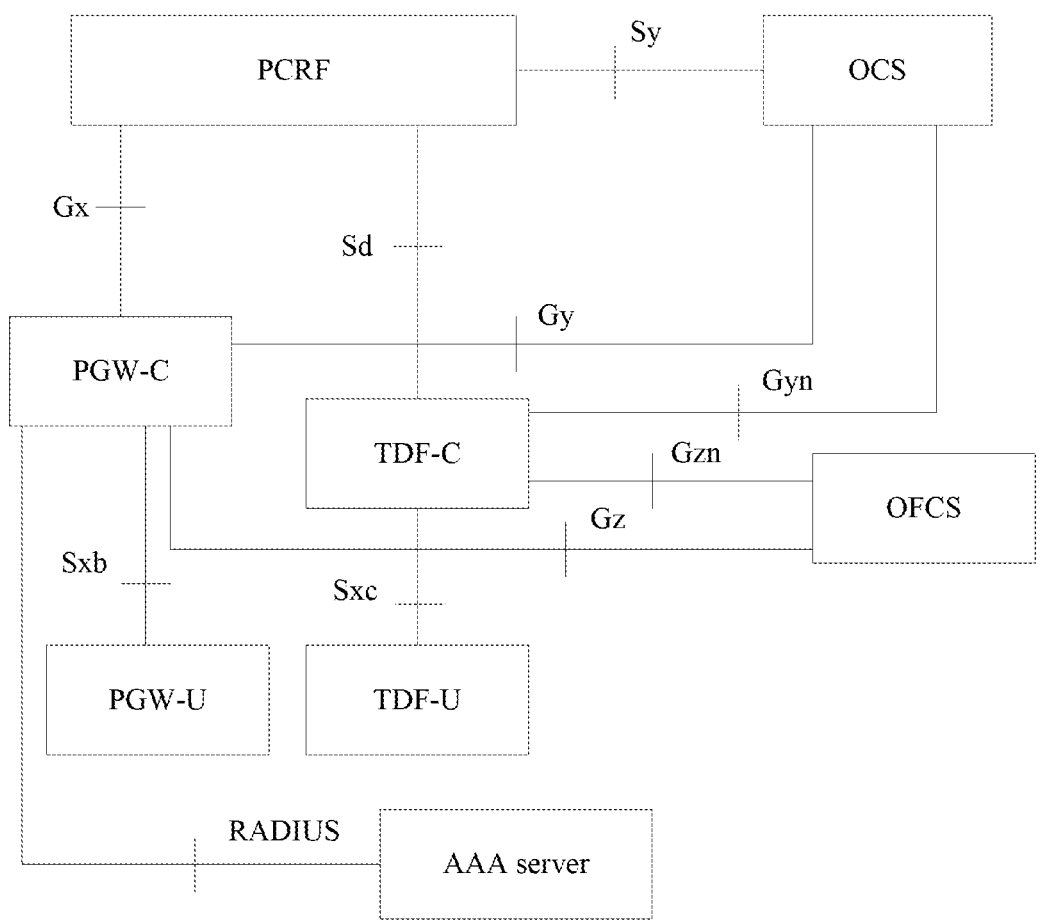
FIG. 2 is a schematic diagram of a connection relationship of a charging server in a CU separation scenario.

A CU separation scenario is shown in FIG. 2. In the scenario, the charging server is connected only to a CP (for example, the PGW-C or the TDF-C). The CP has a charging usage threshold, and sends a URR to a UP (for example, the PGW-U or the TDF-U) through an Sx interface. When traffic or duration accumulated on the UP reaches a threshold of the URR, the UP reports accumulated usage information to the CP. The CP generates a charging data record, and then reports the charging data record to a charging system. The charging system performs a charging operation on a user based on the reported charging data record.

It should be noted that, "UP" is only a collective term for a device performing a user plane function, but does not specify one or some devices. In an actual implementation, the device performing the user plane function may not be referred to as "UP" either, but is replaced with another name. This is not specifically limited herein. "UP" is used merely as an example for description in this application.

Likewise, "CP" is only a collective term for a device performing a control plane function, but does not specify one or some devices. In an actual implementation, the device performing the control plane function may not be referred to as "CP" either, but is replaced with another name. This is not specifically limited herein. "CP" is used merely as an example for description in this application.

In an actual implementation, the UP and the CP may be separate devices, or may be a group of function entities on another device (for example, a server). This is not specifically limited herein.

Figure 3:
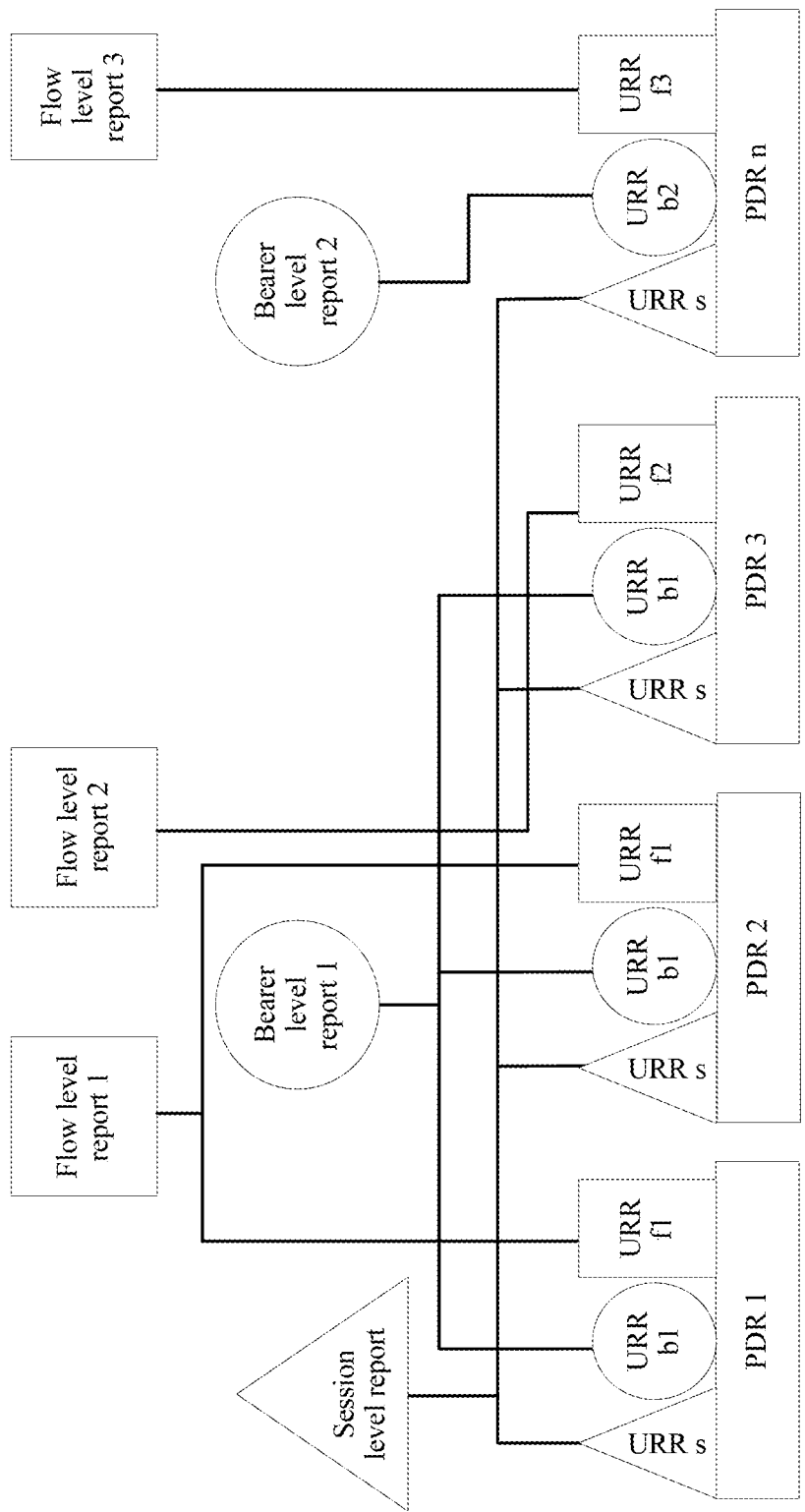
FIG. 3 is a schematic diagram of URR reporting rules.

For URRs, as shown in FIG. 3, a URR s represents a session level usage reporting rule; a URR b1 and a URR b2 represent bearer level usage reporting rules; a URR f1, a URR f2, and a URR f3 represent service data flow level usage reporting rules, where the URR f1 and the URR f2 belong to the same bearer level URR b1.

A reporting mode of the URR s in a packet detection rule (PDR) 1 to a PDR n is session level reporting (Session Level Report). Both a PDR 2 and a PDR 3 include the same bearer level usage reporting rule URR b1, and reporting modes of the URR b1 and the URR b2 are bearer level reporting (Bearer Level Report).

The reporting mode of the URR s in the packet detection rule (PDR) 1 to the PDR n is session level reporting (Session Level Report).

Information of the PDR may be shown in the following Table 1. It should be noted that the following Table 1 is merely an example of information of the PDR. In an actual implementation, the PDR may also include other information. This is not specifically limited herein.

TABLE 1

| Attribute | Presence requirement | Description |
| --- | --- | --- |
| PDR ID | Mandatory | ID of the PDR |
| Precedence | Mandatory | Rule precedence |

TABLE 1-continued

| Attribute | Presence requirement | Description |
| --- | --- | --- |
| PDI | Mandatory | Packet detection information |
| FAR ID | Mandatory | Forwarding action rule |
| URR ID | Optional | Statistics reporting rule |
| QER ID | Optional | QoS enforcement rule |

The forwarding action rule (FAR) is used to represent a rule based on which the UP forwards data. The QoS enforcement rule (QER) is used to represent a rule based on which the UP performs QoS control.

A reporting mode of the URR b1 in the PDR 1 to the PDR 3 is bearer level reporting 1 (Bearer Level Report 1), and a reporting mode of the URR b2 in the PDR n is bearer level reporting 2 (Bearer Level Report 2).

A reporting mode of the URR f1 in the PDR 1 and the PDR 2 is service data flow level reporting 1 (Flow Level Report 1); a reporting mode of the URR f2 in the PDR 3 is service data flow level reporting 2 (Flow Level Report 2); and a reporting mode of the URR f3 in the PDR n is service data flow level reporting 3 (Flow Level Report 3).

When a threshold of the bearer level URR b1 is reached, the UP reports, to the CP, usage information corresponding to the bearer level URR b1. The CP encodes, according to a charging data record (CDR) coding format defined in the 3GPP protocol standard, bearer level usage information obtained from the UP and the like, to generate a charging data record. The charging data record is generated based on the bearer level usage information, and also needs to include charging statistics information corresponding to the service data flow level URR f1 and the URR f2 on the UP.

In this embodiment of this application, when a threshold of a first URR is reached, the UP not only needs to send, to the CP, usage information corresponding to the first URR, but also needs to send, to the CP, usage information corresponding to another URR correlated with the first URR.

It should be noted that, in subsequent embodiments, the first URR may be a bearer level URR, and the another URR (including but not limited to a second URR, a third URR, a fourth URR, and a fifth URR) may be a service data flow level URR.

It may be understood that, in an actual implementation, the first URR and the another URR may be URRs of other types, as long as the first URR is correlated with the another URR. This is not specifically limited herein. The subsequent embodiments are described merely using an example in which the first URR is a bearer level URR, and the another URR is a service data flow level URR.

It should be noted that, the UP may report usage information corresponding to another URR correlated with the first URR, and the UP may perform reporting based on a threshold, or may perform reporting according to an indication from the CP. Details are hereinafter described separately.

I. The UP performs reporting based on a threshold.

In this embodiment, the CP may send the first URR and the second URR to the UP. When the usage information on the UP reaches a threshold of the first URR, the UP reports, to the CP, the usage information corresponding to the first URR and usage information corresponding to a third URR correlated with the first URR.

In an actual implementation, the CP may send the first URR and the second URR to the UP in a plurality of manners. Details are hereinafter described separately.

1. Send the first URR and the second URR in an Sx session establishment request:

In this embodiment, the CP sends the first URR and the second URR to the UP using an Sx session establishment request, so that when usage on the UP reaches the threshold of the first URR, the UP reports, to the CP, the usage information corresponding to the first URR and the usage information corresponding to the third URR correlated with the first URR, where the third URR is the second URR.

Figure 4:
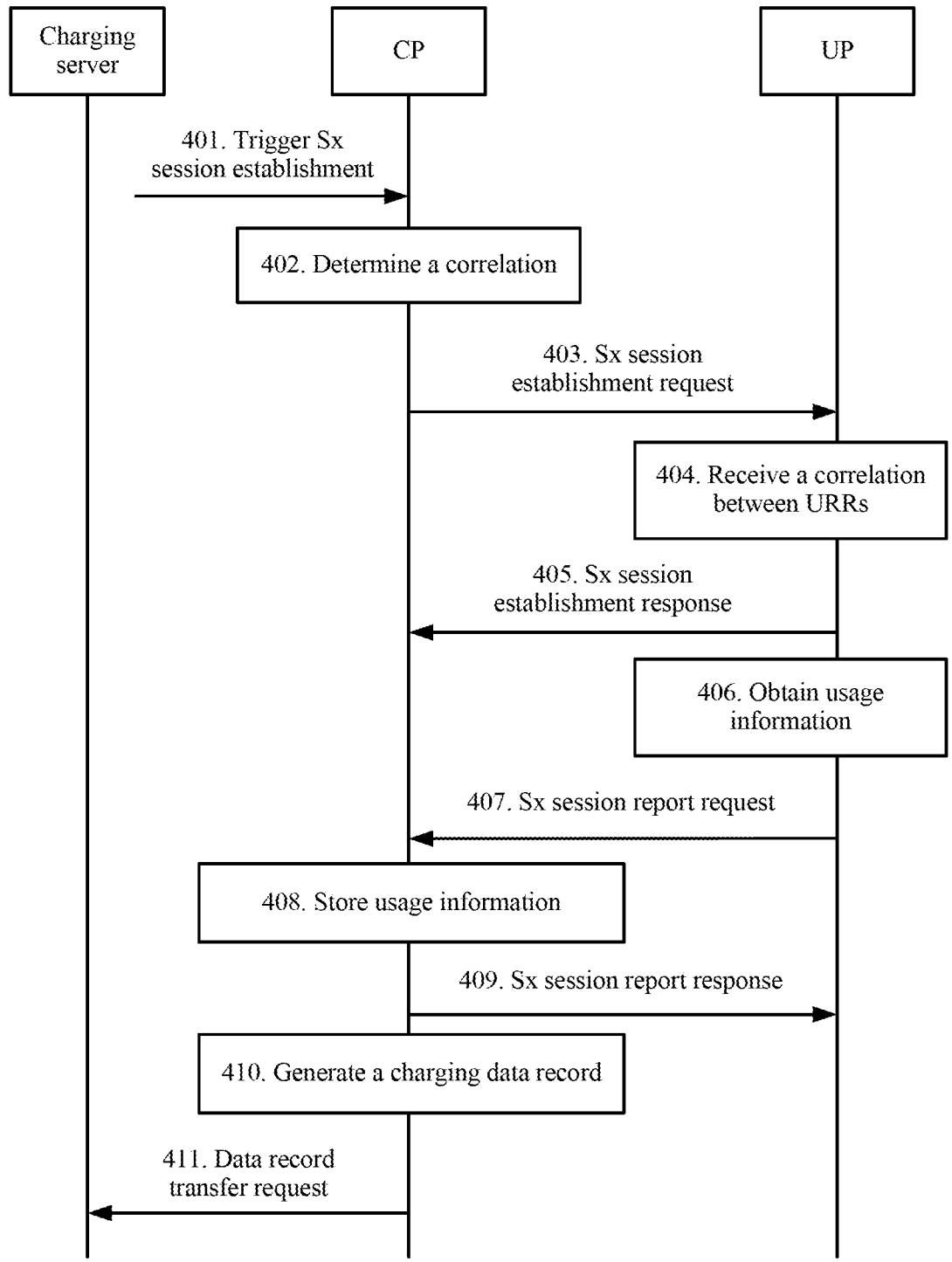
FIG. 4 is a schematic diagram of an embodiment of a charging management method according to this application.

Referring to FIG. 4, an embodiment of a charging management method in an embodiment of this application includes the following steps.

401. A CP receives a trigger request.

The CP is triggered to initiate Sx session establishment. Specifically, a peer CP, or a mobility management entity (MME), or a policy and charging rules function entity (PCRF) may trigger the CP to initiate Sx session establishment.

It may be understood that, in an actual implementation, the CP does not necessarily receive a trigger externally to initiate Sx session establishment. The trigger may also be a trigger in the CP itself. For example, an instruction set is configured in the CP, and when Sx session establishment needs to be initiated, the CP receives a corresponding trigger request. Specifically, a plurality of trigger manners may be available, and are not limited herein.

402. The CP determines a correlation.

The CP allocates a URR ID to each URR, and determines a correlation for a first URR and a second URR that needs to be correlated with the first URR for reporting, where the second URR may be one or more URRs.

In this embodiment, the CP may determine the correlation between the first URR and the second URR in a plurality of manners. Details are hereinafter described separately.

A. The CP configures a corresponding RCS in the first URR:

The CP configures, in the first URR, a list of rule correlation IDs (RCS) corresponding to the first URR, where the list is used to identify a universal set of IDs of second URRs correlated with the first URR.

The list includes one or more rule correlation IDs (RCI) used to identify an ID of each second URR.

B. The CP configures a corresponding RCS in the second URR:

The CP configures, in the second URR, an RCS corresponding to the second URR, where the list is used to identify a universal set of IDs of first URRs correlated with the second URR.

The list includes one or more RCIs used to identify an ID of each first URR.

Several examples are used above only to describe a manner of determining the correlation between the first URR and the second URR by the CP. In an actual implementation, the CP may further determine the correlation between the first URR and the second URR in more manners, for example, may configure an RCS in both the first URR and the second URR, or configure, in a packet detection rule (PDR), the correlation between the first URR and the second URR. This is not specifically limited herein.

In this embodiment, information of the PDR may be shown in the foregoing Table 1. Details are not described again herein.

403. The CP sends an Sx session establishment request to a UP.

The CP sends an Sx session establishment request message to the UP, where the message includes a session identifier, a PDR list, and an FAR list, and may also include a QER list and a URR list.

The URR list includes the first URR and the second URR. In addition, according to a specific manner of determining the correlation between the first URR and the second URR by the CP, an RCS is configured in the first URR, or an RCS is configured in the second URR, or an RCS is configured in both the first URR and the second URR, or the correlation between the first URR and the second URR is configured in the PDR.

In this embodiment, information in the Sx session establishment request may be shown in the following Table 2. It should be noted that, the following Table 2 is merely an example of information in the Sx session establishment request. In an actual implementation, the Sx session establishment request may also include other information. This is not specifically limited herein.

TABLE 2

| Attribute | Presence requirement | Description |
| --- | --- | --- |
| Session ID | Mandatory | Sx session identifier |
| Create PDR | Mandatory | Create PDRs |
| Create FAR | Mandatory | Create FARs |
| Create URR | Optional | Create URRs |
| Create QER | Optional | Create QERs |

404. The UP receives a correlation between URRs.

After receiving the URR list sent by the CP, the UP stores the first URR and the second URR, and analyzes whether the first URR or the second URR includes an RCS. If the first URR or the second URR does not include an RCS, it indicates that the first URR or the second URR is not correlated with another URR.

If the first URR includes an RCS, the UP stores, in a context of the first URR or each second URR, a correlation between the first URR and the second URR corresponding to each RCI in the RCS.

If the second URR includes an RCS, the UP stores, in a context of each first URR or the second URR, a correlation between the second URR and the first URR corresponding to each RCI in the RCS.

It should be noted that, in this embodiment, in step 403, when the CP sends the Sx session establishment request to the UP, the request may include not only the first URR and the second URR, but also the correlation between the first URR and the second URR. In this case, the UP may receive the correlation between the URRs.

In an actual implementation, when the CP sends the Sx session establishment request to the UP, the request may include only the first URR and the second URR, but does not include the correlation between the first URR and the second URR. In this case, the CP further needs to send a correlation indication to the UP, where the correlation indication is used to indicate that the first URR is correlated with the second URR. For example, the correlation indication may be an identifier of the second URR. The UP may obtain the correlation between the URRs after receiving the correlation indication. The correlation indication may be included in an Sx session modification request, or may be included in other signaling, as long as the CP can send the correlation indication to the UP. This is not specifically limited herein.

405. The UP returns an Sx session establishment response to the CP.

After receiving the Sx session establishment request sent by the CP, the UP may return an Sx session establishment response message to the CP.

In this embodiment, no necessary sequence exists between step 404 and step 405. Step 404 may be performed first, or step 405 may be performed first; or step 404 and step 405 may be performed simultaneously. This is not specifically limited herein.

406. The UP obtains usage information.

When usage information (for example, traffic, duration, or an event quantity) accumulated on the UP reaches a threshold of the first URR, the UP may obtain usage information corresponding to the first URR and usage information corresponding to the second URR.

The first URR may have one or more thresholds. When the first URR has only one threshold, the threshold may be one of thresholds such as duration, traffic, or an event quantity. When the threshold is reached, the UP obtains the usage information corresponding to the first URR and the usage information corresponding to the second URR.

When the first URR has a plurality of thresholds, the thresholds may be thresholds such as duration, traffic, or an event quantity. As long as the usage information on the UP reaches any one of the thresholds, the UP obtains the usage information corresponding to the first URR and the usage information corresponding to the second URR.

According to a specific manner of determining the correlation between the first URR and the second URR by the CP, the UP may further search, in a plurality of manners, for whether the second URR correlated with the first URR exists:

The UP may search the context of the first URR to determine whether the second URR correlated with the first URR exists, and if the second URR correlated with the first URR exists, the UP obtains the usage information corresponding to the second URR; or the UP may search contexts of all URRs to determine whether the second URR correlated with the first URR exists, and if the second URR correlated with the first URR exists, the UP obtains the usage information corresponding to the second URR.

In this embodiment, no necessary sequence exists between step 405 and step 406. Step 405 may be performed first, or step 406 may be performed first; or step 405 and step 406 may be performed simultaneously. This is not specifically limited herein.

407. The UP sends an Sx session report request to the CP.

After the UP obtains the usage information corresponding to the first URR and the usage information corresponding to the second URR, the UP may send an Sx session report request message to the CP, where the message includes a URR ID of each URR that requires reporting and/or a measurement key and usage information corresponding to the URR or the measurement key.

In this embodiment, the Sx session report request may include a URR ID, usage information (for example, traffic, duration, or an event quantity), a reporting trigger event (for example, reporting usage information, starting service data flow detection, or ending service data flow detection), a measurement key, and the like.

It should be noted that, in an actual implementation, the Sx session report request may further include other content. This is not specifically limited herein.

In this embodiment, URRs that require reporting are the first URR and the second URR.

408. The CP stores usage information.

After receiving the Sx session report request, the CP may recognize a level of the URR based on the URR ID and/or the measurement key included in the Sx session report request, and store the corresponding usage information in the context.

In this embodiment, the CP may determine, based on the URR ID of the first URR and/or the measurement key, that the first URR is a bearer level URR, and determine, based on the URR ID of the second URR and/or the measurement key, that the second URR is a service data flow level URR.

409. The CP sends an Sx session report response to the UP.

After receiving the Sx session report request sent by the UP, the CP may return an Sx session report response message to the CP.

In this embodiment, no necessary sequence exists between step 408 and step 409. Step 408 may be performed first, or step 409 may be performed first; or step 408 and step 409 may be performed simultaneously. This is not specifically limited herein.

410. The CP generates a charging data record.

The CP generates the charging data record based on the usage information corresponding to the first URR and the usage information corresponding to the second URR.

411. The CP sends a data record transfer request to a charging server.

The CP sends a data record transfer request message to the charging server, where the message includes the charging data record, so that the charging server performs charging.

In this embodiment, the CP sends the first URR and the second URR to the UP using the Sx session establishment request; the UP receives the correlation between the first URR and the second URR, and when the usage information accumulated on the UP reaches the threshold of the first URR, sends, to the CP, the usage information corresponding to the first URR and the usage information corresponding to the second URR, so that the CP can generate a complete charging data record based on the usage information corresponding to the first URR and the usage information corresponding to the second URR.

2. Send the first URR and the second URR in an Sx session modification request.

In this embodiment, a session modification request is after an Sx session establishment request. When the CP sends the first URR and the second URR to the UP, the CP may send the first URR and the second URR to the UP using a combination of the Sx session establishment request and the Sx session modification request, or may send the first URR and the second URR in only the Sx session modification request. Details are hereinafter described separately.

2.1. The CP sends the first URR or does not send the first URR to the UP using an Sx session establishment request.

In this embodiment, the CP sends the first URR or does not send the first URR to the UP using an Sx session establishment request, but sends the first URR and the second URR in a subsequent Sx session modification request to the UP; therefore, the UP uses the second URR as the third URR, and when usage reaches the threshold of the first URR, reports, to the CP, the usage information corresponding to the first URR and the usage information corresponding to the third URR.

Figure 5:
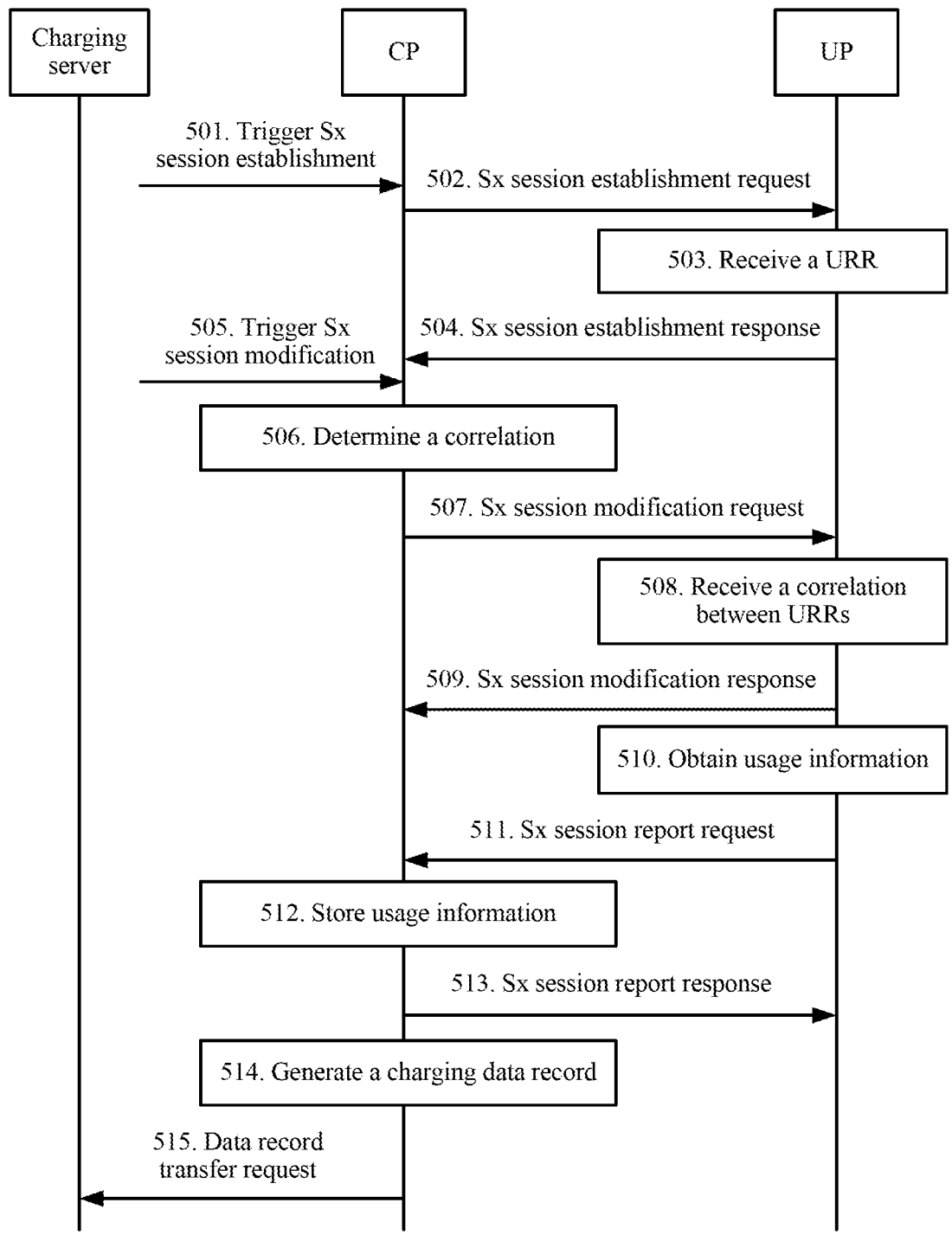
FIG. 5 is a schematic diagram of another embodiment of a charging management method according to this application.

Referring to FIG. 5, an embodiment of a charging management method in an embodiment of this application includes the following steps.

501. A CP receives a trigger request.

Step 501 in this embodiment is similar to step 401 in the embodiment shown in FIG. 4, and is not described again herein.

502. The CP sends an Sx session establishment request to a UP.

The CP sends an Sx session establishment request message to the UP, where the message includes a session identifier, a PDR list, and an FAR list, and may also include a QER list and a URR list.

The URR list includes a first URR, or may not include any URR. In this embodiment, information in the Sx session establishment request may be shown in the foregoing Table 2, and is not described again herein.

503. The UP receives a URR.

After receiving the URR list sent by the CP, the UP stores the first URR.

It should be noted that, if no URR is included when the CP sends the Sx session establishment request to the UP in step 502, step 503 may not be performed.

504. The UP returns an Sx session establishment response to the CP.

After receiving the Sx session establishment request sent by the CP, the UP may return an Sx session establishment response message to the CP.

In this embodiment, no necessary sequence exists between step 503 and step 504. Step 503 may be performed first, or step 504 may be performed first; or step 503 and step 504 may be performed simultaneously. This is not specifically limited herein.

505. The CP receives a trigger request.

The CP is triggered to initiate Sx session modification. Specifically, a peer CP, an MME, or a PCRF may trigger the CP to initiate Sx session modification.

It may be understood that, in an actual implementation, the CP does not necessarily receive a trigger externally to initiate Sx session modification. The trigger may also be a trigger in the CP itself. For example, an instruction set is configured in the CP, and when Sx session modification needs to be initiated, the CP receives a corresponding trigger request. Specifically, a plurality of trigger forms may be available, and are not limited herein.

506. The CP determines a correlation.

Step 506 in this embodiment is similar to step 402 in the embodiment shown in FIG. 4, and is not described again herein.

507. The CP sends an Sx session modification request to the UP.

The CP sends an Sx session modification request message to the UP, where the message includes a session identifier, a PDR list, and an FAR list, and may also include a QER list and a URR list.

The URR list includes a first URR and a second URR. In addition, according to a specific manner of determining a correlation between the first URR and the second URR by the CP, an RCS is configured in the first URR, or an RCS is configured in the second URR, or an RCS is configured in both the first URR and the second URR, or a correlation between the first URR and the second URR is configured in a PDR.

It may be understood that, if the CP sends the first URR in the Sx session establishment request to the UP, this step may not include the first URR, but includes only an identifier of the first URR.

In this embodiment, information in the Sx session modification request may be shown in the following Table 3. It should be noted that, the following table 3 is merely an example of information in the Sx session modification request. In an actual implementation, the Sx session modification request may also include other information. This is not specifically limited herein.

TABLE 3

| Attribute | Presence requirement | Description |
|---|---|---|
| Session ID | Mandatory | Sx session identifier |
| Remove PDR | Optional | Remove one or more PDRs identified in Remove PDR |
| Remove FAR | Optional | Remove one or more FARs identified in Remove FAR |
| Remove URR | Optional | Remove one or more URRs identified in Remove URR |
| Remove QER | Optional | Remove one or more QERs identified in Remove QER |
| Create PDR | Optional | Create one or more PDRs identified in Create PDR |
| Create FAR | Optional | Create one or more FARs identified in Create FAR |
| Create URR | Optional | Create one or more URRs identified in Create URR |
| Create QER | Optional | Create one or more QERs identified in Create QER |
| Update PDR | Optional | Update one or more PDRs identified in Update PDR |
| Update FAR | Optional | Update one or more FARs identified in Update FAR |
| Update URR | Optional | Update one or more URRs identified in Update URR |
| Update QER | Optional | Update one or more QERs identified in Update QER |

508. The UP receives a correlation between URRs.

After receiving the URR list sent by the CP, the UP stores the first URR and the second URR, and analyzes whether the first URR or the second URR includes an RCS. If the first URR or the second URR does not include an RCS, it indicates that the first URR or the second URR is not correlated with another URR.

If the first URR includes an RCS, the UP stores, in a context of the first URR or each second URR, a correlation between the first URR and the second URR corresponding to each RCI in the RCS.

If the second URR includes an RCS, the UP stores, in a context of each first URR or the second URR, a correlation between the second URR and the first URR corresponding to each RCI in the RCS.

It should be noted that, in this embodiment, in step 507, when the CP sends the Sx session modification request to the UP, the request may include not only the first URR and the second URR, but also the correlation between the first URR and the second URR. In this case, the UP may receive the correlation between the URRs.

In an actual implementation, when the CP sends the Sx session modification request to the UP, the request may include only the first URR and the second URR, but does not include the correlation between the first URR and the second URR. In this case, the CP further needs to send a correlation indication to the UP, where the correlation indication is used to indicate that the first URR is correlated with the second URR. For example, the correlation indication may be an identifier of the second URR. The UP may obtain the correlation between the URRs after receiving the correlation indication. The correlation indication may be included in the Sx session modification request, or may be included in other signaling, as long as the CP can send the correlation indication to the UP. This is not specifically limited herein.

509. The UP returns an Sx session modification response to the CP.

After receiving the Sx session modification request sent by the CP, the UP may return an Sx session modification response message to the CP.

In this embodiment, no necessary sequence exists between step 508 and step 509. Step 508 may be performed first, or step 509 may be performed first; or step 508 and step 509 may be performed simultaneously. This is not specifically limited herein.

510. The UP obtains usage information.

Step 510 in this embodiment is similar to step 406 in the embodiment shown in FIG. 4, and is not described again herein.

A third URR in this embodiment is the second URR.

In this embodiment, no necessary sequence exists between step 509 and step 510. Step 509 may be performed first, or step 510 may be performed first; or step 509 and step 510 may be performed simultaneously. This is not specifically limited herein.

Steps 511 to 515 in this embodiment are similar to steps 407 to 411 in the embodiment shown in FIG. 4, and are not described again herein.

In this embodiment, the CP sends the first URR or does not send any URR to the UP using the Sx session establishment request, and sends the first URR or the identifier of the first URR, and the second URR to the UP using the Sx session modification request; therefore, the UP can receive the correlation between the first URR and the second URR, and when usage information accumulated on the UP reaches a threshold of the first URR, sends, to the CP, usage information corresponding to the first URR and usage information corresponding to the second URR, so that the CP can generate a complete charging data record based on the usage information corresponding to the first URR and the usage information corresponding to the second URR.

2.2. The CP sends the first URR and the fifth URR to the UP using an Sx session establishment request:

In this embodiment, the CP sends the first URR and the fifth URR to the UP using an Sx session establishment request, and sends the first URR and the second URR in a subsequent Sx session modification request to the UP. Therefore, the UP updates the fifth URR based on the second URR to obtain the third URR, and when usage reaches the threshold of the first URR, reports, to the CP, the usage information corresponding to the first URR and the usage information corresponding to the third URR.

Figure 6:
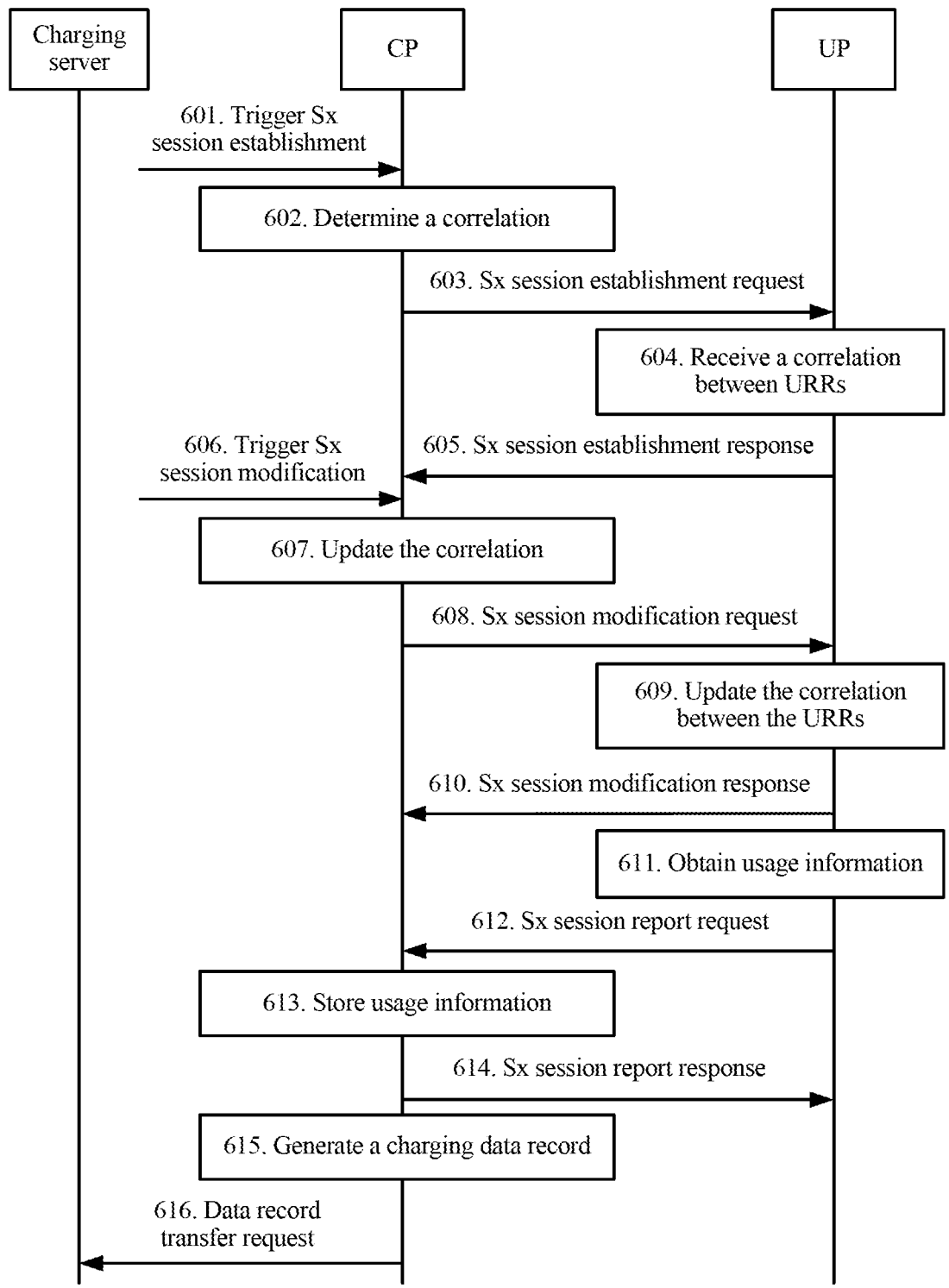
FIG. 6 is a schematic diagram of another embodiment of a charging management method according to this application.

Referring to FIG. 6, an embodiment of a charging management method in an embodiment of this application includes the following steps.

601. A CP receives a trigger request.

Step 601 in this embodiment is similar to step 401 in the embodiment shown in FIG. 4, and is not described again herein.

602. The CP determines a correlation.

The CP allocates a URR ID to each URR, and determines a correlation for a first URR and a fifth URR that needs to be correlated with the first URR for reporting, where the fifth URR may be one or more URRs, or may be a set including a plurality of URRs.

In this embodiment, the CP may determine the correlation between the first URR and the fifth URR in a plurality of manners. Details are hereinafter described separately.

A. The CP configures a corresponding RCS in the first URR as follows.

The CP configures, in the first URR, an RCS corresponding to the first URR, where the list is used to identify a universal set of IDs of fifth URRs correlated with the first URR.

The list includes one or more RCIs used to identify an ID of each fifth URR.

B. The CP configures a corresponding RCS in the fifth URR as follows.

The CP configures, in the fifth URR, an RCS corresponding to the fifth URR, where the list is used to identify a universal set of IDs of first URRs correlated with the fifth URR.

The list includes one or more RCIs used to identify an ID of each first URR.

Several examples are used above only to describe a manner of determining the correlation between the first URR and the fifth URR by the CP. In an actual implementation, the CP may further determine the correlation between the first URR and the fifth URR in more manners, for example, may configure an RCS in both the first URR and the fifth URR, or configure, in a PDR, the correlation between the first URR and the fifth URR. This is not specifically limited herein.

In this embodiment, information of the PDR may be shown in the foregoing Table 1, and is not described again herein.

603. The CP sends an Sx session establishment request to a UP.

The CP sends an Sx session establishment request message to the UP, where the message includes a session identifier, a PDR list, and an FAR list, and may also include a QER list and a URR list.

The URR list includes the first URR and the fifth URR. In addition, according to a specific manner of determining the correlation between the first URR and the fifth URR by the CP, an RCS is configured in the first URR, or an RCS is configured in the fifth URR, or an RCS is configured in both the first URR and the fifth URR, or the correlation between the first URR and the fifth URR is configured in the PDR.

In this embodiment, information in the Sx session establishment request may be shown in the foregoing Table 2, and is not described again herein.

604. The UP receives a correlation between URRs.

After receiving the URR list sent by the CP, the UP stores the first URR and the fifth URR, and analyzes whether the first URR or the fifth URR includes an RCS. If the first URR or the fifth URR does not include an RCS, it indicates that the first URR or the fifth URR is not correlated with another URR.

If the first URR includes an RCS, the UP stores, in a context of the first URR or each fifth URR, a correlation between the first URR and the fifth URR corresponding to each RCI in the RCS.

If the fifth URR includes an RCS, the UP stores, in a context of each first URR or the fifth URR, a correlation between the fifth URR and the first URR corresponding to each RCI in the RCS.

It should be noted that, in this embodiment, in step 603, when the CP sends the Sx session establishment request to the UP, the request may include not only the first URR and the fifth URR, but also the correlation between the first URR and the fifth URR. In this case, the UP may receive the correlation between the URRs.

In an actual implementation, when the CP sends the Sx session establishment request to the UP, the request may include only the first URR and the fifth URR, but does not include the correlation between the first URR and the fifth URR. In this case, the CP further needs to send a correlation indication to the UP, where the correlation indication is used to indicate that the first URR is correlated with the fifth URR. For example, the correlation indication may be an identifier of the fifth URR. The UP may receive the correlation between the URRs after receiving the correlation indication. The correlation indication may be included in an Sx session modification request, or may be included in other signaling, as long as the CP can send the correlation indication to the UP. This is not specifically limited herein.

605. The UP returns an Sx session establishment response to the CP.

Step 605 in this embodiment is similar to step 405 in the embodiment shown in FIG. 4, and is not described again herein.

In this embodiment, no necessary sequence exists between step 604 and step 605. Step 604 may be performed first, or step 605 may be performed first; or step 604 and step 605 may be performed simultaneously. This is not specifically limited herein.

606. The CP receives a trigger request.

Step 606 in this embodiment is similar to step 505 in the embodiment shown in FIG. 5, and is not described again herein.

607. The CP updates the correlation.

In this embodiment, if the CP determines, according to a requirement, that the correlation needs to be adjusted, the CP may update the correlation.

The correlation is updated in a plurality of manners. Details are hereinafter described separately.

a. Configure a universal set as follows.

The CP may configure, in the first URR, an RCS corresponding to the first URR, to identify a universal set of URR IDs currently correlated with the first URR, where an RCI identifies each correlated URR ID.

It should be noted that, if the first URR is no longer correlated with another URR, the first URR does not include any RCI, or Remove Correlation ID is configured in the first URR and used to identify that the first URR is not correlated with another URR.

b. Configure an instruction as follows.

The CP configures an add instruction Create RCS in the first URR, where the instruction is used to identify an ID of a second URR that is correlated with the first URR and needs to be added; and/or the CP configures a remove instruction Remove RCS in the first URR, where the instruction is used to identify an ID of a second URR that is correlated with the first URR and needs to be removed.

Two examples are used above only to describe a process of updating the correlation by the CP. It may be understood that, in an actual implementation, the CP may update the correlation in more manners. This is not specifically limited herein.

In this embodiment, it is assumed that a URR that needs to be updated is the second URR, or the second URR and a fourth URR. In the fifth URR, the second URR may be added, or the second URR is removed, or the second URR is added and the fourth URR is removed.

608. The CP sends an Sx session modification request to the UP.

After updating the correlation, the CP may send the Sx session modification request to the UP based on the updated correlation.

In this embodiment, information in the Sx session modification request may be shown in the foregoing Table 3, and is not described again herein.

609. The UP updates the correlation between the URRs.

After receiving the Sx session modification request sent by the CP, the UP may update the correlation between the URRs based on the information in the Sx session modification request. Specifically, a plurality of updating manners may be available. Details are hereinafter described separately.

a. Perform updating based on a universal set.

In this embodiment, if the CP updates the correlation in a manner of configuring a universal set, the Sx session modification request includes the first URR or an identifier of the first URR, and an RCS is configured in the first URR. In this case, the UP may determine an ID of a URR in the RCS, and therefore determine the second URR or an ID of the second URR.

After determining the second URR or the ID of the second URR, the UP may use the second URR to update the fifth URR to obtain a third URR. A specific updating manner may be as follows.

a1. Determine whether the fifth URR includes the second URR, and if the fifth URR does not include the second URR, add the second URR to the fifth URR to obtain the third URR.

a2. Determine whether a target URR that is not the second URR exists in the fifth URR, and if the target URR exists, remove the target URR from the fifth URR to obtain the third URR. It should be noted that, in addition to removing the target URR, the UP may alternatively remove a correlation between the target URR and the first URR to obtain the third URR.

It should be noted that, if the first URR includes no RCS, or the first URR includes Remove Correlation ID, the UP removes all URRs in the fifth URR, or removes correlations between the first URR and all URRs in the fifth URR.

b. Perform updating according to an instruction as follows.

In this embodiment, if the CP updates the correlation in a manner of configuring an instruction, the Sx session modification request includes an add instruction and/or a remove instruction, and also includes the first URR or the identifier of the first URR, and the second URR or the ID of the second URR, or the second URR or the ID of the second URR and the fourth URR.

According to different instructions, a specific updating manner of the UP may be as follows.

b1. Add as follows.

If the instruction included in the Sx session modification request is an add instruction Create RCS, and the Sx session modification request includes the first URR or the identifier of the first URR, and the second URR or the ID of the second URR, the UP may add the second URR to the fifth URR according to the add instruction to obtain the third URR.

It should be noted that, the UP may obtain the second URR using the Sx session modification request in step 608. In this case, the UP may directly add the second URR to the fifth URR.

In an actual implementation, the UP may also obtain the second URR from the CP in advance using another Sx session modification request. In this case, only the identifier of the second URR needs to be obtained using the Sx session modification request in step 608. The UP may determine the previously stored second URR based on the identifier, and add the second URR to the fifth URR. A specific manner is not limited herein.

b2. Remove as follows.

If the instruction included in the Sx session modification request is a remove instruction Remove RCS, and the Sx session modification request includes the first URR or the identifier of the first URR, and the second URR or the ID of the second URR, the UP may remove the second URR from the fifth URR according to the remove instruction to obtain the third URR, or remove the correlation between the first URR and the second URR in the fifth URR according to the remove instruction to obtain the third URR.

It should be noted that, the UP may obtain the second URR using the Sx session modification request in step 608. In this case, the UP may directly remove the second URR from the fifth URR.

In an actual implementation, the UP may also obtain the second URR from the CP in advance using another Sx session modification request. In this case, only the identifier of the second URR needs to be obtained using the Sx session modification request in step 608. The UP may determine the previously stored second URR based on the identifier, and remove the second URR from the fifth URR or remove the correlation between the second URR and the first URR. A specific manner is not limited herein.

b3. Add and remove as follows.

If the instruction included in the Sx session modification request includes both an add instruction Create RCS and a remove instruction Remove RCS, and the Sx session modification request includes the first URR or the identifier of the first URR, and the second URR or the ID of the second URR and the fourth URR, the UP may add the second URR to the fifth URR according to the add instruction, and remove the fourth URR from the fifth URR according to the remove instruction, or remove a correlation between the first URR and the fourth URR in the fifth URR according to the remove instruction to obtain the third URR.

It should be noted that, the UP may obtain the second URR using the Sx session modification request in step 608. In this case, the UP may directly add the second URR to the fifth URR.

In an actual implementation, the UP may also obtain the second URR from the CP in advance using another Sx session modification request. In this case, only the identifier of the second URR needs to be obtained using the Sx session modification request in step 608. The UP may determine the previously stored second URR based on the identifier, and add the second URR to the fifth URR. A specific manner is not limited herein.

610. The UP returns an Sx session modification response to the CP.

Step 610 in this embodiment is similar to step 509 in the embodiment shown in FIG. 5, and is not described again herein.

In this embodiment, no necessary sequence exists between step 609 and step 610. Step 609 may be performed first, or step 610 may be performed first; or step 609 and step 610 may be performed simultaneously. This is not specifically limited herein.

611. The UP obtains usage information.

When usage information (for example, traffic, duration, or an event quantity) accumulated on the UP reaches a threshold of the first URR, the UP may obtain usage information corresponding to the first URR and usage information corresponding to the third URR.

The third URR in this embodiment is determined after the correlation between the URRs is updated.

The first URR may have one or more thresholds. When the first URR has only one threshold, the threshold may be one of thresholds such as duration, traffic, or an event quantity. When the threshold is reached, the UP obtains the usage information corresponding to the first URR and the usage information corresponding to the third URR.

When the first URR has a plurality of thresholds, the thresholds may be thresholds such as duration, traffic, or an event quantity. As long as the usage information on the UP reaches any one of the thresholds, the UP obtains the usage information corresponding to the first URR and the usage information corresponding to the third URR.

In this embodiment, no necessary sequence exists between step 610 and step 611. Step 610 may be performed first, or step 611 may be performed first; or step 610 and step 611 may be performed simultaneously. This is not specifically limited herein.

612. The UP sends an Sx session report request to the CP.

After the UP obtains the usage information corresponding to the first URR and the usage information corresponding to the third URR, the UP may send an Sx session report request message to the CP, where the message includes a URR ID of each URR that requires reporting and/or a measurement key and usage information corresponding to the URR or the measurement key.

In this embodiment, the Sx session report request may include a URR ID, usage information (for example, traffic, duration, or an event quantity), a reporting trigger event (for example, reporting usage information, starting service data flow detection, or ending service data flow detection), a measurement key, and the like.

It should be noted that, in an actual implementation, the Sx session report request may further include other content. This is not specifically limited herein.

In this embodiment, URRs that require reporting are the first URR and the third URR.

613. The CP stores usage information.

After receiving the Sx session report request, the CP may recognize a level of the URR based on the URR ID and/or the measurement key included in the Sx session report request, and store the corresponding usage information in the context.

In this embodiment, the CP may determine, based on the URR ID of the first URR and/or the measurement key, that the first URR is a bearer level URR, and determine, based on the URR ID of the third URR and/or the measurement key, that the third URR is a service data flow level URR.

614. The CP sends an Sx session report response to the UP.

After receiving the Sx session report request sent by the CP, the UP may return an Sx session report response message to the CP.

In this embodiment, no necessary sequence exists between step 613 and step 614. Step 613 may be performed first, or step 614 may be performed first; or step 613 and step 614 may be performed simultaneously. This is not specifically limited herein.

615. The CP generates a charging data record.

The CP generates the charging data record based on the usage information corresponding to the first URR and the usage information corresponding to the third URR.

616. The CP sends a data record transfer request to a charging server.

Step 616 in this embodiment is similar to step 411 in the embodiment shown in FIG. 4, and is not described again herein.

In this embodiment, the CP sends the first URR and the fifth URR to the UP using the Sx session establishment request, and sends the first URR or the identifier of the first URR, and the second URR to the UP using the Sx session modification request. Therefore, the UP updates the correlation between the URRs based on the information in the Sx session modification request to obtain the third URR, and when the usage information accumulated on the UP reaches the threshold of the first URR, sends, to the CP, the usage information corresponding to the first URR and the usage information corresponding to the third URR, so that the CP can generate a complete charging data record based on the usage information corresponding to the first URR and the usage information corresponding to the third URR.

2.3. The CP sends the first URR to the UP using an Sx session establishment request, and sends the fifth URR in a subsequent Sx session modification request.

In this embodiment, the CP sends the first URR to the UP using an Sx session establishment request, sends the fifth URR in a subsequent first Sx session modification request to the UP, and sends the first URR and the second URR or an identifier of the second URR in a subsequent fourth Sx session modification request to the UP. Therefore, the UP updates the fifth URR based on the second URR to obtain the third URR, and when usage reaches the threshold of the first URR, reports, to the CP, the usage information corresponding to the first URR and the usage information corresponding to the third URR.

Figure 7A:
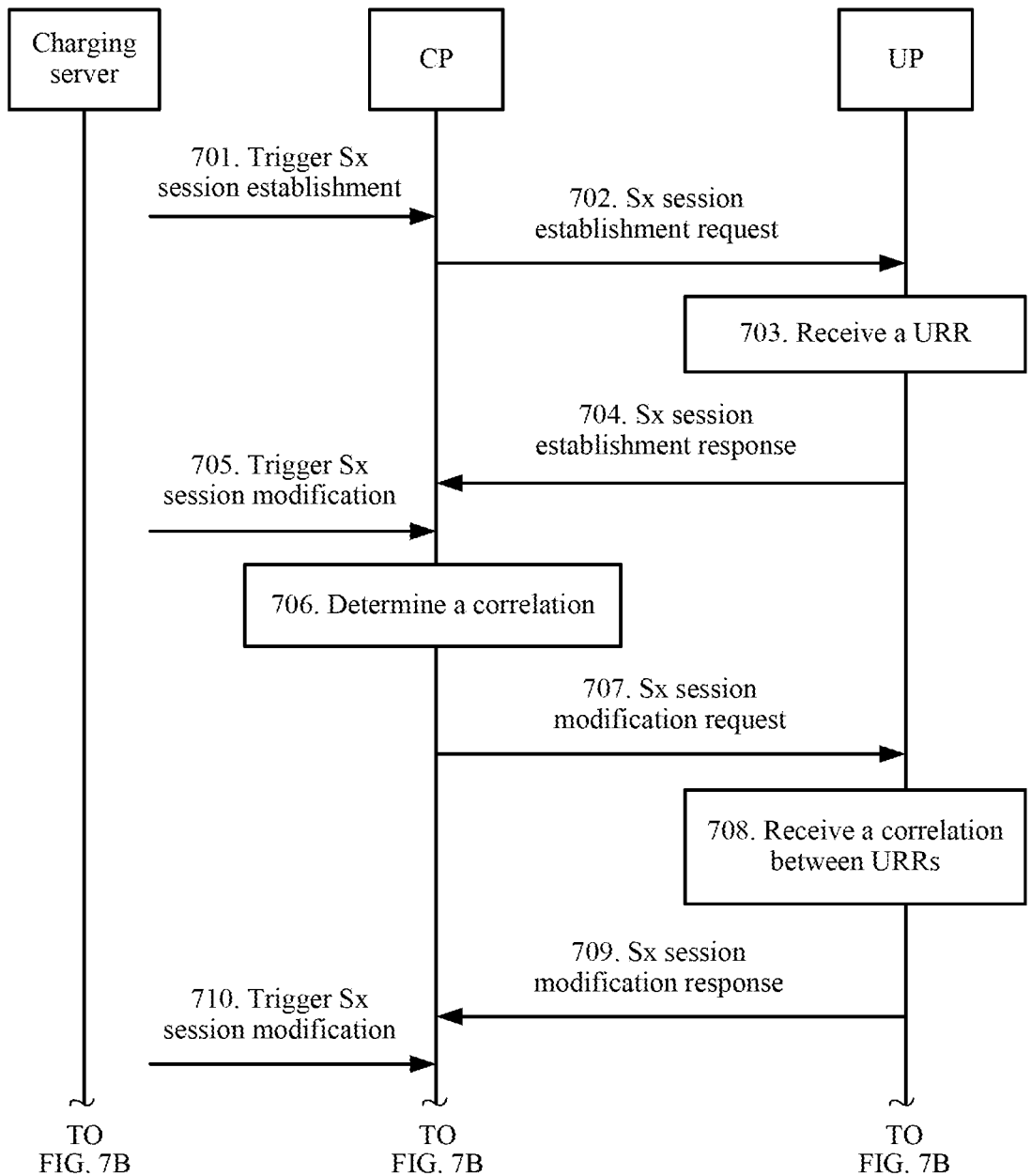
FIG. 7A and FIG. 7B are a schematic diagram of another embodiment of a charging management method according to this application.
Figure 7B:
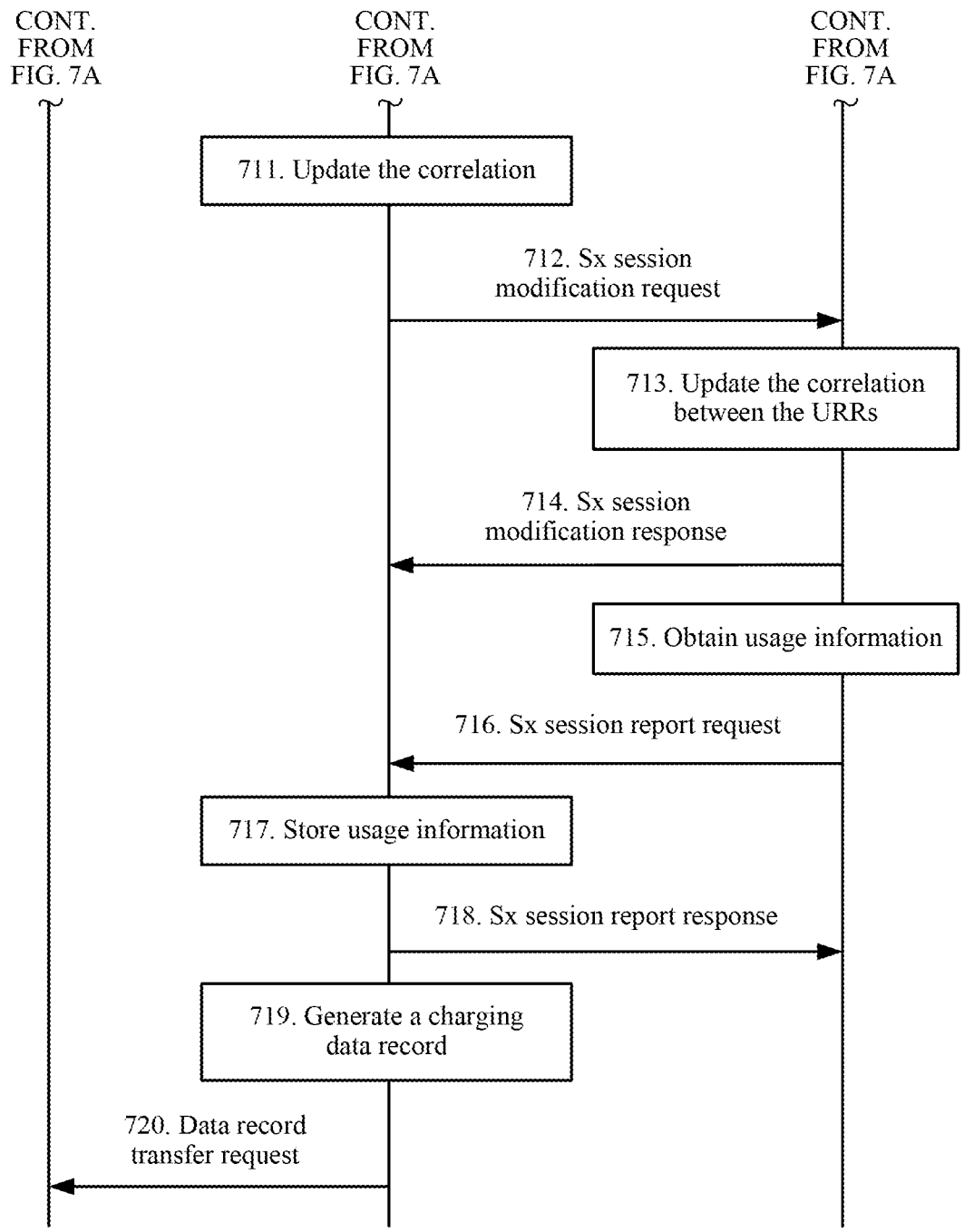

Referring to FIG. 7A and FIG. 7B, an embodiment of a charging management method in an embodiment of this application includes the following steps.

701. A CP receives a trigger request.

Step 701 in this embodiment is similar to step 401 in the embodiment shown in FIG. 4, and is not described again herein.

702. The CP sends an Sx session establishment request to a UP.

The CP sends an Sx session establishment request message to the UP, where the message includes a session identifier, a PDR list, and an FAR list, and may also include a QER list and a URR list.

The URR list includes a first URR. In this embodiment, information in the Sx session establishment request may be shown in the foregoing Table 2, and is not described again herein.

703. The UP receives a URR.

After receiving the URR list sent by the CP, the UP stores the first URR.

704. The UP returns an Sx session establishment response to the CP.

After receiving the Sx session establishment request sent by the CP, the UP may return an Sx session establishment response message to the CP.

In this embodiment, no necessary sequence exists between step 703 and step 704. Step 703 may be performed first, or step 704 may be performed first; or step 703 and step 704 may be performed simultaneously. This is not specifically limited herein.

705. The CP receives a trigger request.

Step 705 in this embodiment is similar to step 505 in the embodiment shown in FIG. 5, and is not described again herein.

706. The CP determines a correlation.

Step 706 in this embodiment is similar to step 602 in the embodiment shown in FIG. 6, and is not described again herein.

707. The CP sends an Sx session modification request to the UP.

The CP sends an Sx session modification request Sx session modification request message to the UP, where the message includes a session identifier, a PDR list, and an FAR list, and may also include a QER list and a URR list.

The URR list includes the first URR or an identifier of the first URR, and a fifth URR. In addition, according to a specific manner of determining a correlation between the first URR and the fifth URR by the CP, an RCS is configured in the first URR, or an RCS is configured in the fifth URR, or an RCS is configured in both the first URR and the fifth URR, or a correlation between the first URR and the fifth URR is configured in a PDR.

In this embodiment, information in the Sx session modification request may be shown in the foregoing Table 3, and is not described again herein.

The Sx session modification request in step 707 in this embodiment is a first Sx session modification request.

708. The UP receives a correlation between URRs.

Step 708 in this embodiment is similar to step 604 in the embodiment shown in FIG. 6, and is not described again herein.

709. The UP returns an Sx session modification response to the CP.

Step 709 in this embodiment is similar to step 509 in the embodiment shown in FIG. 5, and is not described again herein.

In this embodiment, no necessary sequence exists between step 708 and step 709. Step 708 may be performed first, or step 709 may be performed first; or step 708 and step 709 may be performed simultaneously. This is not specifically limited herein.

710. The CP receives a trigger request.

In this embodiment, the CP may be triggered again to initiate Sx session modification. Specifically, a peer CP, an MME, or a PCRF may trigger the CP to initiate Sx session modification.

It may be understood that, in an actual implementation, the CP does not necessarily receive a trigger externally to initiate Sx session modification. The trigger may also be a trigger in the CP itself. For example, an instruction set is configured in the CP, and when Sx session modification needs to be initiated, the CP receives a corresponding trigger request. Specifically, a plurality of trigger forms may be available, and are not limited herein.

Steps 711 to 720 in this embodiment are similar to steps 607 to 616 in the embodiment shown in FIG. 6, and are not described again herein.

The Sx session modification request in step 712 in this embodiment is a fourth Sx session modification request.

In this embodiment, the CP sends the first URR to the UP using the Sx session establishment request, sends the fifth URR in the subsequent first Sx session modification request to the UP, and sends the first URR and the second URR or an identifier of the second URR in the subsequent fourth Sx session modification request to the UP. Therefore, the UP updates the fifth URR based on the second URR to obtain the third URR, and when usage reaches a threshold of the first URR, reports, to the CP, usage information corresponding to the first URR and usage information corresponding to the third URR, so that the CP can generate a complete charging data record based on the usage information corresponding to the first URR and the usage information corresponding to the third URR.

2.4. The CP sends the fifth URR to the UP using an Sx session establishment request, and sends a first URR in a subsequent Sx session modification request as follows.

In this embodiment, the CP sends the fifth URR to the UP using an Sx session establishment request, sends the first URR in a subsequent second Sx session modification request to the UP, and sends the first URR and the second URR or an identifier of the second URR in a subsequent fourth Sx session modification request to the UP. Therefore, the UP updates the fifth URR based on the second URR to obtain the third URR, and when usage reaches the threshold of the first URR, reports, to the CP, the usage information corresponding to the first URR and usage information corresponding to the third URR.

Figure 8A:
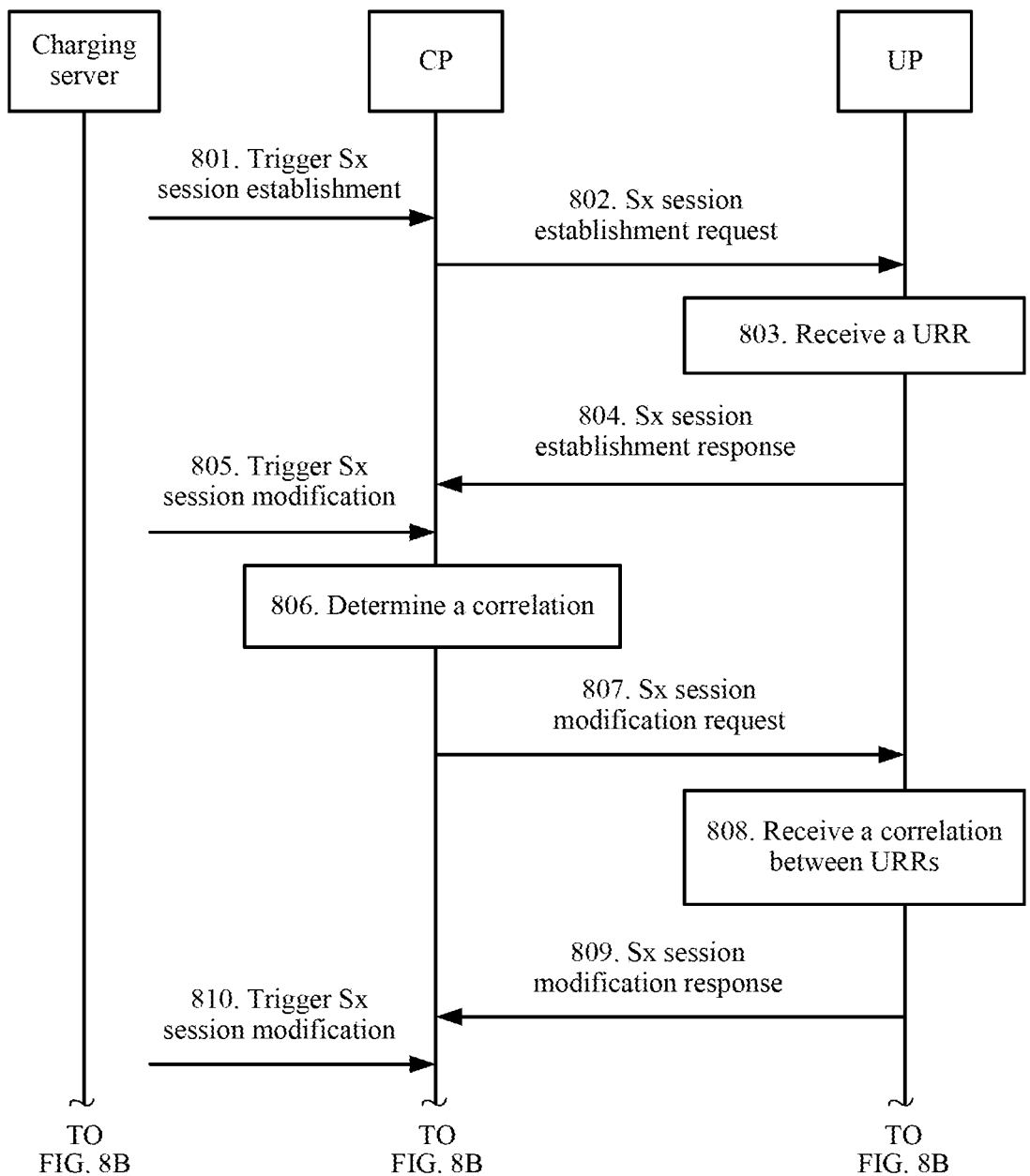
FIG. 8A and FIG. 8B are a schematic diagram of another embodiment of a charging management method according to this application.
Figure 8B:
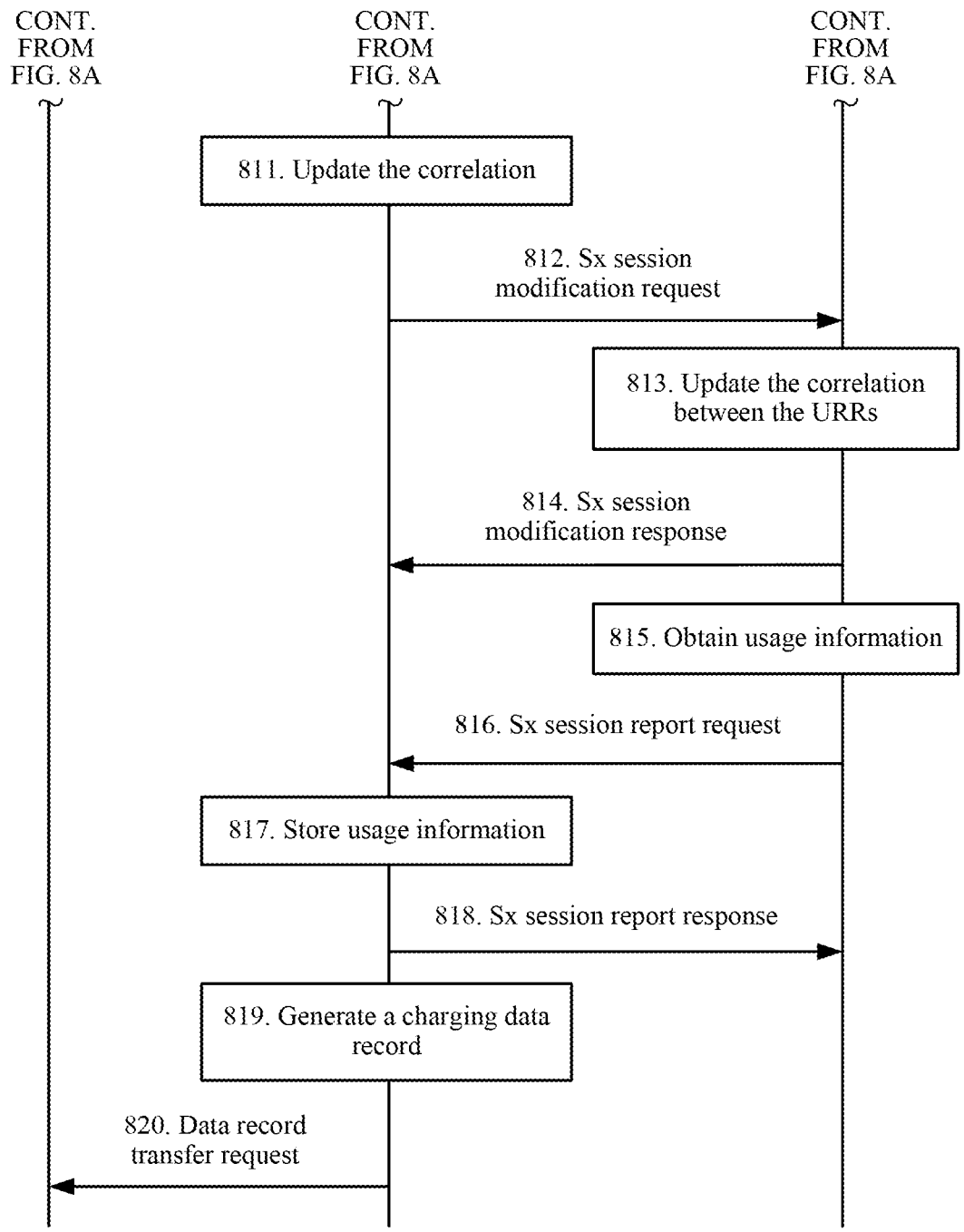

Referring to FIG. 8A and FIG. 8B, an embodiment of a charging management method in an embodiment of this application includes the following steps.

801. A CP receives a trigger request.

Step 801 in this embodiment is similar to step 401 in the embodiment shown in FIG. 4, and is not described again herein.

802. The CP sends an Sx session establishment request to a UP.

The CP sends an Sx session establishment request Sx session establishment request message to the UP, where the message includes a session identifier, a PDR list, and an FAR list, and may also include a QER list and a URR list.

The URR list includes a fifth URR. In this embodiment, information in the Sx session establishment request may be shown in the foregoing Table 2, and is not described again herein.

803. The UP receives a URR.

After receiving the URR list sent by the CP, the UP stores the fifth URR.

804. The UP returns an Sx session establishment response to the CP.

After receiving the Sx session establishment request sent by the CP, the UP may return an Sx session establishment response message to the CP.

In this embodiment, no necessary sequence exists between step 803 and step 804. Step 803 may be performed first, or step 804 may be performed first; or step 803 and step 804 may be performed simultaneously. This is not specifically limited herein.

805. The CP receives a trigger request.

Step 805 in this embodiment is similar to step 505 in the embodiment shown in FIG. 5, and is not described again herein.

806. The CP determines a correlation.

Step 806 in this embodiment is similar to step 602 in the embodiment shown in FIG. 6, and is not described again herein.

807. The CP sends an Sx session modification request to the UP.

The CP sends an Sx session modification request Sx session modification request message to the UP, where the message includes a session identifier, a PDR list, and an FAR list, and may also include a QER list and a URR list.

The URR list includes a first URR, and the fifth URR or an identifier of the fifth URR. In addition, according to a specific manner of determining a correlation between the first URR and the fifth URR by the CP, an RCS is configured in the first URR, or an RCS is configured in the fifth URR, or an RCS is configured in both the first URR and the fifth URR, or a correlation between the first URR and the fifth URR is configured in a PDR.

In this embodiment, information in the Sx session modification request may be shown in the foregoing Table 3, and is not described again herein.

The Sx session modification request in step 807 in this embodiment is a second Sx session modification request.

808. The UP receives a correlation between URRs.

Step 808 in this embodiment is similar to step 604 in the embodiment shown in FIG. 6, and is not described again herein.

809. The UP returns an Sx session modification response to the CP.

Step 809 in this embodiment is similar to step 509 in the embodiment shown in FIG. 5, and is not described again herein.

In this embodiment, no necessary sequence exists between step 808 and step 809. Step 808 may be performed first, or step 809 may be performed first; or step 808 and step 809 may be performed simultaneously. This is not specifically limited herein.

Steps 810 to 820 in this embodiment are similar to steps 710 to 720 in the embodiment shown in FIG. 7A and FIG. 7B, and are not described again herein.

The Sx session modification request in step 812 in this embodiment is a fourth Sx session modification request.

In this embodiment, the CP sends the fifth URR to the UP using the Sx session establishment request, sends the first URR in the subsequent second Sx session modification request to the UP, and sends the first URR and a second URR or an identifier of a second URR in the subsequent fourth Sx session modification request to the UP. Therefore, the UP updates the fifth URR based on the second URR to obtain a third URR, and when usage reaches a threshold of the first URR, reports, to the CP, usage information corresponding to the first URR and usage information corresponding to the third URR, so that the CP can generate a complete charging data record based on the usage information corresponding to the first URR and the usage information corresponding to the third URR.

2.5. The CP does not send any URR to the UP using an Sx session establishment request, and sends the first URR and the fifth URR in a subsequent Sx session modification request:

In this embodiment, the CP does not send any URR to the UP using an Sx session establishment request, sends the first URR and the fifth URR in a subsequent third Sx session modification request to the UP, and sends the first URR or an identifier of the first URR, and the second URR or an identifier of the second URR in a subsequent fourth Sx session modification request to the UP. Therefore, the UP updates the fifth URR based on the second URR to obtain the third URR, and when usage reaches the threshold of the first URR, reports, to the CP, the usage information corresponding to the first URR and the usage information corresponding to the third URR.

Figure 9A:
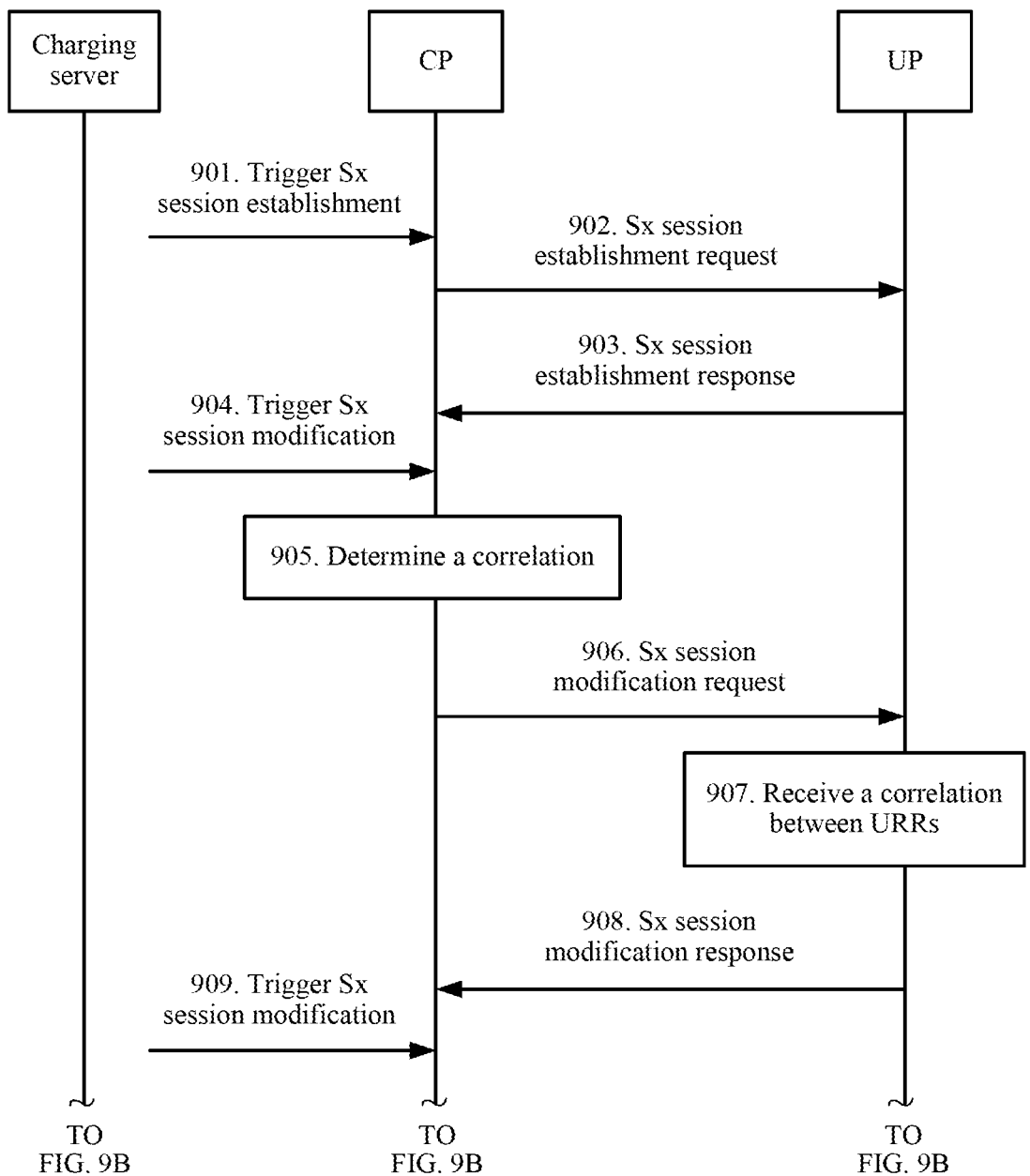
FIG. 9A and FIG. 9B are a schematic diagram of another embodiment of a charging management method according to this application.
Figure 9B:
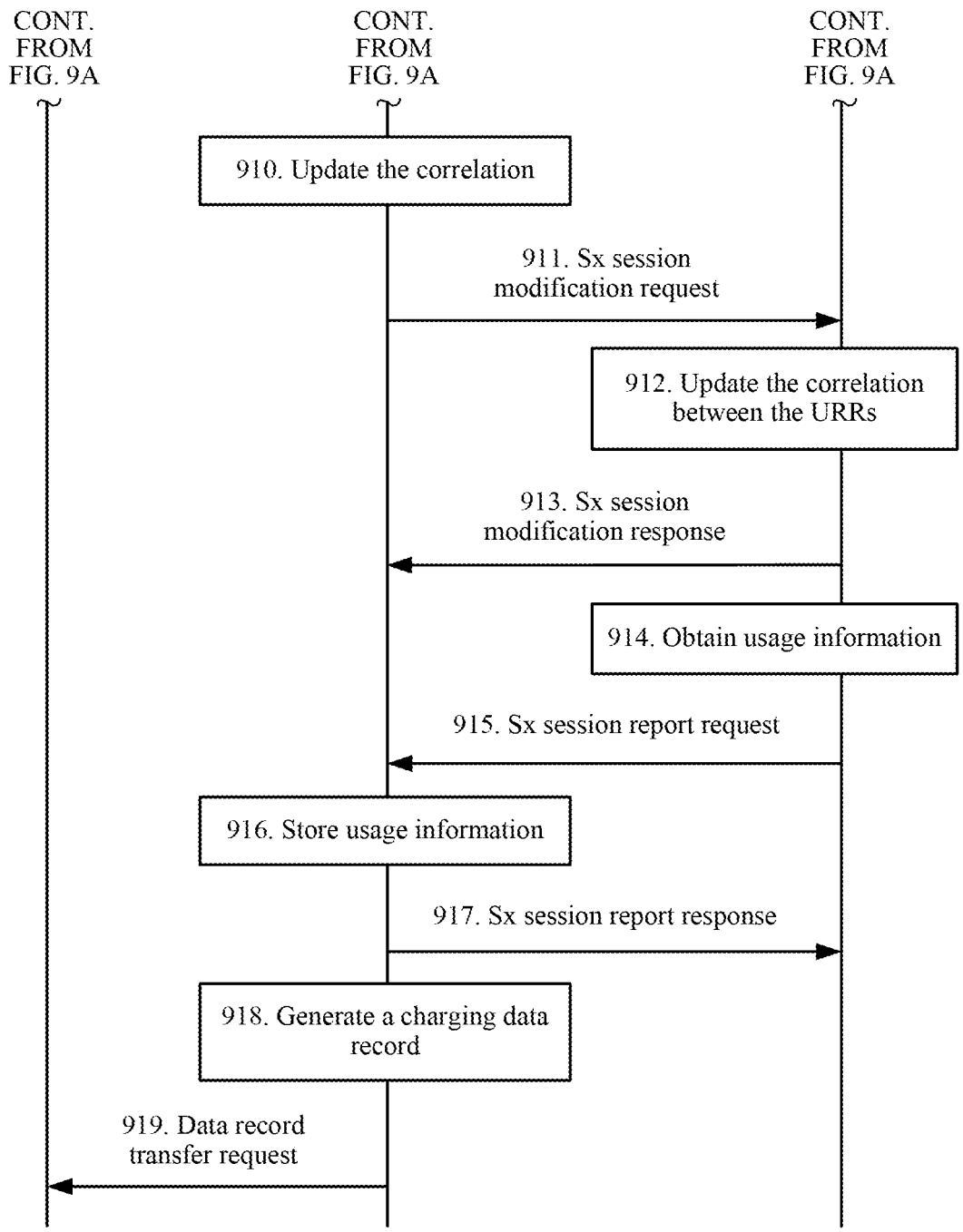

Referring to FIG. 9A and FIG. 9B, an embodiment of a charging management method in an embodiment of this application includes the following steps.

901. A CP receives a trigger request.

Step 901 in this embodiment is similar to step 401 in the embodiment shown in FIG. 4, and is not described again herein.

902. The CP sends an Sx session establishment request to a UP.

The CP sends an Sx session establishment request Sx session establishment request message to the UP, where the message includes a session identifier, a PDR list, and an FAR list, and may also include a QER list and a URR list.

The Sx session establishment request in this embodiment does not include any URR. In this embodiment, information in the Sx session establishment request may be shown in the foregoing Table 2, and is not described again herein.

903. The UP returns an Sx session establishment response to the CP.

After receiving the Sx session establishment request sent by the CP, the UP may return an Sx session establishment response message to the CP.

904. The CP receives a trigger request.

Step 904 in this embodiment is similar to step 505 in the embodiment shown in FIG. 5, and is not described again herein.

905. The CP determines a correlation.

Step 905 in this embodiment is similar to step 602 in the embodiment shown in FIG. 6, and is not described again herein.

906. The CP sends an Sx session modification request to the UP.

The CP sends an Sx session modification request Sx session modification request message to the UP, where the message includes a session identifier, a PDR list, and an FAR list, and may also include a QER list and a URR list.

The URR list includes a first URR and a fifth URR. In addition, according to a specific manner of determining a correlation between the first URR and the fifth URR by the CP, an RCS is configured in the first URR, or an RCS is configured in the fifth URR, or an RCS is configured in both the first URR and the fifth URR, or a correlation between the first URR and the fifth URR is configured in a PDR.

In this embodiment, information in the Sx session modification request may be shown in the foregoing Table 3, and is not described again herein.

It should be noted that, when the CP sends the first URR and the fifth URR to the UP using an Sx session modification request, the CP may add the first URR and the fifth URR to a same Sx session modification request, or add the first URR and the fifth URR to two different Sx session modification requests respectively. If two different Sx session modification requests respectively include the first URR and the fifth URR, an Sx session modification request including the first URR may be sent first, or an Sx session modification request including the fifth URR may be sent first. This is not specifically limited herein.

The Sx session modification request in step 906 in this embodiment is a third Sx session modification request.

Steps 907 to 919 in this embodiment are similar to steps 808 to 820 in the embodiment shown in FIG. 8A and FIG. 8B, and are not described again herein.

An Sx session modification request in step 911 in this embodiment is a fourth Sx session modification request.

In this embodiment, the CP does not send any URR to the UP using the Sx session establishment request, sends the first URR and the fifth URR in the subsequent third Sx session modification request to the UP, and sends the first URR or an identifier of the first URR, and a second URR or an identifier of a second URR in the subsequent fourth Sx session modification request to the UP; therefore, the UP updates the fifth URR based on the second URR to obtain a third URR, and when usage reaches a threshold of the first URR, reports, to the CP, usage information corresponding to the first URR and usage information corresponding to the third URR, so that the CP can generate a complete charging data record based on the usage information corresponding to the first URR and the usage information corresponding to the third URR.

II. The UP perform reporting according to an indication from the CP.

In this embodiment, the CP may send the first URR, or the first URR and the second URR to the UP. When the usage information on the UP reaches the threshold of the first URR, the UP reports, to the CP, the usage information corresponding to the first URR. After receiving the usage information, the CP may query the second URR correlated with the first URR, and send the second URR or a correlation indication to the UP, so that the UP reports usage information corresponding to the second URR.

In an actual implementation, the CP may send a URR in an Sx session establishment request to the UP, or may send a URR in an Sx session modification request to the UP. Details are hereinafter described separately.

1. Send a URR in an Sx session establishment request.

In this embodiment, the CP may send a URR in an Sx session establishment request to the UP, where the sent URR may be the first URR, or may be the first URR and the second URR. Details are hereinafter described separately.

1.1. The CP sends the first URR to the UP using an Sx session establishment request.

In this embodiment, the CP sends the first URR to the UP using an Sx session establishment request, so that when usage reaches a threshold of the first URR, the UP reports, to the CP, the usage information corresponding to the first URR; and then the CP sends the second URR to the UP using an Sx session modification request, so that the UP reports, to the CP, usage information corresponding to the second URR.

Figure 10A:
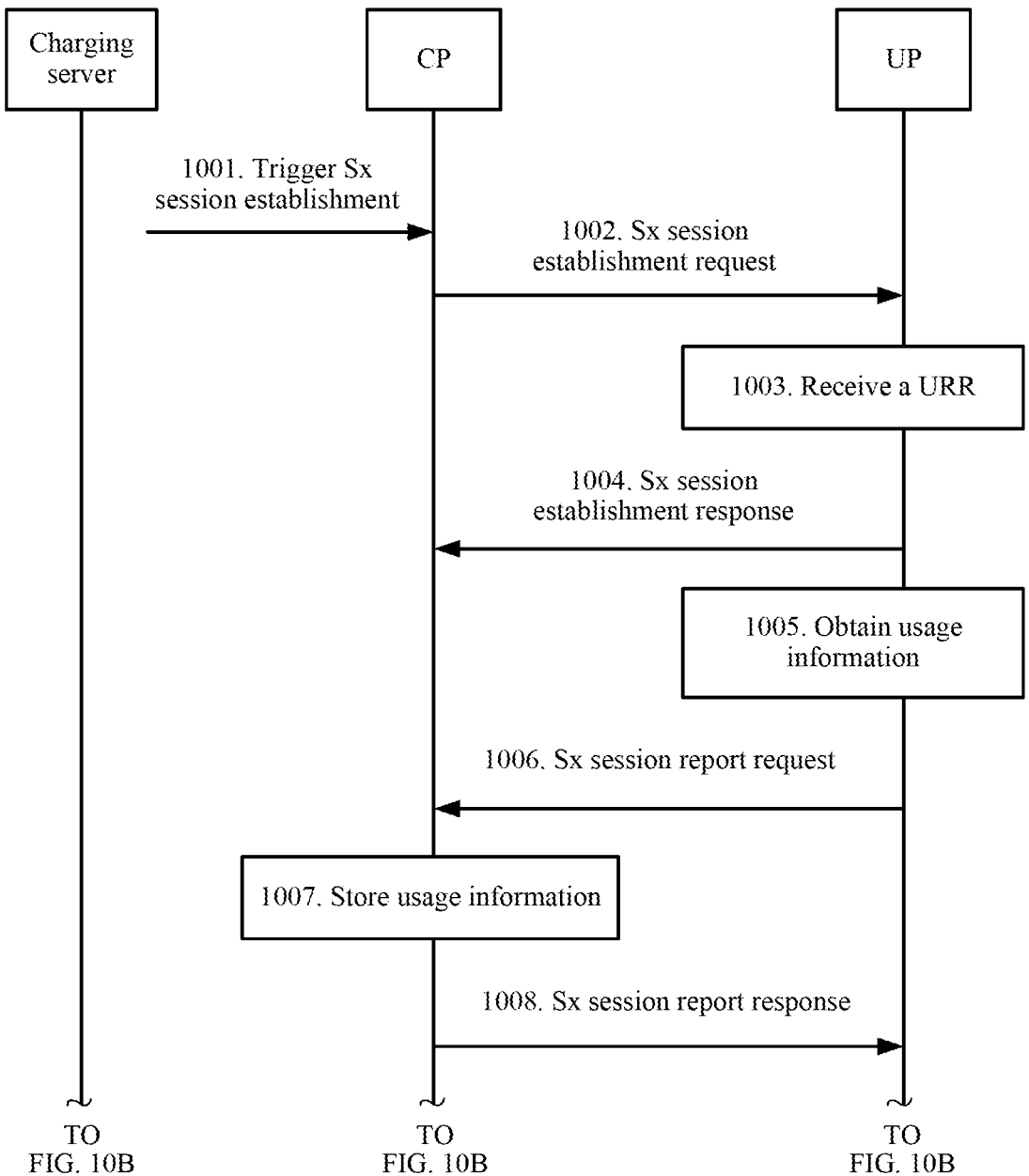
FIG. 10A and FIG. 10B are a schematic diagram of another embodiment of a charging management method according to this application.
Figure 10B:
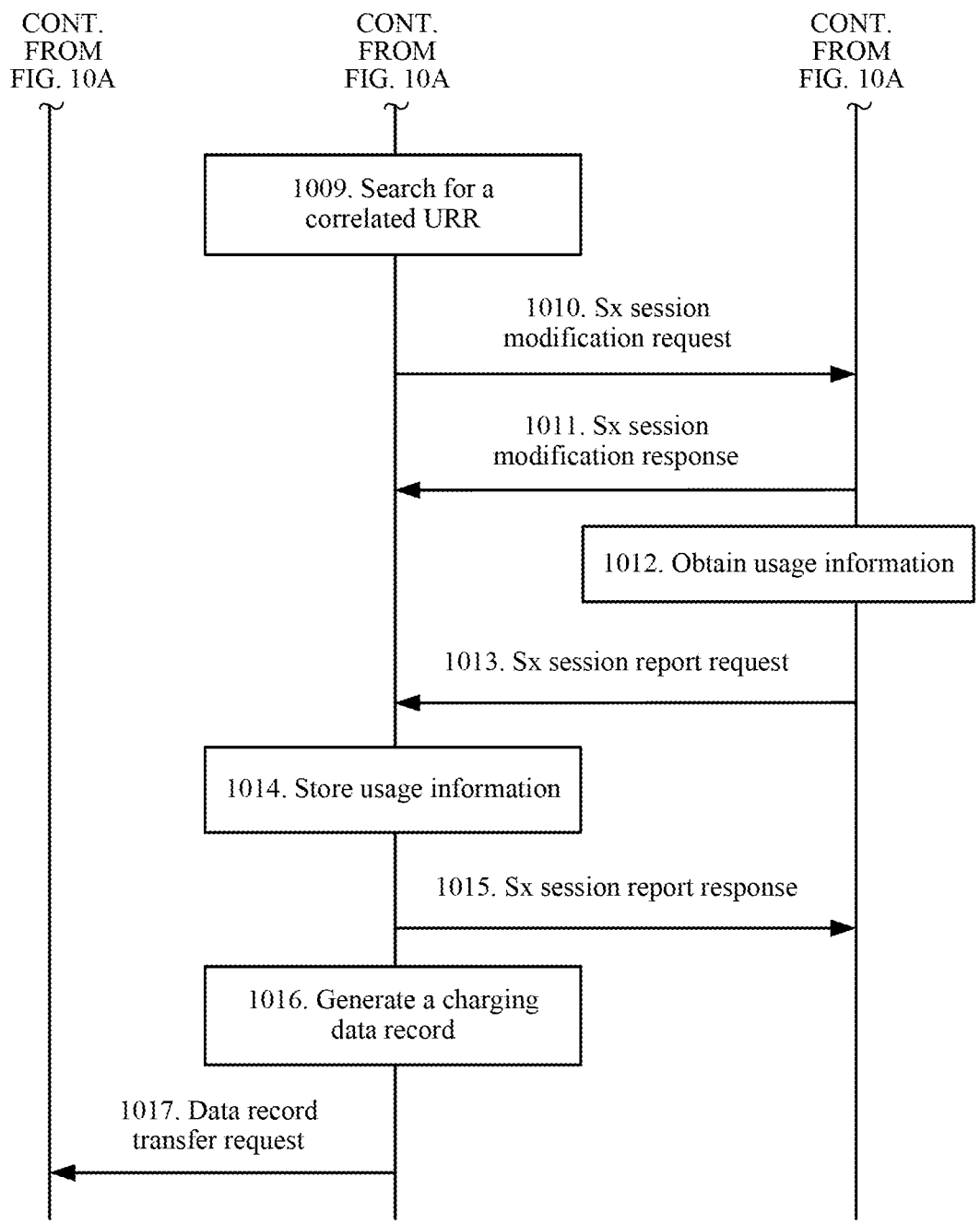

Referring to FIG. 10A and FIG. 10B, an embodiment of a charging management method in an embodiment of this application includes the following steps.

1001. A CP receives a trigger request.

Step 1001 in this embodiment is similar to step 401 in the embodiment shown in FIG. 4, and is not described again herein.

1002. The CP sends an Sx session establishment request to a UP.

The CP sends an Sx session establishment request Sx session establishment request message to the UP, where the message includes a session identifier, a PDR list, and an FAR list, and may also include a QER list and a URR list.

The URR list includes a first URR. In this embodiment, information in the Sx session establishment request may be shown in the foregoing Table 2, and is not described again herein.

1003. The UP receives a URR.

After receiving the URR list sent by the CP, the UP stores the first URR.

1004. The UP returns an Sx session establishment response to the CP.

After receiving the Sx session establishment request sent by the CP, the UP may return an Sx session establishment response message to the CP.

In this embodiment, no necessary sequence exists between step 1003 and step 1004. Step 1003 may be performed first, or step 1004 may be performed first; or step 1003 and step 1004 may be performed simultaneously. This is not specifically limited herein.

1005. The UP obtains usage information.

When usage information (for example, traffic, duration, or an event quantity) accumulated on the UP reaches a threshold of the first URR, the UP may obtain usage information corresponding to the first URR.

The first URR may have one or more thresholds. When the first URR has only one threshold, the threshold may be one of thresholds such as duration, traffic, or an event quantity. When the threshold is reached, the UP obtains the usage information corresponding to the first URR.

When the first URR has a plurality of thresholds, the thresholds may be thresholds such as duration, traffic, or an event quantity. As long as the usage information on the UP reaches any one of the thresholds, the UP obtains the usage information corresponding to the first URR.

In this embodiment, no necessary sequence exists between step 1004 and step 1005. Step 1004 may be performed first, or step 1005 may be performed first; or step 1004 and step 1005 may be performed simultaneously. This is not specifically limited herein.

1006. The UP sends an Sx session report request to the CP.

After obtaining the usage information corresponding to the first URR, the UP may send an Sx session report request Sx session report request message to the CP, where the message includes a URR ID of the first URR and/or a measurement key and usage information corresponding to the URR or the measurement key.

In this embodiment, the Sx session report request may include a URR ID, usage information (for example, traffic, duration, or an event quantity), a reporting trigger event (for example, reporting usage information, starting service data flow detection, or ending service data flow detection), a measurement key, and the like.

It should be noted that, in an actual implementation, the Sx session report request may further include other content. This is not specifically limited herein.

1007. The CP stores usage information.

After receiving the Sx session report request, the CP may recognize a level of the URR based on the URR ID and/or the measurement key included in the Sx session report request, and store the corresponding usage information in a context.

In this embodiment, the CP may determine, based on the URR ID of the first URR and/or the measurement key, that the first URR is a bearer level URR.

1008. The CP sends an Sx session report response to the UP.

After receiving the Sx session report request sent by the CP, the UP may return an Sx session report response message to the CP.

In this embodiment, no necessary sequence exists between step 1007 and step 1008. Step 1007 may be performed first, or step 1008 may be performed first; or step 1007 and step 1008 may be performed simultaneously. This is not specifically limited herein.

1009. The CP searches for a correlated URR.

The CP searches for a second URR correlated with the first URR in a context of the first URR.

In this embodiment, the CP may predetermine a correlation between URRs. A determining process may be similar to step 402 in the embodiment shown in FIG. 4, and is not described again herein.

It should be noted that, after determining the correlation between the URRs, the CP may further update the correlation. An updating process is similar to step 607 in the embodiment shown in FIG. 6, and is not described again herein.

1010. The CP sends an Sx session modification request to the UP.

After finding the second URR, the CP may send the Sx session modification request to the UP, where the Sx session modification request includes the second URR.

In this embodiment, information in the Sx session modification request may be shown in the foregoing Table 3, and is not described again herein.

It should be noted that, before sending the Sx session modification request to the UP, the CP may also receive a trigger request. A specific trigger manner may be similar to step 505 in the embodiment shown in FIG. 5, and is not described again herein.

The Sx session modification request sent by the CP may include a plurality of URRs, or may include only the second URR. If a plurality of URRs are included, the plurality of URRs may include other URRs, and therefore, the CP needs to tell the UP how to recognize which URR is the second URR, so as to report usage information in time. The CP tells the UP in a plurality of manners. The UP may recognize the second URR using an identifier configured in the second URR, or an identifier configured out of the second URR.

A specific identifier may be an indication identifier used to indicate that the URR is the second URR, or is a reporting time identifier used to indicate a time at which the usage information corresponding to the second URR needs to be reported, or is another identifier. This is not specifically limited herein.

1011. The UP returns an Sx session modification response to the CP.

Step 1001 in this embodiment is similar to step 509 in the embodiment shown in FIG. 5, and is not described again herein.

It should be noted that, if the Sx session modification request received by the UP includes a plurality of URRs, the UP further needs to determine an identifier in the Sx session modification request, where the identifier may be included in the second URR or out of the second URR.

A specific identifier may be an indication identifier used to indicate that the URR is the second URR, or is a reporting time identifier used to indicate a time at which the usage information corresponding to the second URR needs to be reported, or is another identifier. This is not specifically limited herein.

1012. The UP obtains usage information.

After receiving the Sx session modification request, the UP determines the second URR from the Sx session modification request, and obtains, according to the indication from the CP, the usage information corresponding to the second URR.

1013. The UP sends an Sx session report request to the CP.

After obtaining the usage information corresponding to the second URR, the UP may send an Sx session report request Sx session report request message to the CP, where the message includes a URR ID of the second URR and/or a measurement key and usage information corresponding to the URR or the measurement key.

In this embodiment, the Sx session report request may include a URR ID, usage information (for example, traffic, duration, or an event quantity), a reporting trigger event (for example, reporting usage information, starting service data flow detection, or ending service data flow detection), a measurement key, and the like.

It should be noted that, in an actual implementation, the Sx session report request may further include other content. This is not specifically limited herein.

1014. The CP stores usage information.

After receiving the Sx session report request, the CP may recognize a level of the URR based on the URR ID and/or the measurement key included in the Sx session report request, and store the corresponding usage information in a context.

In this embodiment, the CP may determine, based on the URR ID of the second URR and/or the measurement key, that the second URR is a service data flow level URR.

1015. The CP sends an Sx session report response to the UP.

After receiving the Sx session report request sent by the CP, the UP may return an Sx session report response message to the CP.

In this embodiment, no necessary sequence exists between step 1014 and step 1015. Step 1014 may be performed first, or step 1015 may be performed first; or step 1014 and step 1015 may be performed simultaneously. This is not specifically limited herein.

1016. The CP generates a charging data record.

The CP generates the charging data record based on the usage information corresponding to the first URR and the usage information corresponding to the second URR.

1017. The CP sends a data record transfer request to a charging server.

Step 1017 in this embodiment is similar to step 411 in the embodiment shown in FIG. 4, and is not described again herein.

In this embodiment, the CP sends the first URR to the UP using the Sx session establishment request, so that when usage reaches the threshold of the first URR, the UP reports, to the CP, the usage information corresponding to the first URR; and then the CP sends the second URR to the UP using the Sx session modification request, so that the UP reports, to the CP, the usage information corresponding to the second URR, and that the CP can generate a complete charging data record based on the usage information corresponding to the first URR and the usage information corresponding to the second URR.

1.2. The CP sends the first URR and the second URR to the UP using an Sx session establishment request:

In this embodiment, the CP sends the first URR and the second URR to the UP using an Sx session establishment request, so that when usage reaches a threshold of the first URR, the UP reports, to the CP, the usage information corresponding to the first URR; and then the CP sends a correlation indication to the UP using an Sx session modification request, so that the UP reports, to the CP, usage information corresponding to the second URR.

Figure 11A:
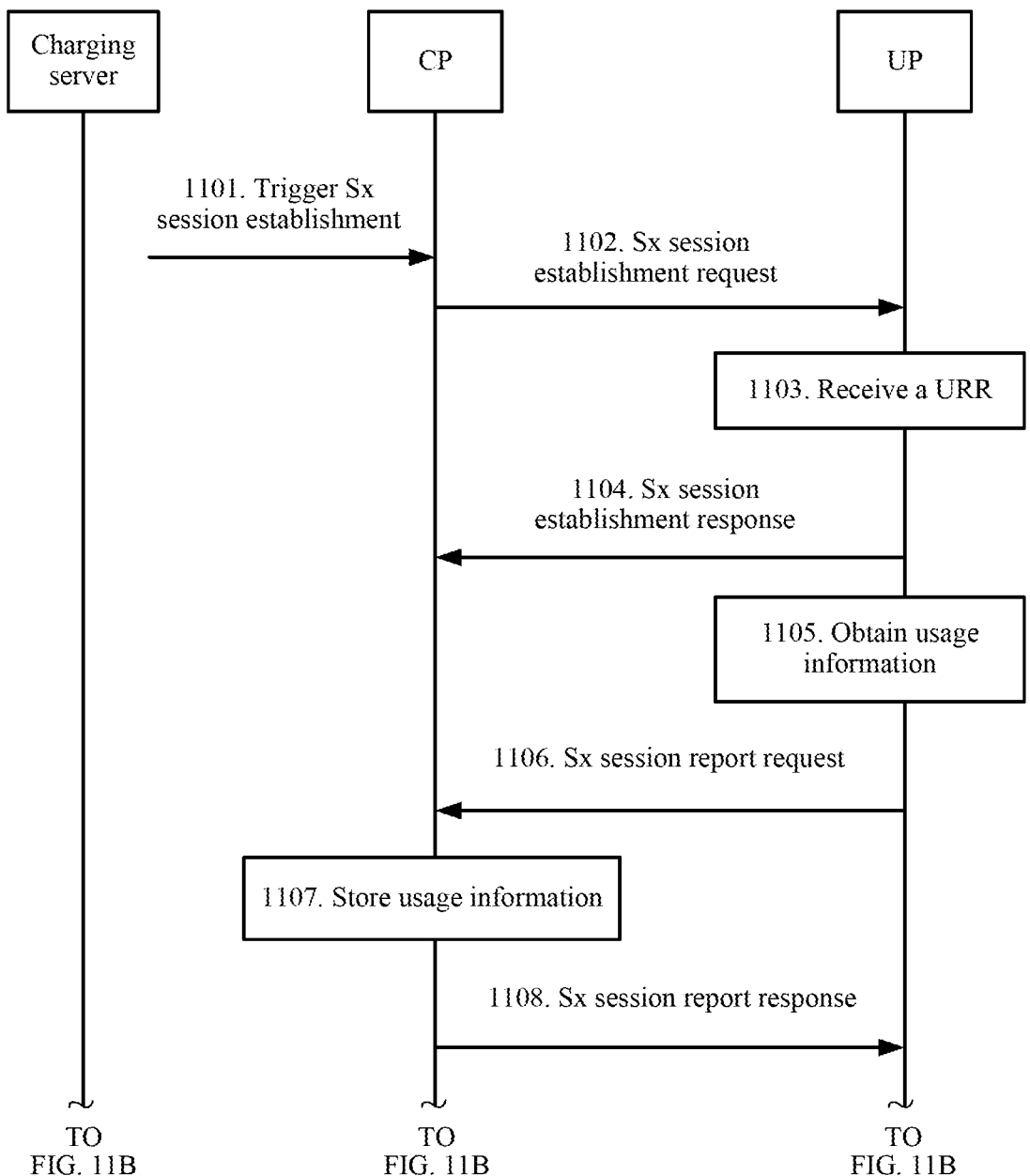
FIG. 11A and FIG. 11B are a schematic diagram of another embodiment of a charging management method according to this application.
Figure 11B:
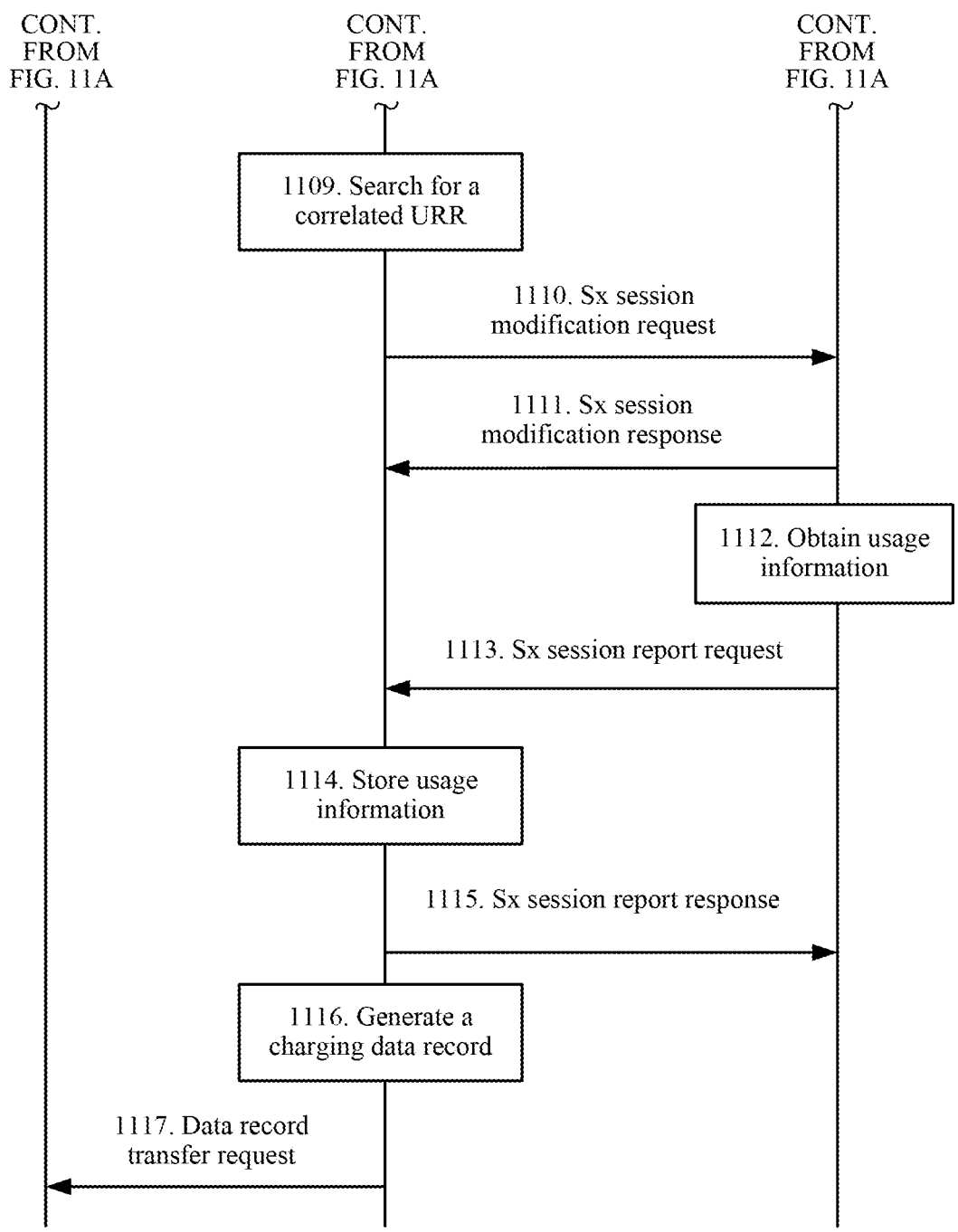

Referring to FIG. 11A and FIG. 11B, an embodiment of a charging management method in an embodiment of this application includes the following steps.

1101. A CP receives a trigger request.

Step 1101 in this embodiment is similar to step 401 in the embodiment shown in FIG. 4, and is not described again herein.

1102. The CP sends an Sx session establishment request to a UP.

The CP sends an Sx session establishment request Sx session establishment request message to the UP, where the message includes a session identifier, a PDR list, and an FAR list, and may also include a QER list and a URR list.

The URR list includes a first URR and a second URR. In this embodiment, information in the Sx session establishment request may be shown in the foregoing Table 2, and is not described again herein.

1103. The UP receives a URR.

After receiving the URR list sent by the CP, the UP stores the first URR and the second URR.

In this embodiment, the Sx session establishment request sent by the CP includes only the first URR and the second URR, but does not include a correlation between the first URR and the second URR. Therefore, although the UP stores the first URR and the second URR, the UP does not know whether the first URR is correlated with the second URR.

1104. The UP returns an Sx session establishment response to the CP.

After receiving the Sx session establishment request sent by the CP, the UP may return an Sx session establishment response message to the CP.

In this embodiment, no necessary sequence exists between step 1103 and step 1104. Step 1103 may be performed first, or step 1104 may be performed first; or step 1103 and step 1104 may be performed simultaneously. This is not specifically limited herein.

Steps 1105 to 1109 in this embodiment are similar to steps 1005 to 1009 in the embodiment shown in FIG. 10A and FIG. 10B, and are not described again herein.

1110. The CP sends an Sx session modification request to the UP.

After finding the second URR, the CP may send the Sx session modification request to the UP, where the Sx session modification request includes a correlation indication, and the correlation indication may be an ID of the second URR, or a specific identifier, used to indicate that the first URR is correlated with the second URR. A specific manner is not limited herein.

In this embodiment, information in the Sx session modification request may be shown in the foregoing Table 3, and is not described again herein.

It should be noted that, before sending the Sx session modification request to the UP, the CP may also receive a trigger request. A specific trigger manner may be similar to step 505 in the embodiment shown in FIG. 5, and is not described again herein.

1111. The UP returns an Sx session modification response to the CP.

Step 1111 in this embodiment is similar to step 509 in the embodiment shown in FIG. 5, and is not described again herein.

It should be noted that, after obtaining the correlation indication from the Sx session modification request, the UP may learn the second URR correlated with the first URR.

The UP receives the first URR and the second URR from the CP using the Sx session establishment request, and after learning the second URR, may find the second URR locally.

Steps 1112 to 1117 in this embodiment are similar to steps 1012 to 1017 in the embodiment shown in FIG. 10A and FIG. 10B, and are not described again herein.

In this embodiment, the CP sends the first URR and the second URR to the UP using the Sx session establishment request, so that when usage reaches a threshold of the first URR, the UP reports, to the CP, usage information corresponding to the first URR; and then the CP sends the correlation indication to the UP using the Sx session modification request, so that the UP reports, to the CP, usage information corresponding to the second URR, and that the CP can generate a complete charging data record based on the usage information corresponding to the first URR and the usage information corresponding to the second URR.

2. Send a URR in an Sx session modification request as follows.

In this embodiment, the CP may send a URR in an Sx session modification request to the UP, where the sent URR may be the first URR, or may be the first URR and the second URR. Details are hereinafter described separately.

2.1. The CP sends the first URR to the UP using an Sx session modification request as follows.

In this embodiment, the CP sends the first URR to the UP using an Sx session modification request, so that when usage reaches a threshold of the first URR, the UP reports, to the CP, the usage information corresponding to the first URR; and then the CP sends the second URR to the UP using an Sx session modification request again, so that the UP reports, to the CP, usage information corresponding to the second URR.

Figure 12A:
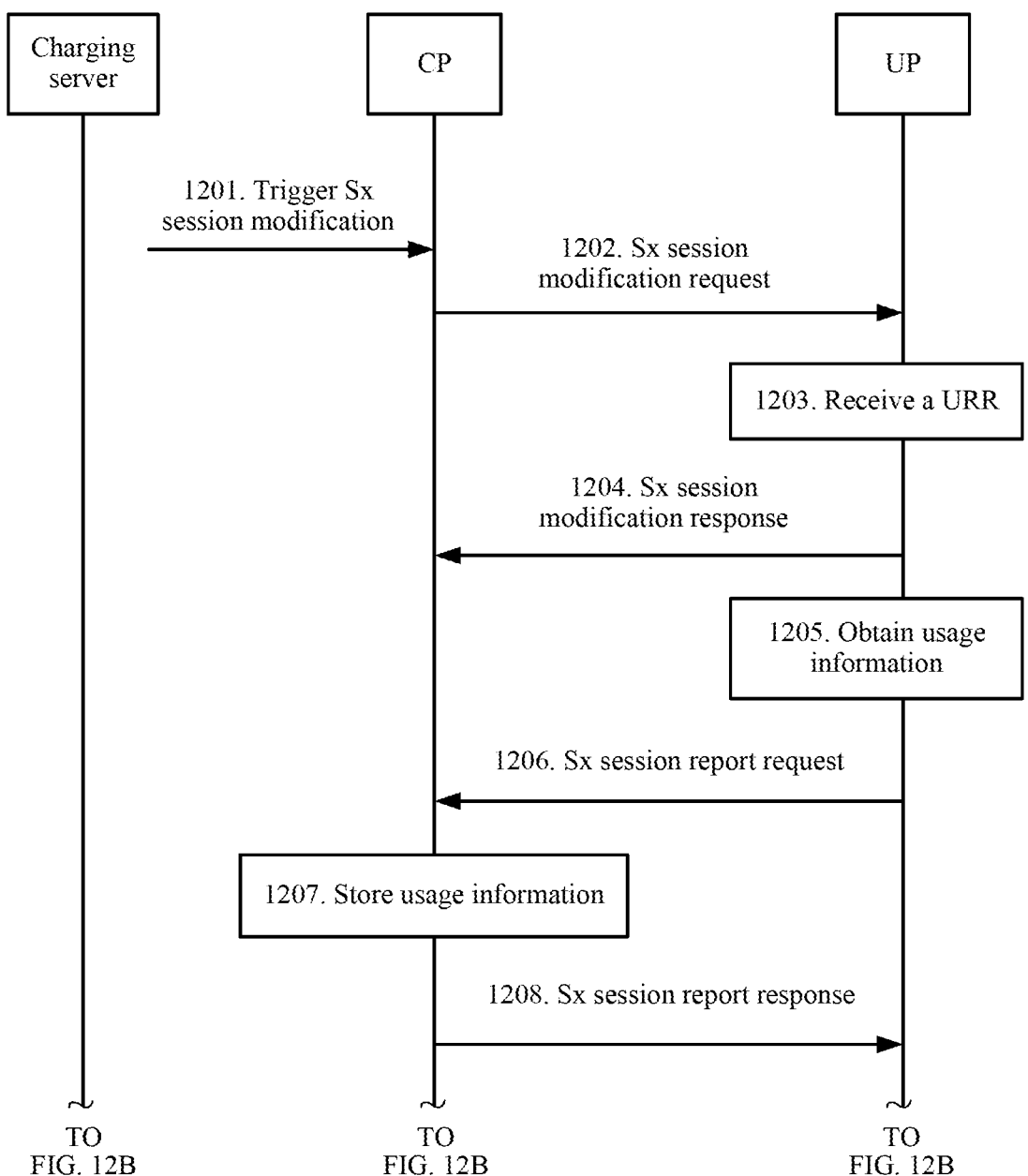
FIG. 12A and FIG. 12B are a schematic diagram of another embodiment of a charging management method according to this application.
Figure 12B:
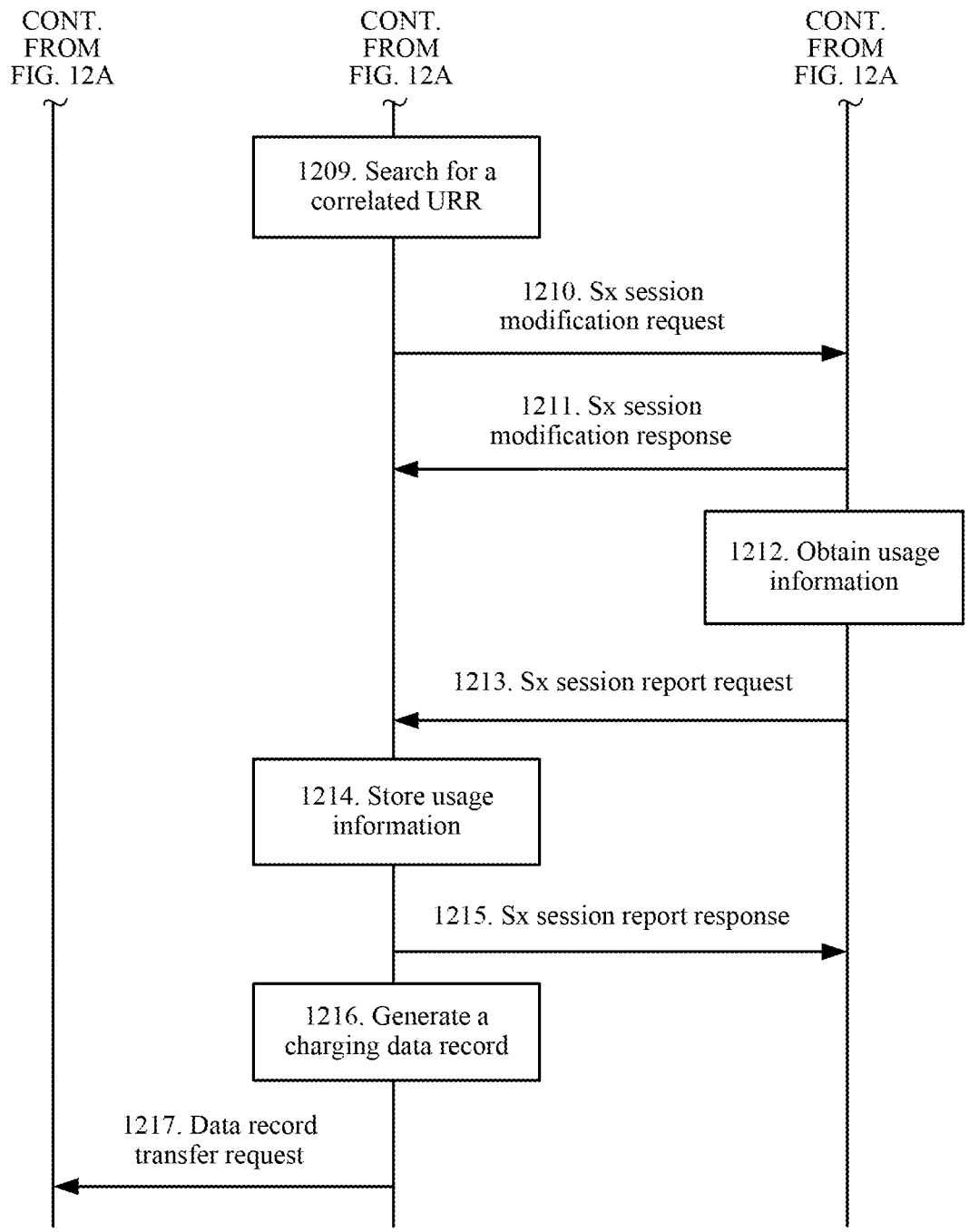

Referring to FIG. 12A and FIG. 12B, an embodiment of a charging management method in an embodiment of this application includes the following steps.

1201. A CP receives a trigger request.

Step 1201 in this embodiment is similar to step 505 in the embodiment shown in FIG. 5, and is not described again herein.

1202. The CP sends an Sx session modification request to a UP.

The CP sends an Sx session modification request Sx session modification request message to the UP, where the message includes a session identifier, a PDR list, and an FAR list, and may also include a QER list and a URR list.

The URR list includes a first URR. In this embodiment, information in the Sx session modification request may be shown in the foregoing Table 3, and is not described again herein.

1203. The UP receives a URR.

After receiving the URR list sent by the CP, the UP stores the first URR.

1204. The UP returns an Sx session modification response to the CP.

After receiving the Sx session modification request sent by the CP, the UP may return an Sx session modification response message to the CP.

In this embodiment, no necessary sequence exists between step 1203 and step 1204. Step 1203 may be performed first, or step 1204 may be performed first; or step 1203 and step 1204 may be performed simultaneously. This is not specifically limited herein.

Steps 1205 to 1217 in this embodiment are similar to steps 1005 to 1017 in the embodiment shown in FIG. 10A and FIG. 10B, and are not described again herein.

In this embodiment, the CP sends the first URR to the UP using the Sx session modification request, so that when usage reaches a threshold of the first URR, the UP reports, to the CP, usage information corresponding to the first URR; and then the CP sends the second URR to the UP using the Sx session modification request again, so that the UP reports, to the CP, usage information corresponding to the second URR, and that the CP can generate a complete charging data record based on the usage information corresponding to the first URR and the usage information corresponding to the second URR.

2.2. The CP sends the first URR and the second URR to the UP using an Sx session modification request as follows.

In this embodiment, the CP sends the first URR and the second URR to the UP using an Sx session modification request, so that when usage reaches a threshold of the first URR, the UP reports, to the CP, the usage information corresponding to the first URR; and then the CP sends a correlation indication to the UP using an Sx session modification request again, so that the UP reports, to the CP, usage information corresponding to the second URR.

Figure 13A:
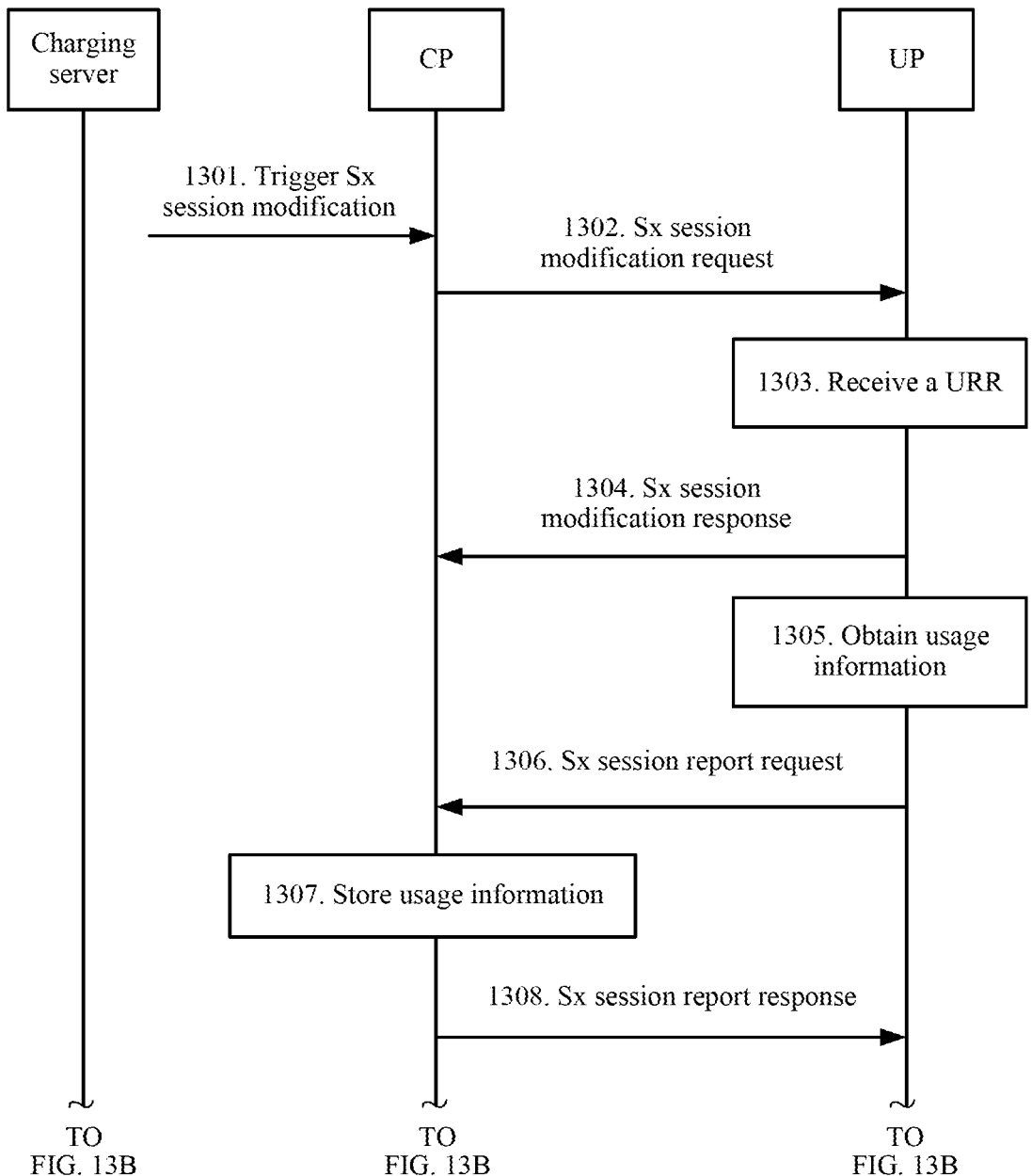
FIG. 13A and FIG. 13B are a schematic diagram of another embodiment of a charging management method according to this application.
Figure 13B:
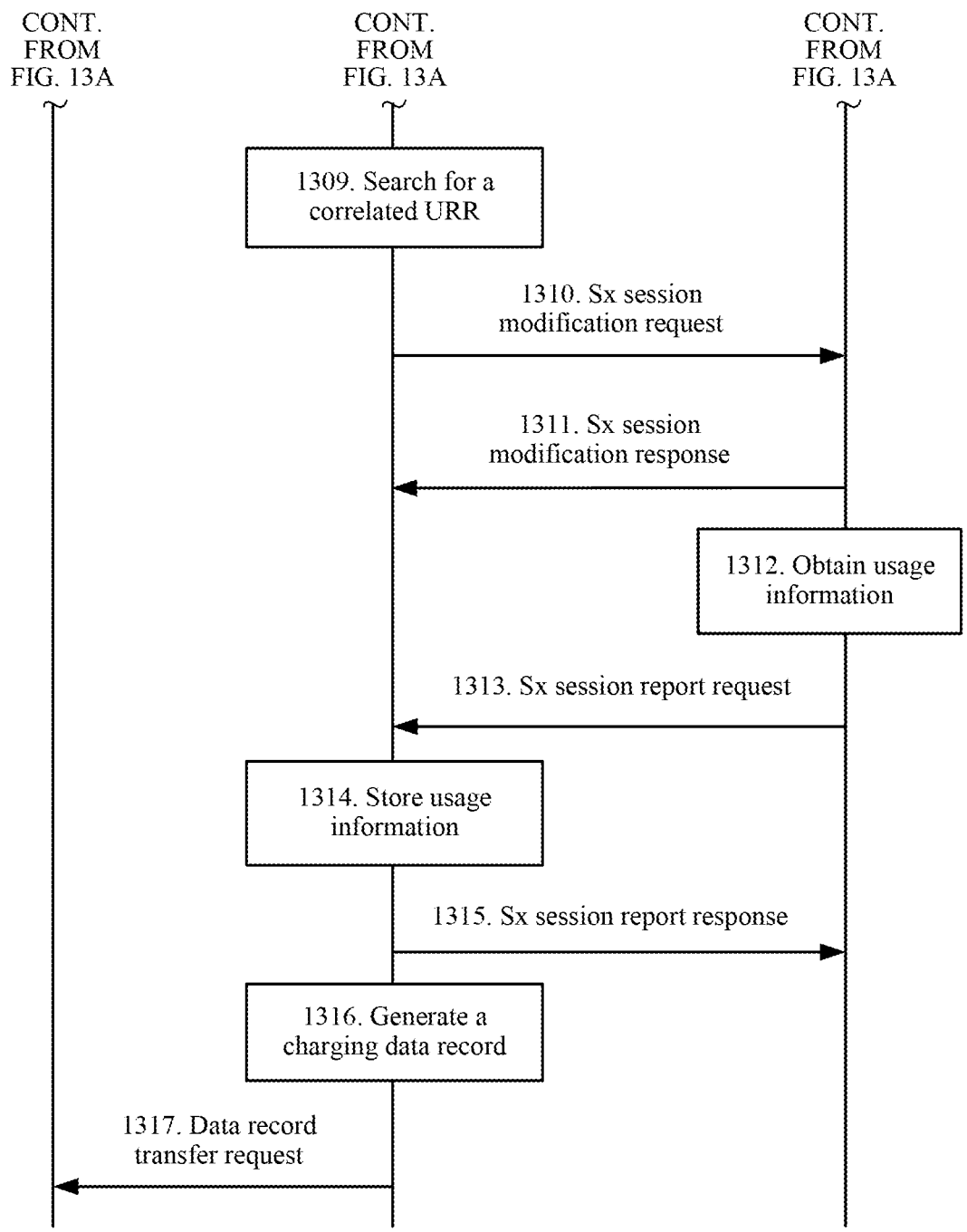

Referring to FIG. 13A and FIG. 13B, an embodiment of a charging management method in an embodiment of this application includes the following steps.

1301. A CP receives a trigger request.

Step 1301 in this embodiment is similar to step 505 in the embodiment shown in FIG. 5, and is not described again herein.

1302. The CP sends an Sx session modification request to a UP.

The CP sends an Sx session modification request Sx session modification request message to the UP, where the message includes a session identifier, a PDR list, and an FAR list, and may also include a QER list and a URR list.

The URR list includes a first URR and a second URR. In this embodiment, information in the Sx session modification request may be shown in the foregoing Table 3, and is not described again herein.

1303. The UP receives a URR.

After receiving the URR list sent by the CP, the UP stores the first URR and the second URR.

In this embodiment, the Sx session modification request sent by the CP includes only the first URR and the second URR, but does not include a correlation between the first URR and the second URR. Therefore, although the UP stores the first URR and the second URR, the UP does not know whether the first URR is correlated with the second URR.

1304. The UP returns an Sx session modification response to the CP.

After receiving the Sx session modification request sent by the CP, the UP may return an Sx session modification response message to the CP.

In this embodiment, no necessary sequence exists between step 1303 and step 1304. Step 1303 may be performed first, or step 1304 may be performed first; or step 1303 and step 1304 may be performed simultaneously. This is not specifically limited herein.

Steps 1305 to 1317 in this embodiment are similar to steps 1105 to 1117 in the embodiment shown in FIG. 11A and FIG. 11B, and are not described again herein.

In this embodiment, the CP sends the first URR and the second URR to the UP using the Sx session modification request, so that when usage reaches a threshold of the first URR, the UP reports, to the CP, usage information corresponding to the first URR; and then the CP sends a correlation indication to the UP using the Sx session modification request again, so that the UP reports, to the CP, usage information corresponding to the second URR, and that the CP can generate a complete charging data record based on the usage information corresponding to the first URR and the usage information corresponding to the second URR.

The foregoing describes the charging management methods in the embodiments of this application. The following describes user plane function entities in this application.

Figure 14:
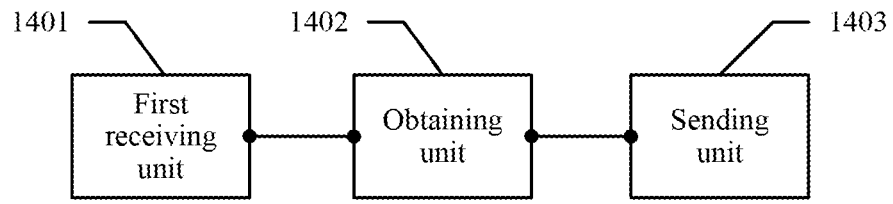
FIG. 14 is a schematic diagram of an embodiment of a user plane function entity according to this application.

Referring to FIG. 14, an embodiment of a user plane function entity in this application includes: a first receiving unit 1401, configured to receive a first URR and a second URR sent by a CP, where the first URR is correlated with the second URR; an obtaining unit 1402, configured to obtain, when usage information on the UP reaches a threshold of the first URR, usage information corresponding to the first URR and usage information corresponding to a third URR correlated with the first URR; and a sending unit 1403, configured to send, to the CP, the usage information corresponding to the first URR and the usage information corresponding to the third URR, so that the CP generates a charging data record based on the usage information corresponding to the first URR and the usage information corresponding to the third URR.

The first receiving unit 1401 in this embodiment may receive, in a plurality of manners, the first usage reporting rule URR and the second URR sent by the CP. Details are hereinafter described separately.

Figure 15:
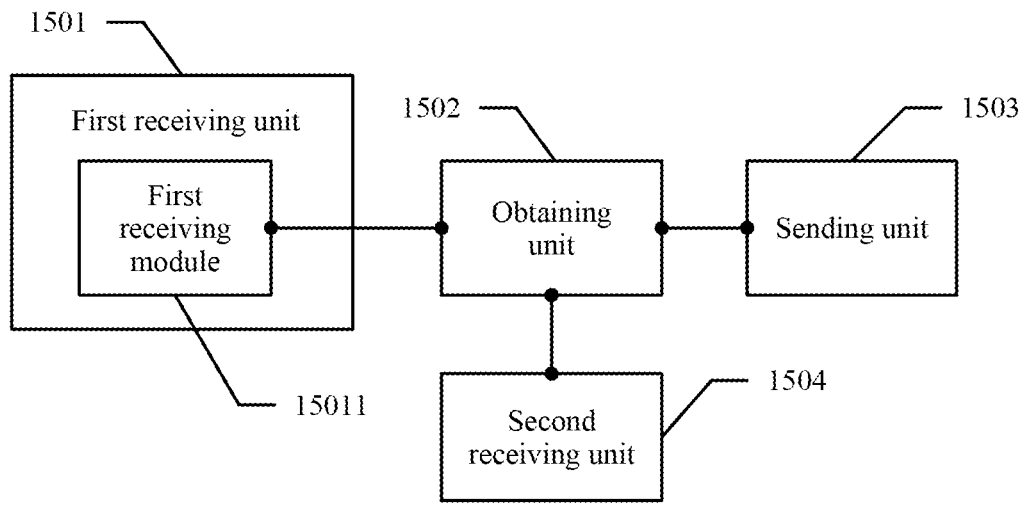
FIG. 15 is a schematic diagram of another embodiment of a user plane function entity according to this application.

Referring to FIG. 15, an embodiment of a user plane function entity in this application includes: a first receiving unit 1501, an obtaining unit 1502, and a sending unit 1503, where functions of the three units are similar to content described in the foregoing embodiment shown in FIG. 14, and are not described again herein.

The first receiving unit 1501 includes a first receiving module 15011, configured to receive a session establishment request sent by a CP, where the session establishment request includes a first URR and a second URR, and a third URR is the same as the second URR.

The user plane function entity may further include a second receiving unit 1504, configured to receive a correlation indication sent by the CP, where the correlation indication is used to indicate that the first URR is correlated with the second URR.

In this embodiment, the procedure performed by each unit and module in the user plane function entity is similar to the method procedure described in the foregoing embodiment shown in FIG. 4, and is not described again herein.

Figure 16:
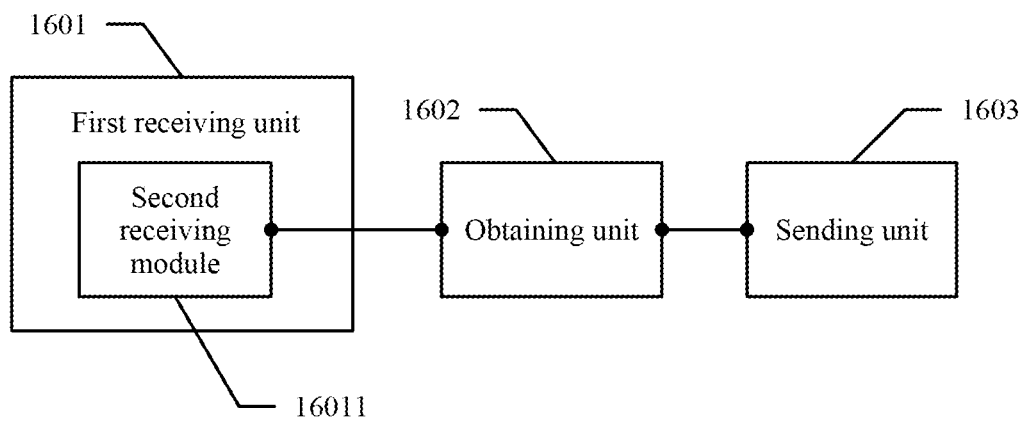
FIG. 16 is a schematic diagram of another embodiment of a user plane function entity according to this application.

Referring to FIG. 16, an embodiment of a user plane function entity in this application includes: a first receiving unit 1601, an obtaining unit 1602, and a sending unit 1603, where functions of the three units are similar to content described in the foregoing embodiment shown in FIG. 14, and are not described again herein.

The first receiving unit 1601 includes a second receiving module 16011, configured to receive a session establishment request sent by a CP, and receive a session modification request sent by the CP, where the session establishment request includes a first URR, and the session modification request includes the first URR or an identifier of the first URR, and a second URR, and use the second URR as a third URR.

In this embodiment, the procedure performed by each unit and module in the user plane function entity is similar to the method procedure described in the foregoing embodiment shown in FIG. 5, and is not described again herein.

Figure 17:
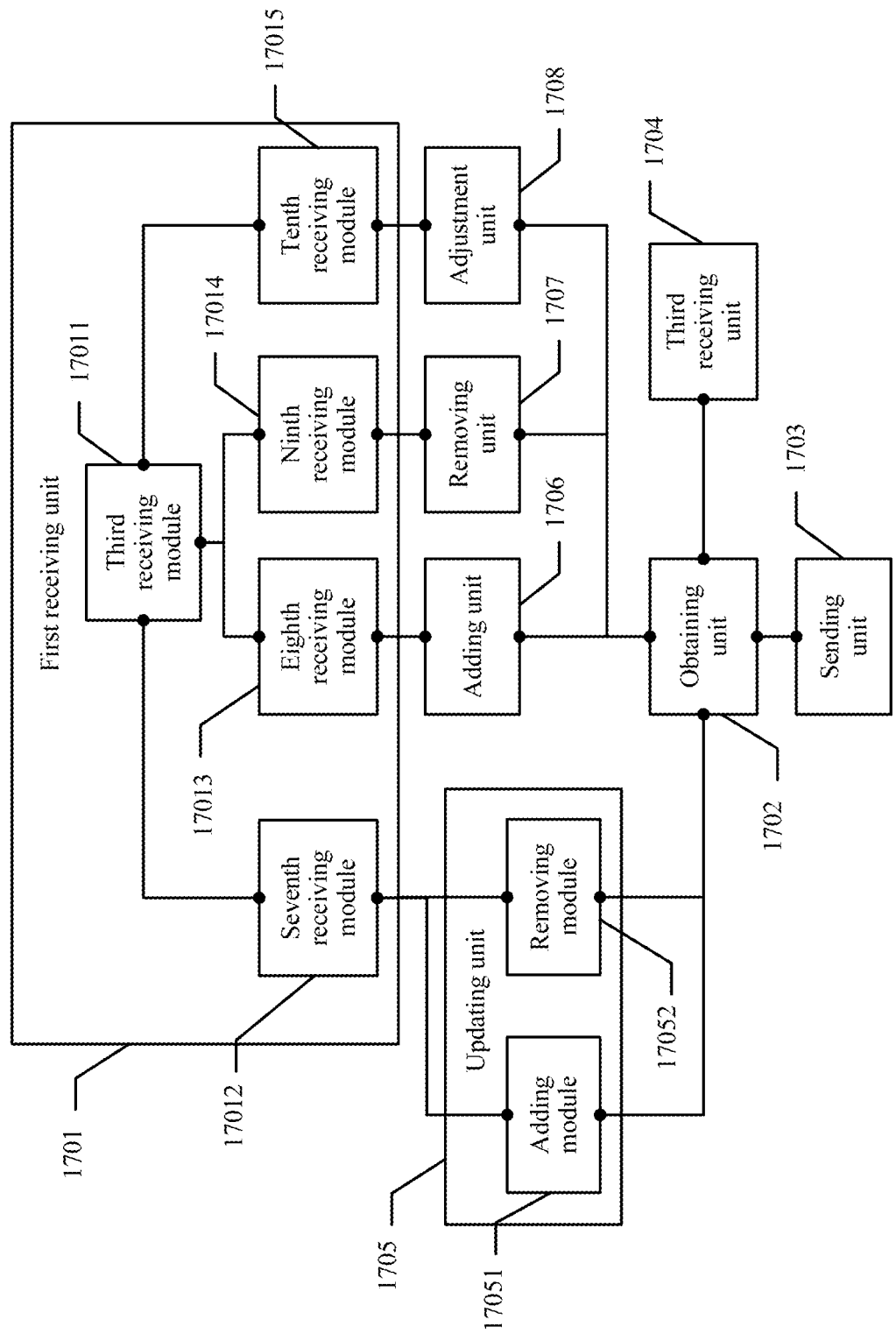
FIG. 17 is a schematic diagram of another embodiment of a user plane function entity according to this application.

Referring to FIG. 17, an embodiment of a user plane function entity in this application includes: a first receiving unit 1701, an obtaining unit 1702, and a sending unit 1703, where functions of the three units are similar to content described in the foregoing embodiment shown in FIG. 14, and are not described again herein.

The first receiving unit 1701 includes a third receiving module 17011, configured to receive a session establishment request sent by a CP, where the session establishment request includes a first URR and a fifth URR.

The user plane function entity may further include a third receiving unit 1704, configured to receive a correlation indication sent by the CP, where the correlation indication is used to indicate that the first URR is correlated with the fifth URR.

The first receiving unit 1701 may further include any one or more of a seventh receiving module 17012 or an eighth receiving module 17013 or a ninth receiving module 17014 or a tenth receiving module 17015.

The seventh receiving module 17012 is configured to receive a fourth session modification request sent by the CP, where the fourth session modification request includes the first URR or an identifier of the first URR, and a second URR or an identifier of a second URR.

The eighth receiving module 17013 is configured to receive a fourth session modification request sent by the CP, where the fourth session modification request includes an add instruction, the first URR or an identifier of the first URR, and a second URR or an identifier of a second URR.

The ninth receiving module 17014 is configured to receive a fourth session modification request sent by the CP, where the fourth session modification request includes a remove instruction, the first URR or an identifier of the first URR, and a second URR or an identifier of a second URR.

The tenth receiving module 17015 is configured to receive a fourth session modification request sent by the CP, where the fourth session modification request includes an add instruction, a remove instruction, the first URR or an identifier of the first URR, a second URR or an identifier of a second URR, and a fourth URR or an identifier of a fourth URR.

When the first receiving unit 1701 includes the seventh receiving module 17012, the user plane function entity may further include an updating unit 1705, configured to update the fifth URR based on the second URR to obtain a third URR. The updating unit 1705 may further include an adding module 17051, configured to add the second URR to the fifth URR to obtain the third URR; or a removing module 17052, configured to remove a target URR from the fifth URR to obtain the third URR, where the target URR is a URR that is included in the fifth URR and is not the second URR; or remove a correlation between the first URR and a target URR in the fifth URR to obtain the third URR, where the target URR is a URR that is included in the fifth URR and is not the second URR.

When the first receiving unit 1701 includes the eighth receiving module 17013, the user plane function entity may further include an adding unit 1706, configured to add the second URR to the fifth URR according to the add instruction to obtain a third URR.

When the first receiving unit 1701 includes the ninth receiving module 17014, the user plane function entity may further include a removing unit 1707, configured to remove the second URR from the fifth URR according to the remove instruction to obtain a third URR; or remove a correlation between the first URR and the second URR in the fifth URR according to the remove instruction to obtain a third URR.

When the first receiving unit 1701 includes the tenth receiving module 17015, the user plane function entity may further include an adjustment unit 1708, configured to add the second URR to the fifth URR according to the add instruction, and remove the fourth URR from the fifth URR according to the remove instruction, or remove a correlation between the first URR and the fourth URR in the fifth URR according to the remove instruction to obtain a third URR.

In this embodiment, the procedure performed by each unit and module in the user plane function entity is similar to the method procedure described in the foregoing embodiment shown in FIG. 6, and is not described again herein.

Figure 18:
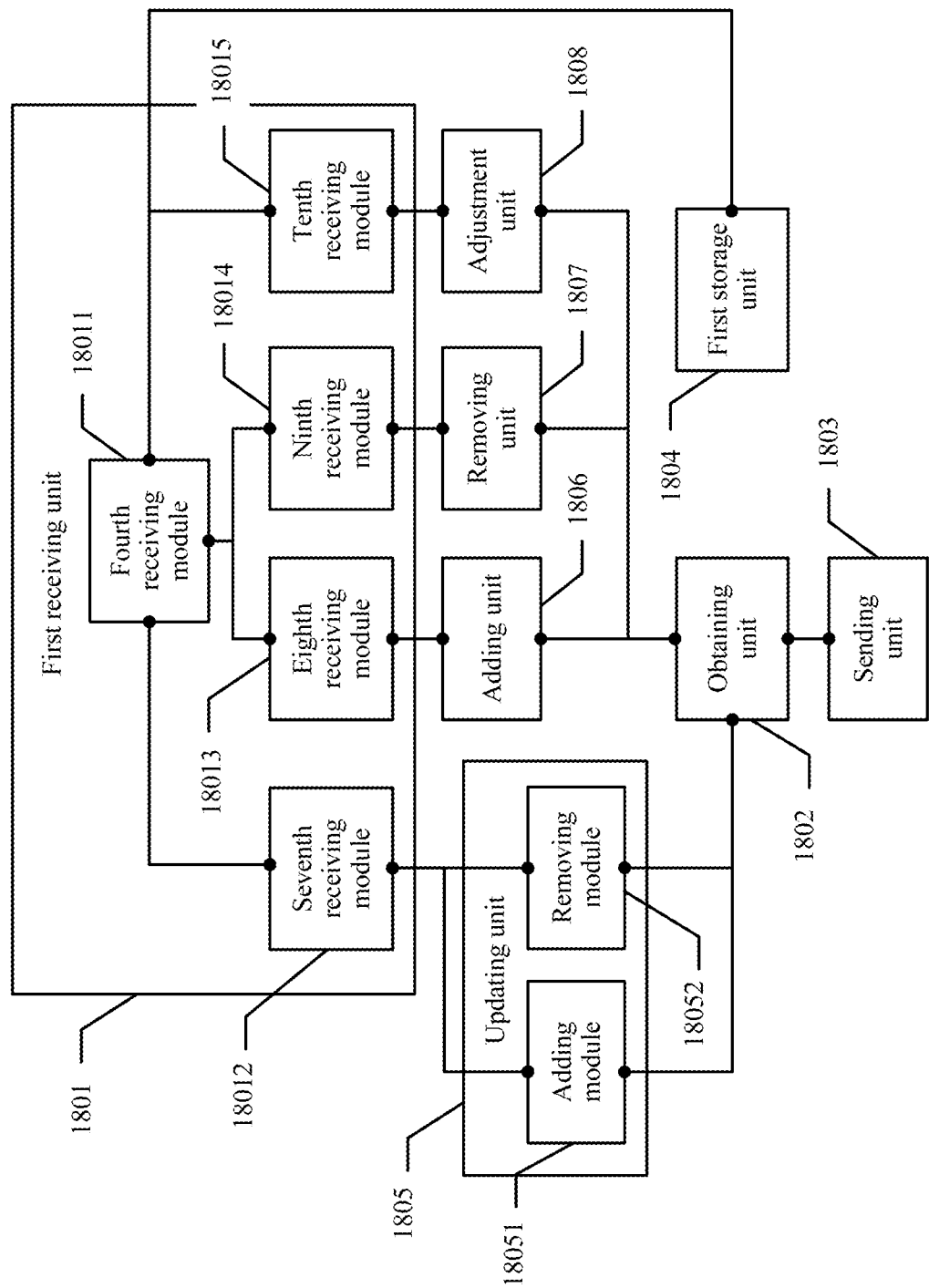
FIG. 18 is a schematic diagram of another embodiment of a user plane function entity according to this application.

Referring to FIG. 18, an embodiment of a user plane function entity in this application includes: a first receiving unit 1801, an obtaining unit 1802, and a sending unit 1803, where functions of the three units are similar to content described in the foregoing embodiment shown in FIG. 14, and are not described again herein.

The first receiving unit 1801 includes a fourth receiving module 18011, configured to receive a session establishment request sent by a CP, and receive a first session modification request sent by the CP, where the session establishment request includes a first URR, and the first session modification request includes a fifth URR.

The user plane function entity may further include a first storage unit 1804, configured to store the fifth URR.

In this embodiment, functions of modules further included in the first receiving unit 1801, and functions of an updating unit 1805, an adding unit 1806, a removing unit 1807, and an adjustment unit 1808 are similar to content described in the foregoing embodiment shown in FIG. 17, and are not described again herein.

In this embodiment, the procedure performed by each unit and module in the user plane function entity is similar to the method procedure described in the foregoing embodiment shown in FIG. 7A and FIG. 7B, and is not described again herein.

Figure 19:
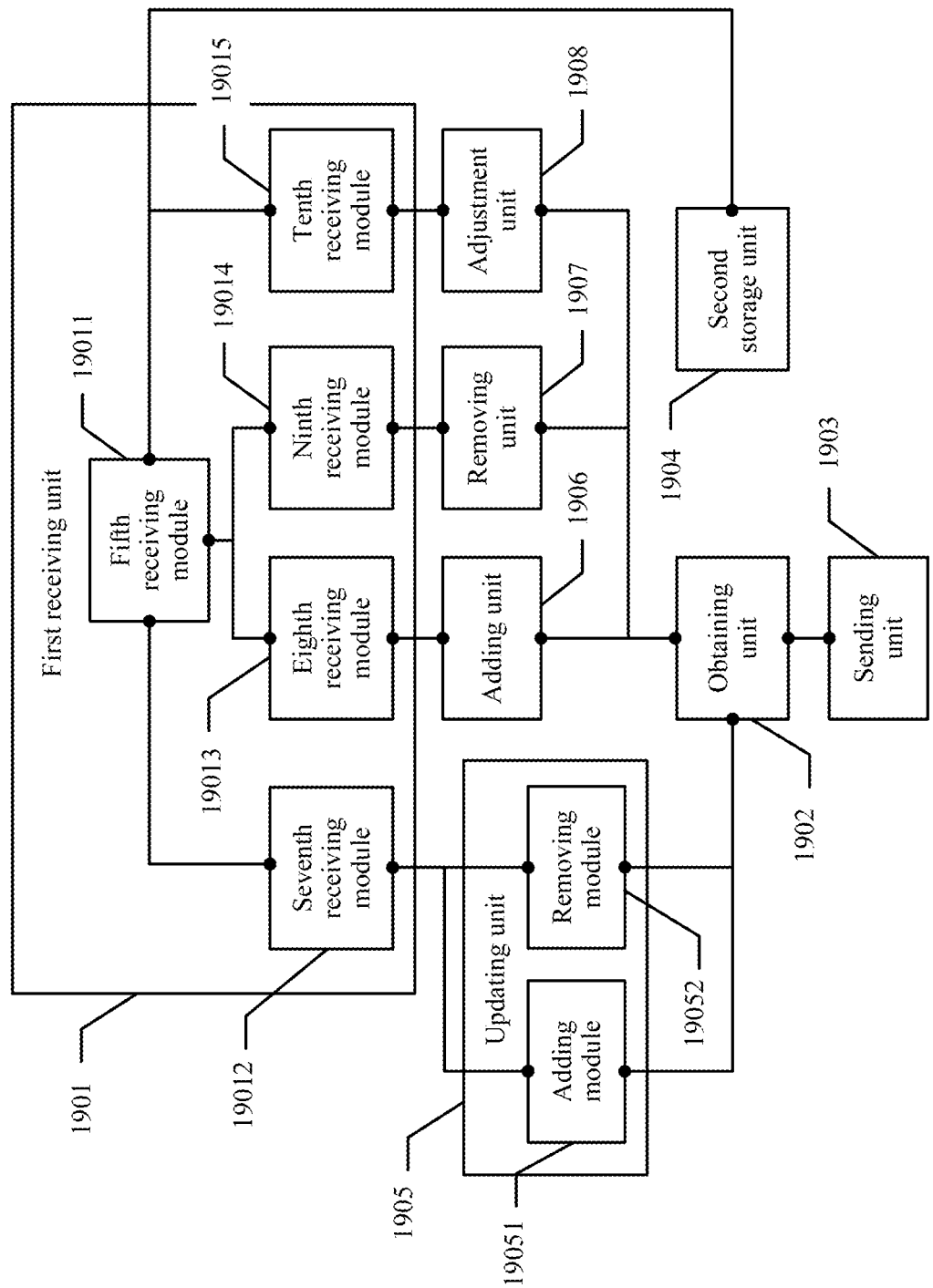
FIG. 19 is a schematic diagram of another embodiment of a user plane function entity according to this application.

Referring to FIG. 19, an embodiment of a user plane function entity in this application includes: a first receiving unit 1901, an obtaining unit 1902, and a sending unit 1903, where functions of the three units are similar to content described in the foregoing embodiment shown in FIG. 14, and are not described again herein.

The first receiving unit 1901 includes a fifth receiving module 19011, configured to receive a session establishment request sent by a CP, and receive a second session modification request sent by the CP, where the session establishment request includes a fifth URR, and the second session modification request includes a first URR.

The user plane function entity may further include a second storage unit 1904, configured to store the first URR.

In this embodiment, functions of modules further included in the first receiving unit 1901, and functions of an updating unit 1905, an adding unit 1906, a removing unit 1907, and an adjustment unit 1908 are similar to content described in the foregoing embodiment shown in FIG. 17, and are not described again herein.

In this embodiment, the procedure performed by each unit and module in the user plane function entity is similar to the method procedure described in the foregoing embodiment shown in FIG. 8A and FIG. 8B, and is not described again herein.

Figure 20:
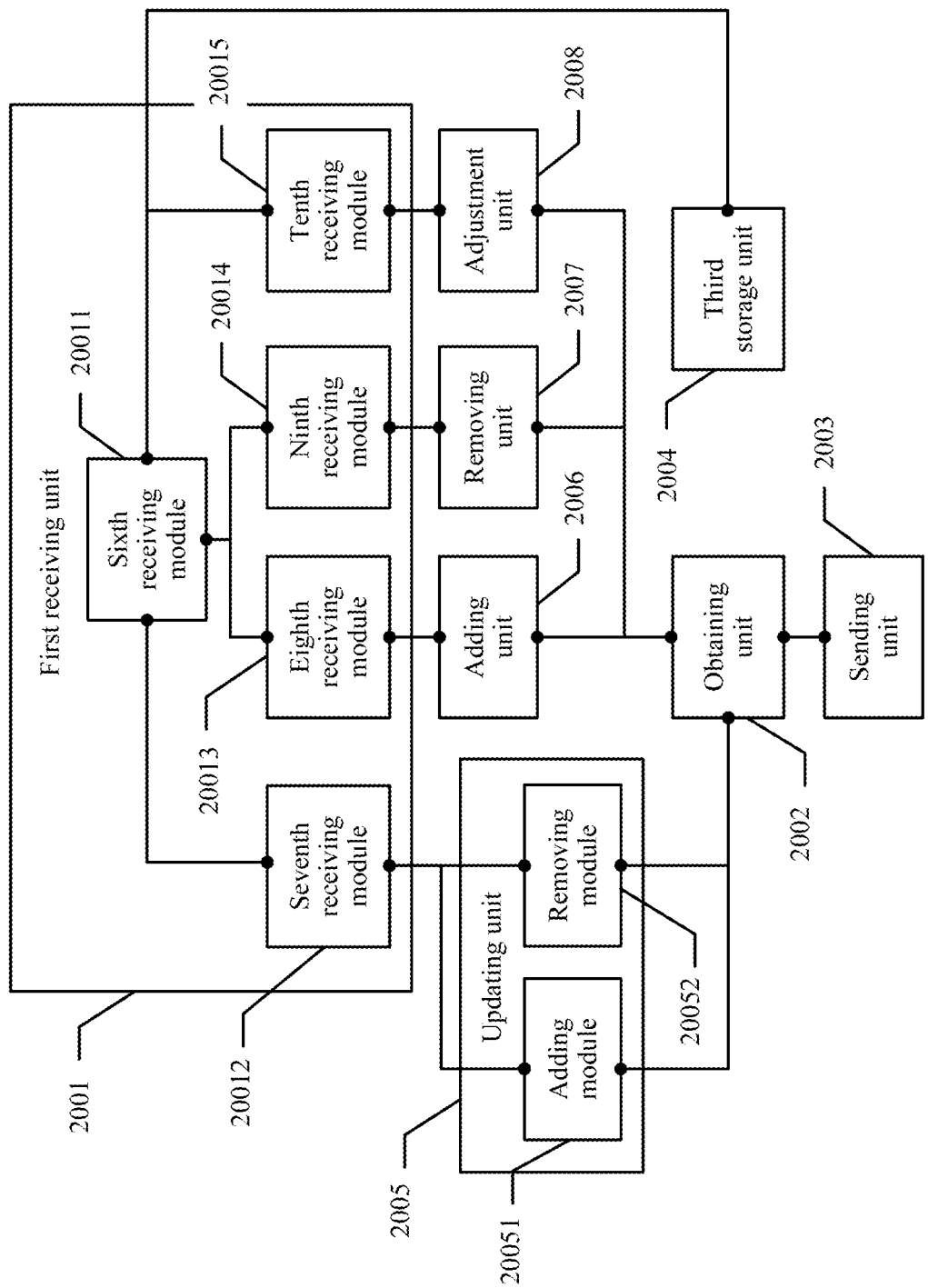
FIG. 20 is a schematic diagram of another embodiment of a user plane function entity according to this application.

Referring to FIG. 20, an embodiment of a user plane function entity in this application includes: a first receiving unit 2001, an obtaining unit 2002, and a sending unit 2003, where functions of the three units are similar to content described in the foregoing embodiment shown in FIG. 14, and are not described again herein.

The first receiving unit 2001 includes a sixth receiving module 20011, configured to receive a third session modification request sent by a CP, where the third session modification request includes a first URR and a fifth URR.

The user plane function entity may further include a third storage unit 2004, configured to store the first URR and the fifth URR.

In this embodiment, functions of modules further included in the first receiving unit 2001, and functions of an updating unit 2005, an adding unit 2006, a removing unit 2007, and an adjustment unit 2008 are similar to content described in the foregoing embodiment shown in FIG. 17, and are not described again herein.

In this embodiment, the procedure performed by each unit and module in the user plane function entity is similar to the method procedure described in the foregoing embodiment shown in FIG. 9A and FIG. 9B, and is not described again herein.

The foregoing describes the user plane function entities in the embodiments of this application. The following describes control plane function entities in this application.

Figure 21:
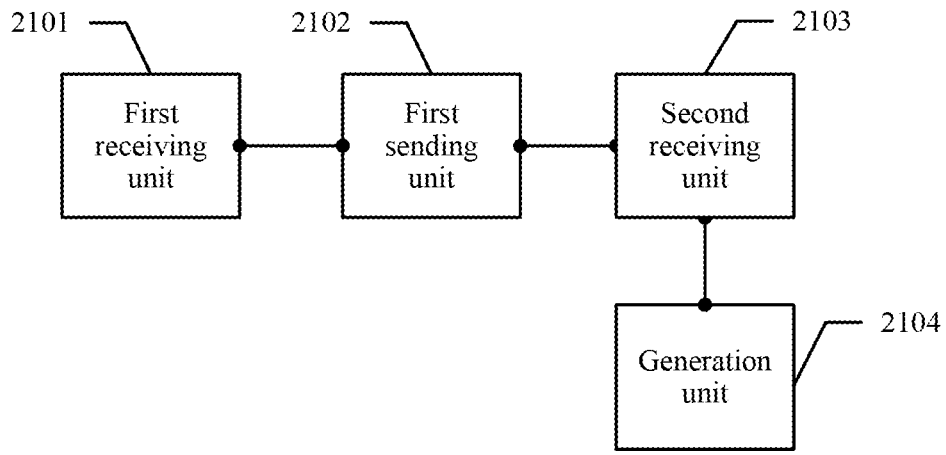
FIG. 21 is a schematic diagram of an embodiment of a control plane function entity according to this application.

Referring to FIG. 21, an embodiment of a control plane function entity in this application includes: a first receiving unit 2101, configured to receive a trigger request; a first sending unit 2102, configured to send a first URR and a second URR to a UP according to the trigger request, where the first URR is correlated with the second URR; a second receiving unit 2103, configured to receive usage information corresponding to the first URR and usage information corresponding to a third URR correlated with the first URR that are sent by the UP; and a generation unit 2104, configured to generate a charging data record based on the usage information corresponding to the first URR and the usage information corresponding to the third URR.

The first receiving unit 2101 in this embodiment may be an optional unit, and may not exist in an actual implementation either. When the first receiving unit 2101 does not exist, the first sending unit 2102 may not depend on the trigger request to send the first URR and the second URR to the UP. This is not specifically limited herein.

The first sending unit 2102 in this embodiment may send the first URR and the second URR to the UP in a plurality of manners. Details are hereinafter described separately.

Figure 22:
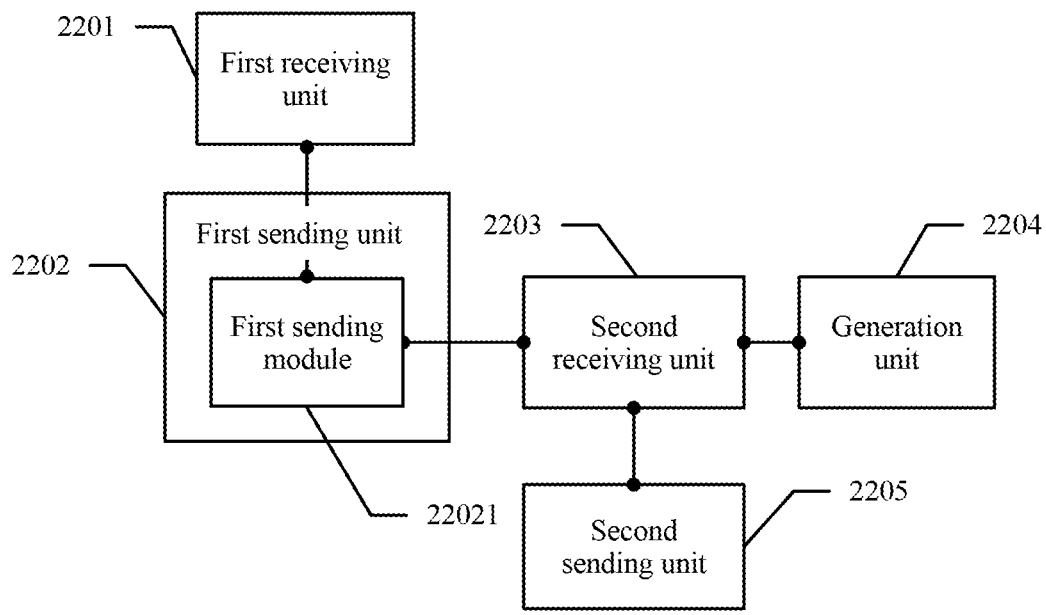
FIG. 22 is a schematic diagram of another embodiment of a control plane function entity according to this application.

Referring to FIG. 22, an embodiment of a control plane function entity in this application includes: a first receiving unit 2201, a first sending unit 2202, a second receiving unit 2203, and a generation unit 2204, where functions of the four units are similar to content described in the foregoing embodiment shown in FIG. 21, and are not described again herein.

The first sending unit 2202 includes a first sending module 22021, configured to send a session establishment request to a UP, where the session establishment request includes a first URR and a second URR, and a third URR is the same as the second URR.

The control plane function entity may further include a second sending unit 2205, configured to send a correlation indication to the UP, where the correlation indication is used to indicate that the first URR is correlated with the second URR.

In this embodiment, the procedure performed by each unit and module in the control plane function entity is similar to the method procedure described in the foregoing embodiment shown in FIG. 4, and is not described again herein.

Figure 23:
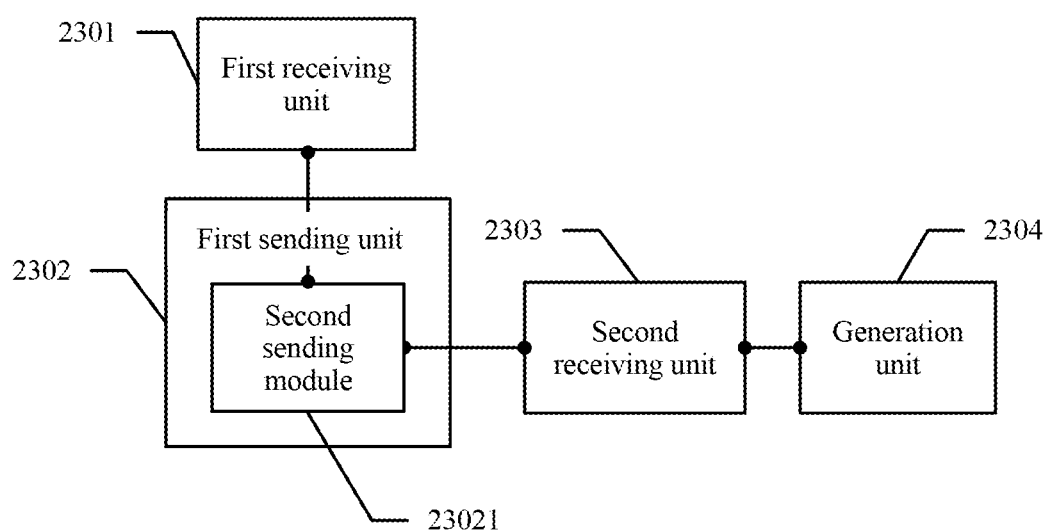
FIG. 23 is a schematic diagram of another embodiment of a control plane function entity according to this application.

Referring to FIG. 23, an embodiment of a control plane function entity in this application includes: a first receiving unit 2301, a first sending unit 2302, a second receiving unit 2303, and a generation unit 2304, where functions of the four units are similar to content described in the foregoing embodiment shown in FIG. 21, and are not described again herein.

The first sending unit 2302 includes a second sending module 23021, configured to send a session establishment request to a UP, and send a session modification request to the UP, where the session establishment request includes a first URR, and the session modification request includes the first URR or an identifier of the first URR, and a second URR, so that the UP uses the second URR as a third URR.

In this embodiment, the procedure performed by each unit and module in the control plane function entity is similar to the method procedure described in the foregoing embodiment shown in FIG. 5, and is not described again herein.

Figure 24:
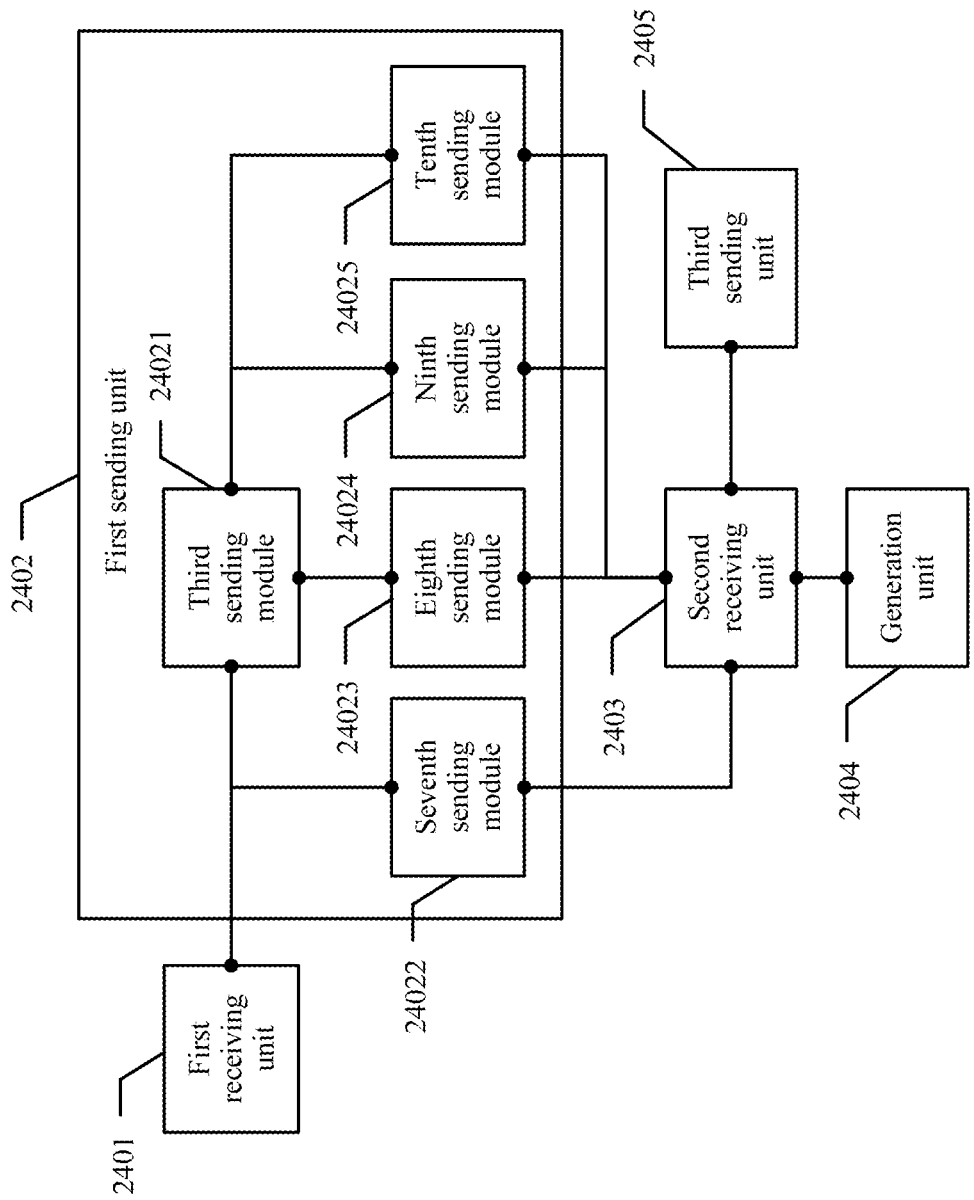
FIG. 24 is a schematic diagram of another embodiment of a control plane function entity according to this application.

Referring to FIG. 24, an embodiment of a control plane function entity in this application includes: a first receiving unit 2401, a first sending unit 2402, a second receiving unit 2403, and a generation unit 2404, where functions of the four units are similar to content described in the foregoing embodiment shown in FIG. 21, and are not described again herein.

The first sending unit 2402 includes a third sending module 24021, configured to send a session establishment request to a UP, where the session establishment request includes a first URR and a fifth URR.

The control plane function entity may further include a third sending unit 2405, configured to send a correlation indication to the UP, where the correlation indication is used to indicate that the first URR is correlated with the fifth URR.

In this embodiment, the first sending unit 2402 may further include any one or more of a seventh sending module 24022 or an eighth sending module 24023 or a ninth sending module 24024 or a tenth sending module 24025.

The seventh sending module 24022 is configured to send a fourth session modification request to the UP, where the fourth session modification request includes the first URR or an identifier of the first URR, and a second URR or an identifier of a second URR, so that the UP updates the fifth URR based on the second URR to obtain a third URR.

The eighth sending module 24023 is configured to send a fourth session modification request to the UP, where the fourth session modification request includes an add instruction, the first URR or an identifier of the first URR, and a second URR or an identifier of a second URR, so that the UP adds the second URR to the fifth URR according to the add instruction to obtain a third URR.

The ninth sending module 24024 is configured to send a fourth session modification request to the UP, where the fourth session modification request includes a remove instruction, the first URR or an identifier of the first URR, and a second URR or an identifier of a second URR, so that the UP removes the second URR from the fifth URR according to the remove instruction to obtain a third URR, or that the UP removes a correlation between the first URR and the second URR in the fifth URR according to the remove instruction to obtain a third URR.

The tenth sending module 24025 is configured to send a fourth session modification request to the UP, where the fourth session modification request includes an add instruction, a remove instruction, the first URR or an identifier of the first URR, a second URR or an identifier of a second URR, and a fourth URR or an identifier of a fourth URR, so that the UP adds the second URR to the fifth URR according to the add instruction, and that the UP removes the fourth URR from the fifth URR according to the remove instruction or removes a correlation between the first URR and the fourth URR in the fifth URR according to the remove instruction to obtain a third URR.

In this embodiment, the procedure performed by each unit and module in the control plane function entity is similar to the method procedure described in the foregoing embodiment shown in FIG. 6, and is not described again herein.

Figure 25:
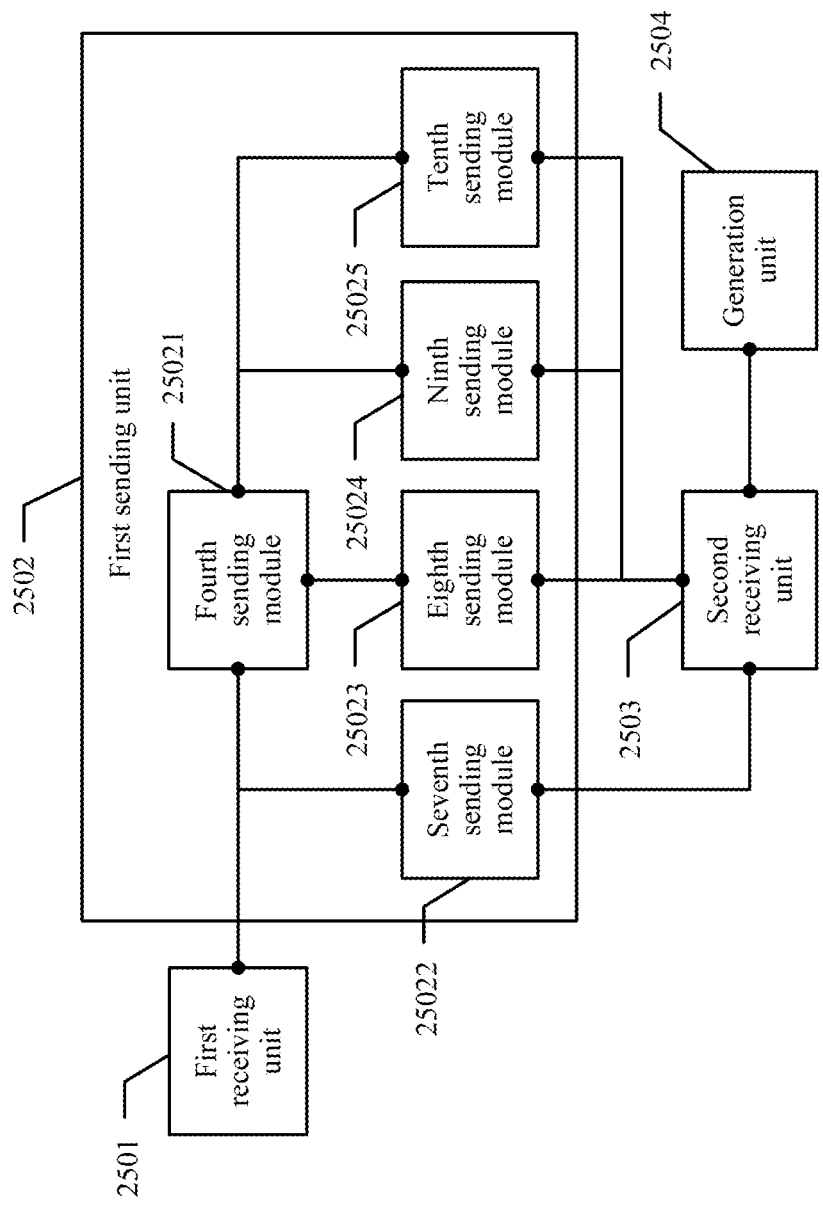
FIG. 25 is a schematic diagram of another embodiment of a control plane function entity according to this application.

Referring to FIG. 25, an embodiment of a control plane function entity in this application includes: a first receiving unit 2501, a first sending unit 2502, a second receiving unit 2503, and a generation unit 2504, where functions of the four units are similar to content described in the foregoing embodiment shown in FIG. 21, and are not described again herein.

The first sending unit 2502 includes a fourth sending module 25021, configured to send a session establishment request to a UP, and send a first session modification request to the UP, where the session establishment request includes a first URR, and the first session modification request includes a fifth URR.

In this embodiment, functions of modules further included in the first sending unit 2502 are similar to content described in the foregoing embodiment shown in FIG. 24, and are not described again herein.

In this embodiment, the procedure performed by each unit and module in the control plane function entity is similar to the method procedure described in the foregoing embodiment shown in FIG. 7A and FIG. 7B, and is not described again herein.

Figure 26:
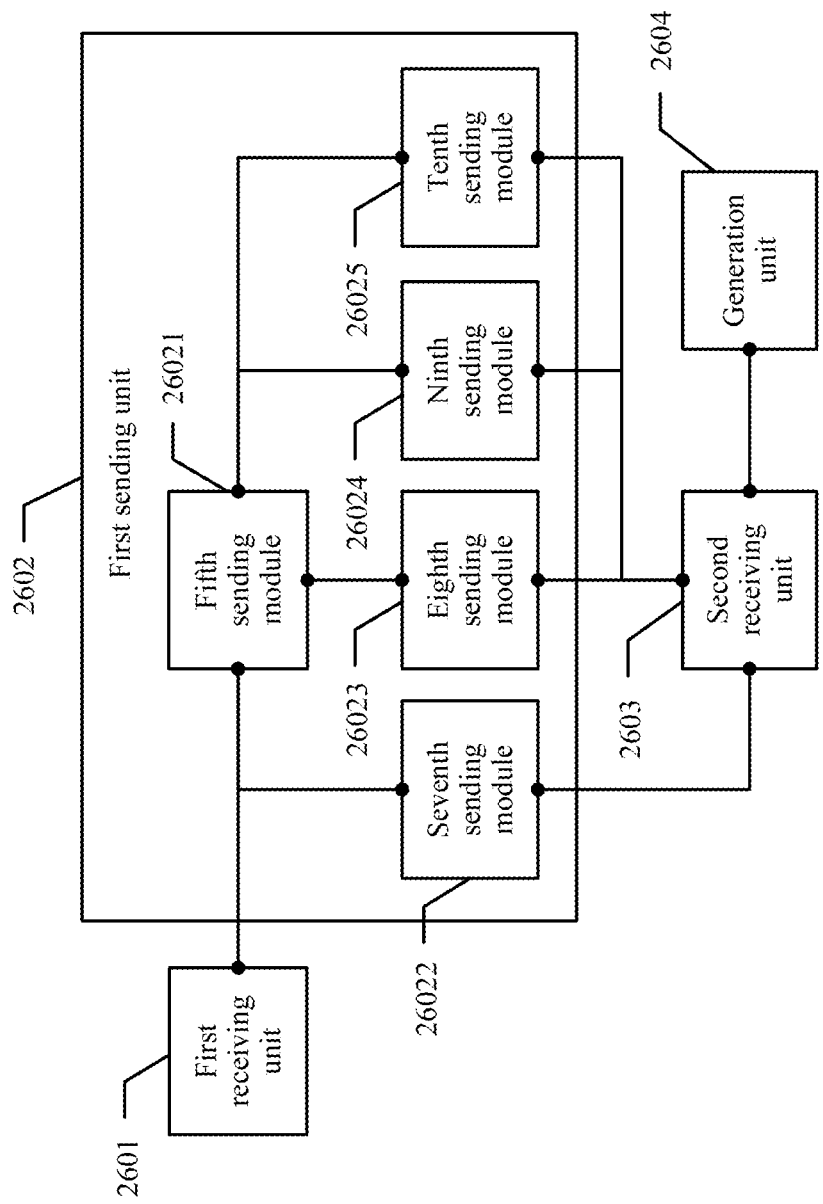
FIG. 26 is a schematic diagram of another embodiment of a control plane function entity according to this application.

Referring to FIG. 26, an embodiment of a control plane function entity in this application includes: a first receiving unit 2601, a first sending unit 2602, a second receiving unit 2603, and a generation unit 2604, where functions of the four units are similar to content described in the foregoing embodiment shown in FIG. 21, and are not described again herein.

The first sending unit 2602 includes a fifth sending module 26021, configured to send a session establishment request to a UP, and send a second session modification request to the UP, where the session establishment request includes a fifth URR, and the second session modification request includes a first URR.

In this embodiment, functions of modules further included in the first sending unit 2602 are similar to content described in the foregoing embodiment shown in FIG. 24, and are not described again herein.

In this embodiment, the procedure performed by each unit and module in the control plane function entity is similar to the method procedure described in the foregoing embodiment shown in FIG. 8A and FIG. 8B, and is not described again herein.

Figure 27:
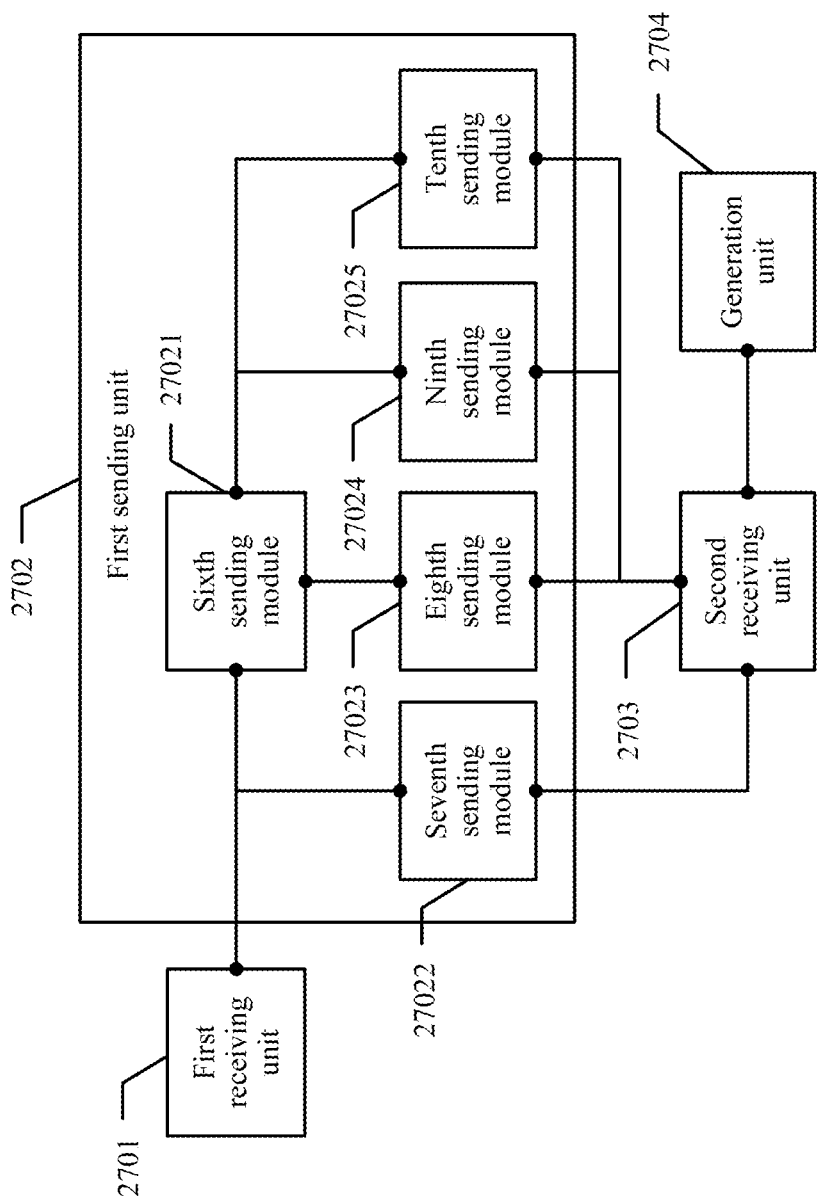
FIG. 27 is a schematic diagram of another embodiment of a control plane function entity according to this application.

Referring to FIG. 27, an embodiment of a control plane function entity in this application includes: a first receiving unit 2701, a first sending unit 2702, a second receiving unit 2703, and a generation unit 2704, where functions of the four units are similar to content described in the foregoing embodiment shown in FIG. 21, and are not described again herein.

The first sending unit 2702 includes a sixth sending module 27021, configured to send a third session modification request to a UP, where the third session modification request includes a first URR and a fifth URR.

In this embodiment, functions of modules further included in the first sending unit 2702 are similar to content described in the foregoing embodiment shown in FIG. 24, and are not described again herein.

In this embodiment, the procedure performed by each unit and module in the control plane function entity is similar to the method procedure described in the foregoing embodiment shown in FIG. 9A and FIG. 9B, and is not described again herein.

Figure 28:
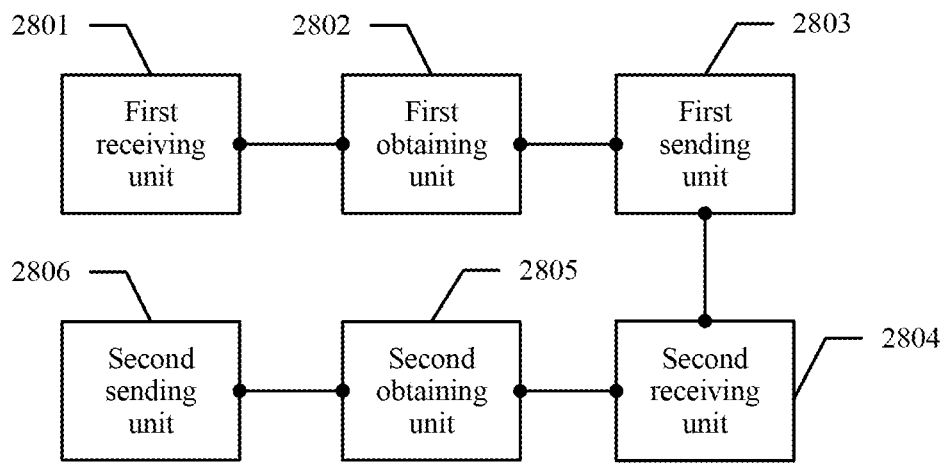
FIG. 28 is a schematic diagram of another embodiment of a user plane function entity according to this application.

Referring to FIG. 28, an embodiment of a user plane function entity in this application includes: a first receiving unit 2801, configured to receive a first URR sent by a CP; a first obtaining unit 2802, configured to obtain, when usage information on the UP reaches a threshold of the first URR, usage information corresponding to the first URR; a first sending unit 2803, configured to send, to the CP, the usage information corresponding to the first URR; a second receiving unit 2804, configured to receive a first request sent by the CP, where the first request includes a second URR, and the second URR is correlated with the first URR; a second obtaining unit 2805, configured to obtain usage information corresponding to the second URR; and a second sending unit 2806, configured to send, to the CP, the usage information corresponding to the second URR, so that the CP generates a charging data record based on the usage information corresponding to the first URR and the usage information corresponding to the second URR.

In this embodiment, the procedure performed by each unit in the user plane function entity is similar to the method procedure described in the foregoing embodiment shown in FIG. 10A and FIG. 10B or FIG. 12A and FIG. 12B, and is not described again herein.

Referring to FIG. 28, an embodiment of a user plane function entity in this application includes: a first receiving unit 2801, configured to receive a first URR and a second URR sent by a CP; a first obtaining unit 2802, configured to obtain, when usage information on the UP reaches a threshold of the first URR, usage information corresponding to the first URR; a first sending unit 2803, configured to send, to the CP, the usage information corresponding to the first URR; a second receiving unit 2804, configured to receive a first request sent by the CP, where the first request includes a correlation indication, and the correlation indication is used to indicate that the second URR is correlated with the first URR; a second obtaining unit 2805, configured to obtain usage information corresponding to the second URR; and a second sending unit 2806, configured to send, to the CP, the usage information corresponding to the second URR, so that the CP generates a charging data record based on the usage information corresponding to the first URR and the usage information corresponding to the second URR.

In this embodiment, the procedure performed by each unit in the user plane function entity is similar to the method procedure described in the foregoing embodiment shown in FIG. 11A and FIG. 11B or FIG. 13A and FIG. 13B, and is not described again herein.

Figure 29:
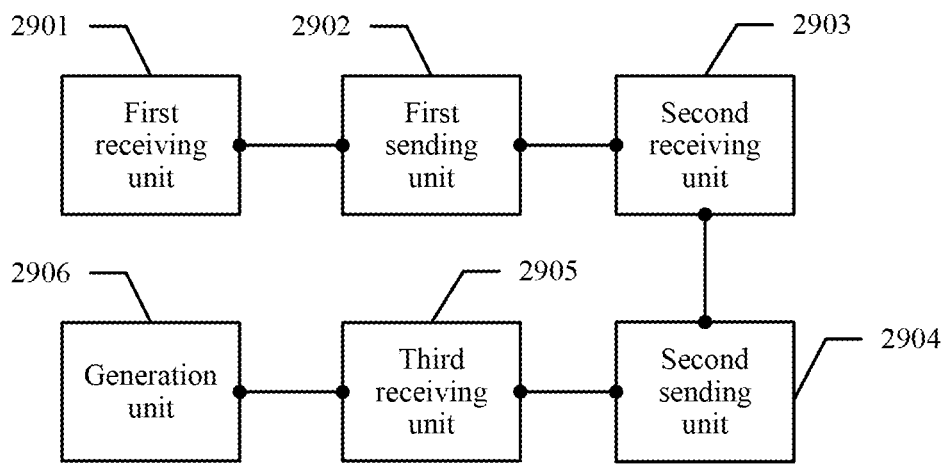
FIG. 29 is a schematic diagram of another embodiment of a control plane function entity according to this application.

Referring to FIG. 29, an embodiment of a control plane function entity in this application includes: a first receiving unit 2901, configured to receive a trigger request; a first sending unit 2902, configured to send a first URR to a UP according to the trigger request; a second receiving unit 2903, configured to receive usage information corresponding to the first URR and sent by the UP; a second sending unit 2904, configured to send a first request to the UP, where the first request includes a second URR, and the second URR is correlated with the first URR; a third receiving unit 2905, configured to receive usage information corresponding to the second URR and sent by the UP; and a generation unit 2906, configured to generate a charging data record based on the usage information corresponding to the first URR and the usage information corresponding to the second URR.

In this embodiment, the procedure performed by each unit in the control plane function entity is similar to the method procedure described in the foregoing embodiment shown in FIG. 10A and FIG. 10B or FIG. 12A and FIG. 12B, and is not described again herein.

Referring to FIG. 29, an embodiment of a control plane function entity in this application includes: a first receiving unit 2901, configured to receive a trigger request; a first sending unit 2902, configured to send a first URR and a second URR to a UP according to the trigger request; a second receiving unit 2903, configured to receive usage information corresponding to the first URR and sent by the UP; a second sending unit 2904, configured to send a first request to the UP, where the first request includes a correlation indication, and the correlation indication is used to indicate that the second URR is correlated with the first URR; a third receiving unit 2905, configured to receive usage information corresponding to the second URR and sent by the UP; and a generation unit 2906, configured to generate a charging data record based on the usage information corresponding to the first URR and the usage information corresponding to the second URR.

In this embodiment, the procedure performed by each unit in the user plane function entity is similar to the method procedure described in the foregoing embodiment shown in FIG. 1A and FIG. 11B or FIG. 13A and FIG. 13B, and is not described again herein.

Figure 30:
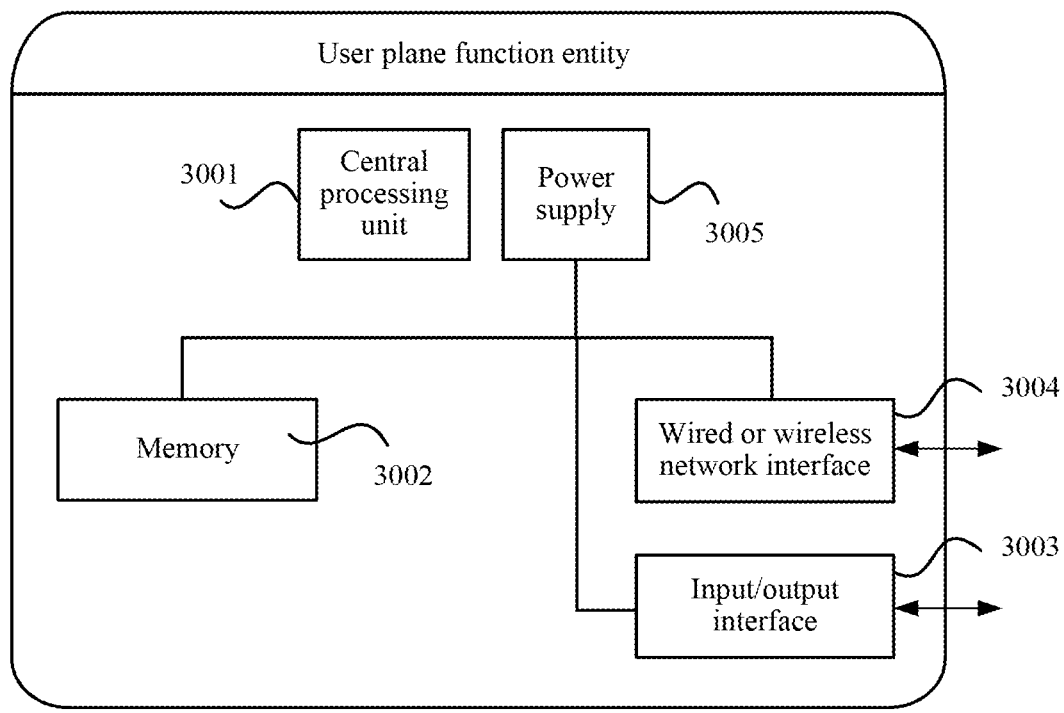
FIG. 30 is a schematic diagram of another embodiment of a user plane function entity according to this application.

Referring to FIG. 30, an embodiment of a user plane function entity in this application may include one or more central processing units 3001, a memory 3002, an input/output interface 3003, a wired or wireless network interface 3004, and a power supply 3005.

The memory 3002 may perform transitory storage or persistent storage. Further, the central processing unit 3001 may be configured to communicate with the memory 3002, and perform a series of operations on the user plane function entity by executing instructions stored in the memory 3002.

In this embodiment, the central processing unit 3001 may perform the operations performed by the user plane function entities in the foregoing embodiments shown in FIG. 4 to FIG. 13B. Details are not described again herein.

In this embodiment, division of specific functional modules in the central processing unit 3001 may be similar to division of the functional modules of the units such as the first receiving unit, the obtaining unit, the sending unit, the second receiving unit, the third receiving unit, the first storage unit, the second storage unit, the third storage unit, the updating unit, the adding unit, the removing unit, and the adjustment unit described in FIG. 14 to FIG. 20, and is not described again herein.

In this embodiment, division of specific functional modules in the central processing unit 3001 may also be similar to division of the functional modules of the units such as the first receiving unit, the first obtaining unit, the first sending unit, the second receiving unit, the second obtaining unit, and the second sending unit described in FIG. 28, and is not described again herein.

Figure 31:
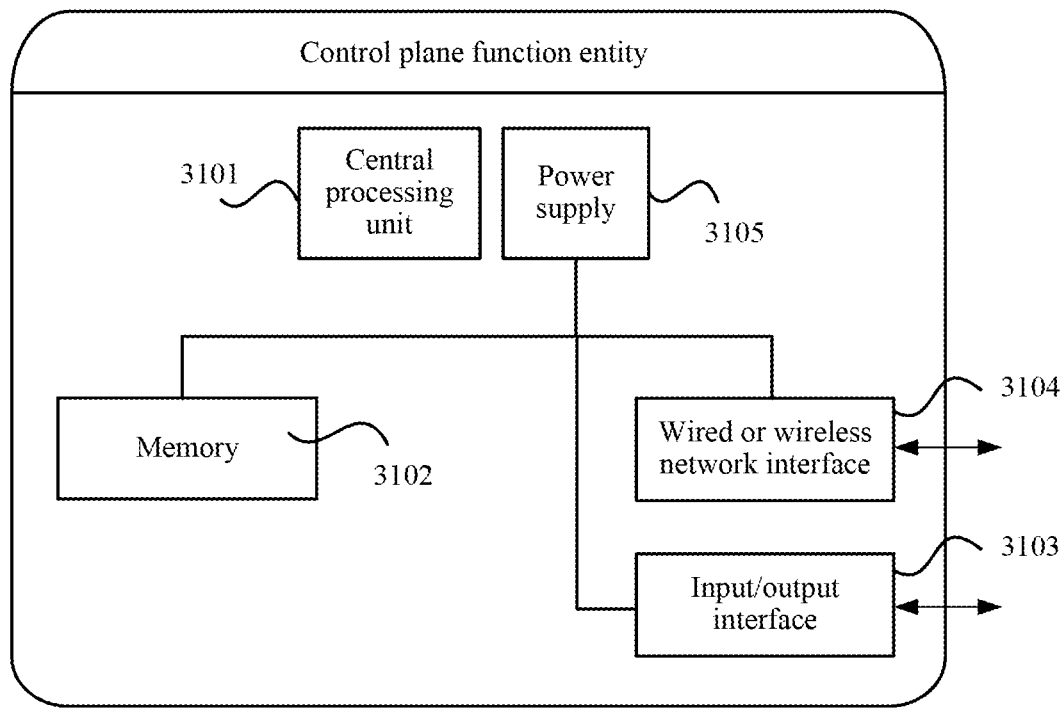
FIG. 31 is a schematic diagram of another embodiment of a control plane function entity according to this application.

Referring to FIG. 31, an embodiment of a control plane function entity in this application may include one or more central processing units 3101, a memory 3102, an input/output interface 3103, a wired or wireless network interface 3104, and a power supply 3105.

The memory 3102 may perform transitory storage or persistent storage. Further, the central processing unit 3101 may be configured to communicate with the memory 3102, and perform a series of operations on the control plane function entity by executing instructions stored in the memory 3002.

In this embodiment, the central processing unit 3101 may perform the operations performed by the control plane function entities in the foregoing embodiments shown in FIG. 4 to FIG. 13B. Details are not described again herein.

In this embodiment, division of specific functional modules in the central processing unit 3101 may be similar to division of the functional modules of the units such as the first receiving unit, the first sending unit, the second receiving unit, the second sending unit, the third sending unit, and the generation unit described in FIG. 21 to FIG. 27, and is not described again herein.

In this embodiment, division of specific functional modules in the central processing unit 3001 may also be similar to division of the functional modules of the units such as the first receiving unit, the first sending unit, the second receiving unit, the second sending unit, the third receiving unit, and the generation unit described in FIG. 29, and is not described again herein.

An embodiment of this application further provides a computer storage medium, where the computer storage medium is configured to store a computer software instruction used by the foregoing user plane function entity or control plane function entity. The computer software instruction is used to execute a program designed for the user plane function entity or the control plane function entity.

The user plane function entity may be the user plane function entity described in FIG. 4 to FIG. 13B.

The control plane function entity may be the control plane function entity described in FIG. 4 to FIG. 13B.

An embodiment of this application further provides a computer program product, where the computer program product includes a computer software instruction. The computer software instruction may be loaded by a processor to implement a procedure of the charging management method in any one of FIG. 4 to FIG. 13B.

In the specification, claims, and accompanying drawings of the embodiments of this application, the terms "first", "second", "third", "fourth", and so on (if any) do not necessarily indicate a specific order or sequence. It should be understood that the data termed in such a way are interchangeable in proper circumstances so that the embodiments described herein can be implemented in other orders than the order illustrated or described herein. Moreover, the term "include" or "contain" and any other variants mean to cover the non-exclusive solution, for example, a process, method, system, product, or device that includes a list of steps or units is not necessarily limited to those expressly listed steps or units, but may include other steps or units not expressly listed or inherent to such a process, method, system, product, or device.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A communication method, comprising:
sending, by a control plane function entity (CP), a second usage reporting rule (URR) to a user plane function entity (UP), wherein the second URR comprises an identifier (ID) of a first URR correlated with the second URR;
receiving, by the UP, the second URR from the CP;
in response to usage information on the UP reaching a threshold of the first URR, obtaining, by the UP, usage information corresponding to the first URR, and usage information corresponding to the second URR correlated with the first URR; and
sending, by the UP to the CP, the usage information corresponding to the first URR and the usage information corresponding to the second URR.

2. The communication method according to claim 1, wherein receiving, by the UP, the second URR from the CP comprises:
receiving, by the UP, a session establishment request from the CP, wherein the session establishment request comprises the second URR.

3. The communication method according to claim 2, wherein the session establishment request further comprises the first URR.

4. The communication method according to claim 1, further comprising:
receiving, by the UP, a session establishment request from the CP, wherein the session establishment request comprises the first URR.

5. The communication method according to claim 4, wherein receiving, by the UP, the second URR from the CP comprises:
receiving, by the UP, a session modification request from the CP, wherein the session modification request comprises the second URR.

6. The communication method according to claim 1, wherein the first URR is a bearer level URR and the second URR is a service data flow level URR.

7. A communication system, comprising:
at least one first processor, configured to implement a user plane function entity; and
at least one second processor, configured to implement a control plane function entity;
wherein the control plane function entity is configured to send a second usage reporting rule (URR) to the user plane function entity, the second URR comprising an identifier (ID) of a first URR correlated with the second URR; and
wherein the user plane function entity is configured to:
receive the second URR from the control plane function entity;
in response to usage information on the user plane function entity reaching a threshold of the first URR, obtain usage information corresponding to the first URR, and usage information corresponding to the second URR correlated with the first URR; and
send, to the control plane function entity, the usage information corresponding to the first URR and the usage information corresponding to the second URR.

8. The communication system according to claim 7, wherein the user plane function entity is configured to receive a session establishment request from the control plane function entity, the session establishment request comprising the second URR.

9. The communication system according to claim 8, wherein the session establishment request further comprises the first URR.

10. The communication system according to claim 7, wherein the user plane function entity is further configured to receive a session establishment request from the control plane function entity, the session establishment request comprising the first URR.

11. The communication system according to claim 10, wherein the user plane function entity is configured to receive a session modification request from the control plane function entity, the session modification request comprising the second URR.

12. The communication system according to claim 7, wherein the first URR is a bearer level URR and the second URR is a service data flow level URR.

13. A user plane function entity (UP), comprising:
at least one processor; and
a non-transitory computer readable medium having a plurality of computer readable instructions stored thereon, wherein the instructions are executable by the at least one processor to cause the at least one processor to:
receive a second usage reporting rule (URR) from a control plane function entity (CP), the second URR comprising an identifier (ID) of a first URR correlated with the second URR;
in response to usage information on the UP reaching a threshold of the first URR, obtain usage information corresponding to the first URR, and usage information corresponding to the second URR correlated with the first URR; and
send, to the CP, the usage information corresponding to the first URR and the usage information corresponding to the second URR.

14. The user plane function entity according to claim 13, wherein instructions are executable by the at least one processor to cause the at least one processor to:
receive a session establishment request from the CP, the session establishment request comprising the second URR.

15. The user plane function entity according to claim 14, wherein the session establishment request further comprises the first URR.

16. The user plane function entity according to claim 13, wherein the instructions are further executable by the at least one processor to cause the at least one processor to:
receive a session establishment request from the CP, wherein the session establishment request comprises the first URR.

17. The user plane function entity according to claim 16, wherein the instructions are further executable by the at least one processor to cause the at least one processor to:
receive a session modification request from the CP, wherein the session modification request comprises the second URR.

18. The user plane function entity according to claim 13, wherein the first URR is a bearer level URR and the second URR is a service data flow level URR.

19. A communication method, comprising:
receiving, by a user plane function entity (UP), a second usage reporting rule (URR) from a control plane function entity (CP), the second URR comprising an identifier (ID) of a first URR correlated with the second URR;

in response to usage information on the UP reaching a threshold of the first URR, obtaining, by the UP, usage information corresponding to the first URR, and usage information corresponding to the second URR correlated with the first URR; and sending, by the UP to the CP, the usage information corresponding to the first URR and the usage information corresponding to the second URR.

20. The communication method according to claim 19, wherein the first URR is a bearer level URR and the second URR is a service data flow level URR.

* * * * *